United States Patent [19]
Sakaguchi et al.

[11] Patent Number: 5,946,479
[45] Date of Patent: *Aug. 31, 1999

[54] METHOD AND DEVICE FOR GENERATING MESH FOR USE IN NUMERICAL ANALYSIS

[75] Inventors: Masaya Sakaguchi; Yoshiaki Mizoh, both of Neyagawa, Japan

[73] Assignee: Matsushita Electric Industrial Co., LTD., Kadoma, Japan

[*] Notice: This patent is subject to a terminal disclaimer.

[21] Appl. No.: 09/197,972

[22] Filed: Nov. 23, 1998

Related U.S. Application Data

[63] Continuation-in-part of application No. 08/652,099, May 23, 1996.

[30] Foreign Application Priority Data

May 25, 1995 [JP] Japan .................................. 7-126557

[51] Int. Cl.$^6$ ...................................................... G06F 17/50
[52] U.S. Cl. ................................ 395/500.21; 395/500.01
[58] Field of Search ............................... 395/500, 500.01, 395/500.21, 500.2, 500.23; 345/331, 423; 382/154; 364/468.04

[56] References Cited

U.S. PATENT DOCUMENTS

| | | | |
|---|---|---|---|
| 4,912,664 | 3/1990 | Weiss et al. | 395/500.21 |
| 4,933,889 | 6/1990 | Meshkat et al. | 395/500.21 |
| 4,941,114 | 7/1990 | Shigyo et al. | 395/500.21 |
| 5,125,038 | 6/1992 | Meshkat et al. | 382/154 |
| 5,214,752 | 5/1993 | Meshkat et al. | 345/423 |
| 5,214,757 | 5/1993 | Meshkat et al. | 345/331 |
| 5,315,537 | 5/1994 | Blacker | 395/500.21 |
| 5,398,307 | 3/1995 | Arakawa | 345/423 |
| 5,442,569 | 8/1995 | Osano | 395/500.23 |
| 5,553,009 | 9/1996 | Meshkat et al. | 395/500.21 |
| 5,553,206 | 9/1996 | Meshkat | 345/423 |
| 5,579,249 | 11/1996 | Edwards | 395/500.21 |
| 5,617,322 | 4/1997 | Yokota | 364/468.04 |

OTHER PUBLICATIONS

"Improvements of 3–D Mesh Generation for Magnetic Field Analysis of Magnetic Recording Head Using FEM," by K. Ogawa et al., Institute of Electronics, Information and Communication, Engineers Technical Report MR94–57 (1994–12).

Shigyo et al., "Trimedes: A Triangular Mesh Device Simulation Linked with Topography/Process Simulator," Transactions of the IEICE, vol. E 71 No. 10, Oct. 1988.

Paolo Ciampolini et al., "Efficient 3–D Simulation of Complex Structures," IEEE Transactions on Computer–Aided Design, vol. 10 No. 9, Sep. 1991.

H. Tanimoto et al., "Discretion Error in Mosfet Device Simulation," IEEE Transactions on Computer–Aided Design, vol. 11, No. 7, Jul. 1992.

S. Kumashiro et al., "A Triangular Mesh Generation Method Suitable for the Analysis of Complex MOS Device Structures," IEEE 1994.

J.S. Yuan et al., "A Mesh Generator for Tetrahedral Elements Using Delaunay Triangulation," IEEE 1993.

(List continued on next page.)

*Primary Examiner*—Kevin J. Teska
*Assistant Examiner*—Russell W. Frejd
*Attorney, Agent, or Firm*—Price, Gess & Ubell

[57] ABSTRACT

A method and device for generating mesh to be used in numerical analysis for regions of an object to be analyzed, the regions of an object to be analyzed being input as data for a geometric model which defines their geometric form in a coordinate system which is set as a standard. This geometric model is then divided into equal parts in the coordinate directions of the coordinate system to generate blocks. After this, the vertices, endpoints and points of the shapes formed by the intersection or touching of the boundaries of the geometric model and each of the generated blocks are extracted. These extracted points, along with the vertices, endpoints and points of the geometric model and the vertices of the generated blocks, are set as nodes. Finally, mesh elements are generated for each block using the nodes.

26 Claims, 52 Drawing Sheets

OTHER PUBLICATIONS

J. Machek et al., "A Novel Finite–Element Approach to Device Modeling," IEEE 1983.

T. Tokojima et al., "Dual Mesh Approach for Semiconductor Device Simulator," IEEE Transactions on Magnetics, vol. 25, No.4 Jul. 1989.

T.–Y Chou et al., "Tangential Vector Finite Elements for Semiconductor Device Simulation," IEEE Transactions on Computer–Aided Design, vol. 10, No. 9, Sep. 1991.

ELEMENT 1

ELEMENT 2

ELEMENT 1

ELEMENT 2

ELEMENT 1    ELEMENT 3

ELEMENT 2

ELEMENT 2

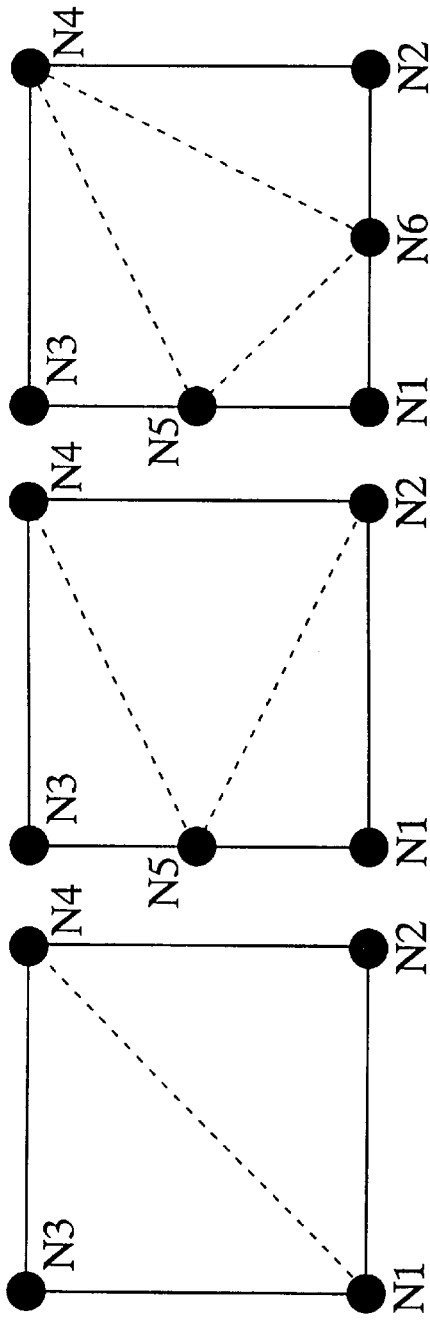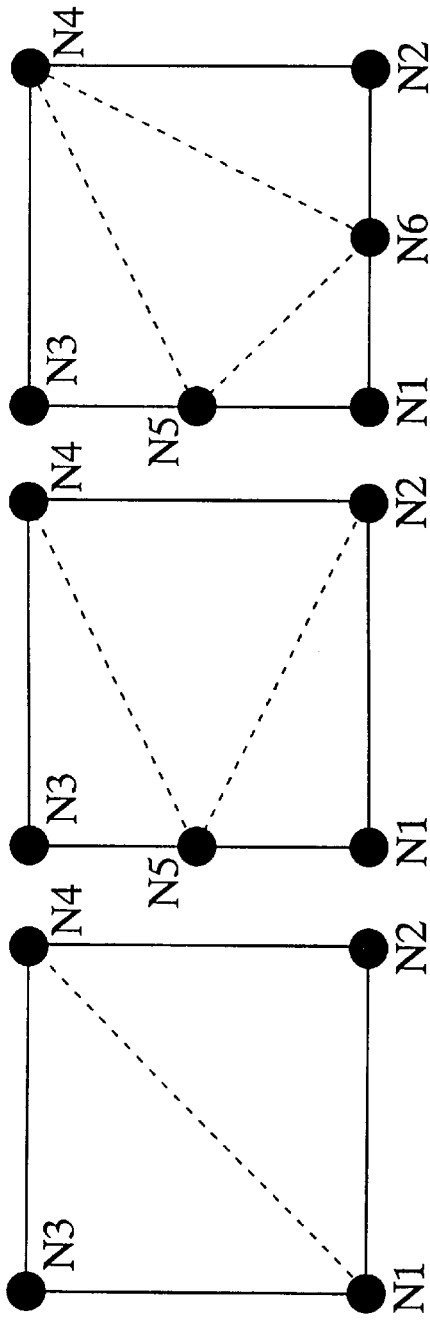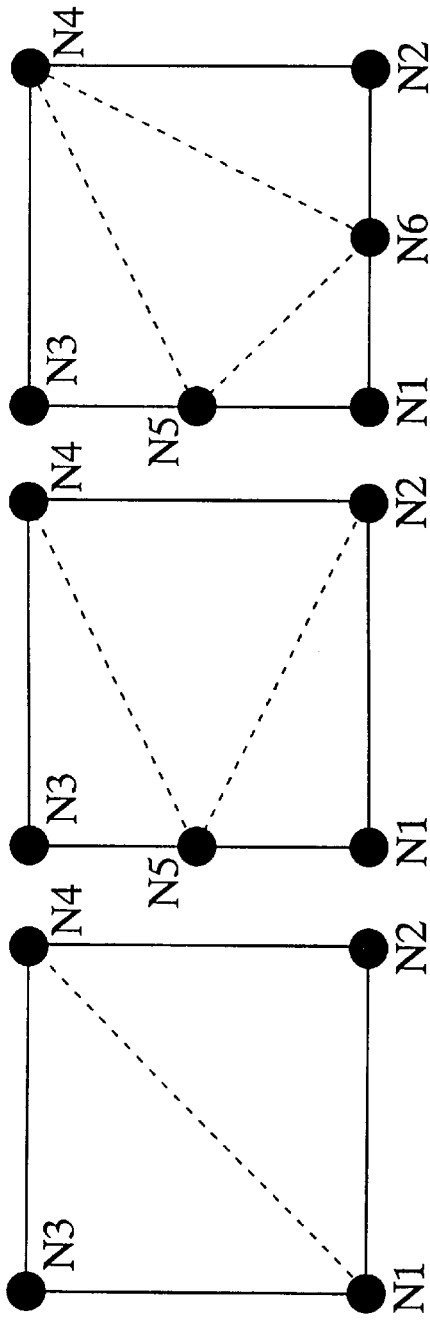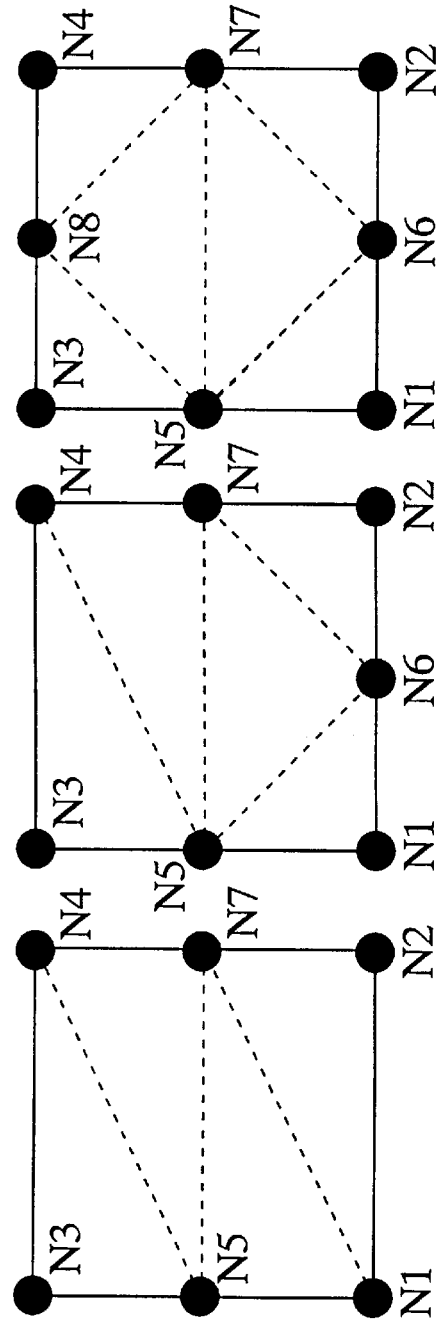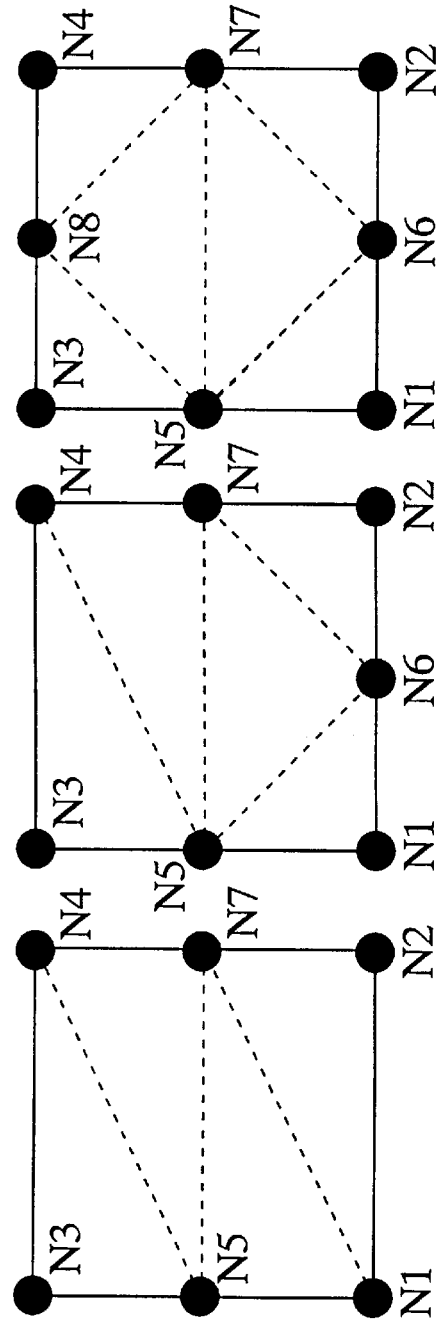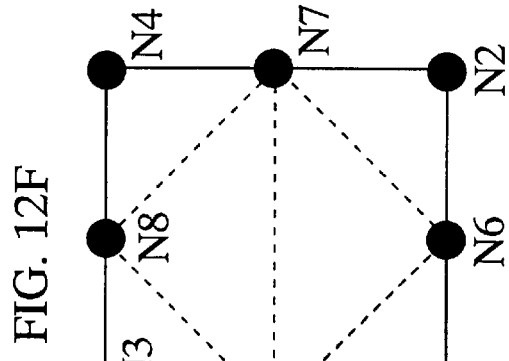

FIG. 13A
FIG. 13B
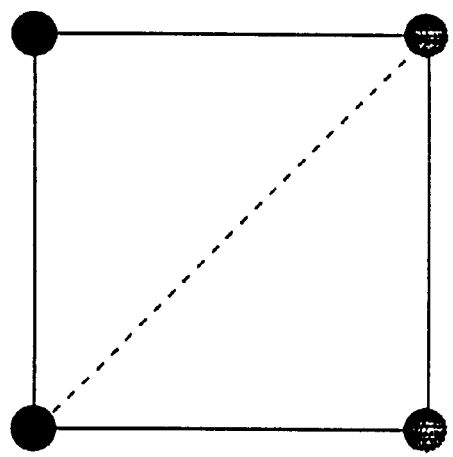
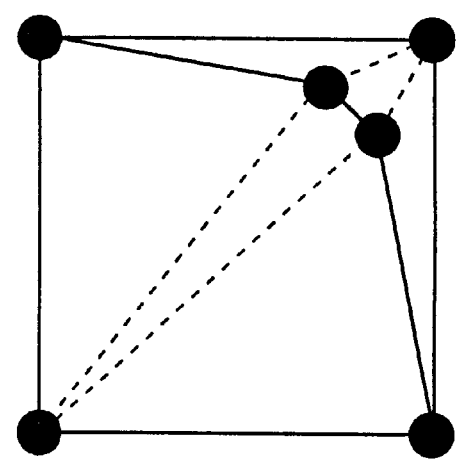

FIG. 14

| BLOCK NO. | NODES DUE TO VERTICES OF ADJACENT BLOCKS | NODES DUE TO INTERSECTION OF BLOCK AND GEOMETRIC MODEL BOUNDARIES | NODES DUE TO VERTICES OF GEOMETRIC MODEL | NO. OF SIDES OF GEOMETRIC MODEL | PATTERN IDENTIFICATION NUMBER |
|---|---|---|---|---|---|
| 1 | 0000 | 0 | 0 | 0 | 1 |
| 2 | 1000 | 0 | 0 | 0 | 2 |
| 3 | 1100 | 0 | 0 | 0 | 3 |
| 4 | 1000 | 0 | 0 | 0 | 2 |
| 5 | 1010 | 2 | 0 | 0 | 4 |
| 6 | 0000 | 2 | 0 | 1 | 5 |
| 7 | 0000 | | 1 | 2 | 6 |
| ... | | | | | |

FIG. 37
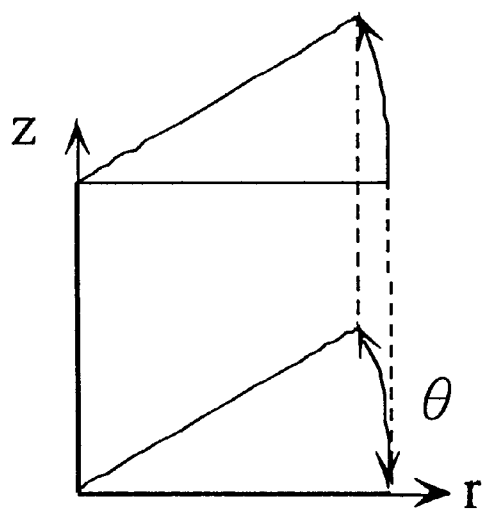
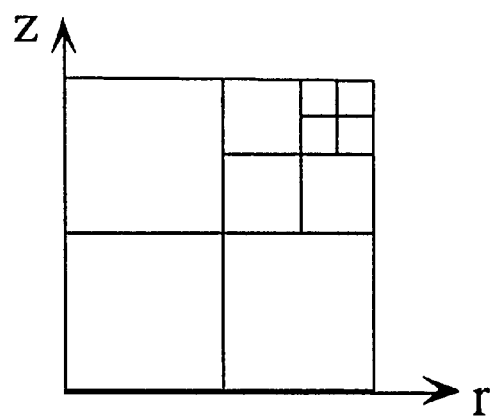
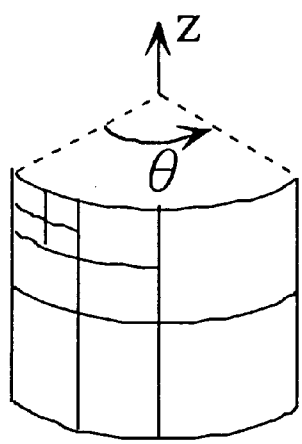
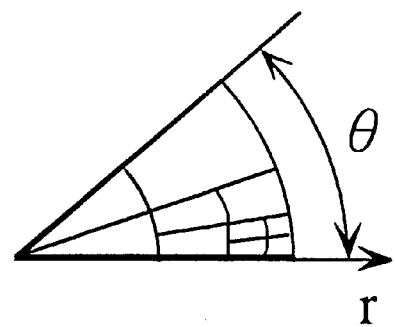

METHOD AND DEVICE FOR GENERATING MESH FOR USE IN NUMERICAL ANALYSIS

This application is a continuation-in-part application of prior patent application Ser. No. 08/652,099, filed on May 23, 1996, for "METHOD AND DEVICE FOR GENERATING MESH USE."

BACKGROUND OF THE INVENTION

1. Field of the Invention

The present invention is concerned with the field of numerical analysis and more specifically relates to a method and device for generating a mesh for a region to be analyzed using numerical analysis.

2. Description of the Prior Art

In recent years, numerical analysis has been increasingly used as a method of simulating actual phenomena in order to increase the efficiency of product development. Together with the recent improvements in computer performance, numerical analysis methods have advanced in leaps and bounds, so that analysis of increasingly complex models has become possible.

Here, several methods, such as a finite differential method, a finite element method, a boundary element method, or an integral equation method, can be used for performing numerical analysis. The majority of these methods involve the generation of mesh for the object to be analyzed and, when necessary, the space surrounding it. The generation of mesh consists of the division of the region to be analyzed into elements which are defined by line segments or by triangles, quadrangles, tetrahedrons, pentahedrons or hexahedrons. Each element which forms the mesh (hereinafter, "mesh element") is expressed using nodes which can be the vertices or mid-points of the shapes which form the mesh elements. These mesh elements are expressed by first-, second- or higher-order functions, with it further being possible for mesh elements to be defined by boundaries which are defined by a plurality of curves or curved surfaces. This is to say, meshes are made up of groupings of mesh elements which are expressed using nodes, so that meshes are generated by generating the constituent mesh elements and nodes.

Once a mesh has been generated, physical property values and initial conditions for each mesh element in the mesh are supplied and the simultaneous equations which are necessary for numerical analysis are formed, such as by using boundary conditions. After this, numerical analysis is executed to solve these simultaneous equations, such as by finding a value for a lowest amount of energy in the system.

For the kind of numerical analysis described above, the generation of a mesh by dividing the object to be analyzed, its surrounding space and any proximate objects and their surrounding spaces (each of which is referred to as a "region") can be considered essential. For this reason, a number of techniques have been developed for the generation of such mesh. A first example is the division of the entire region using a uniform lattice, which is shown in FIG. 1. In the illustrated example, the upper part of the object is divided into a lattice of length 3×breadth 3×height 4 and the lower part of the object is divided into a lattice of length 5×breadth 5×height 3.

A second example is the division of the object to be analyzed into regions of a temporarily suitable size, in accordance with the shape of the object. This is shown in FIGS. 2A–2C. As shown in FIG. 2A, a model is formed in the shape of object to be analyzed 31, with region 32 for which the mesh is to be formed (hereinafter; such regions are called "mesh generation regions") being divided into region 33 which is surrounded by the line ABIH, region 34 which is surrounded by the line BCJI and region 35 which is surrounded by the line CGKJ, as shown in FIG. 2B. Here, a number of divisions for the line segments which form each region is set so that the nodes A–K are generated. Next, mesh elements, such as triangular element 36 surrounded by the line BCF and triangular element 37 surrounded by the line ABE, are generated based on the nodes. This is to say, in this second mesh generation method, nodes are generated according to a fixed process for the regions generated by suitably dividing the region to be analyzed to facilitate mesh generation, these generated nodes then being joined according to a fixed process to generate mesh elements. Accordingly, by temporarily generating regions by suitably dividing the region to be analyzed, nodes and mesh elements for these regions can easily be generated.

It should be noted here that in FIG. 2, the symmetry of the object to be analyzed 31 is such that, in order to reduce the necessary amount of calculation, a region which is only one quarter of the total size can be set as the mesh generation region. Also, when performing mesh generation, especially for analysis under the finite element method of electromagnetic fields or temperature for objects such as headphones or magnetic tape, there are many cases where it is also necessary to perform mesh generation for the region surrounding the object to be analyzed, such as region 38 shown in FIG. 2C, so that this surrounding space is also divided into regions.

As a third example, it is also possible to have mesh automatically generated by executing a program. In general, such methods generate mesh using an algorithm which is designed to reduce the errors which arise in numerical analysis due to differences in area or in the lengths of edges between mesh elements. This is achieved by generating mesh elements of triangular, quadrangular, tetrahedral or similar form whose edges are equal in length or as close in length as possible, which is to say mesh elements of non-elongated form.

Additionally, within such mesh generation methods, there are a number of techniques and methods for finely dividing the mesh where there is a sudden change in the object, such as in potential or in form. Similarly, there are a number of techniques and methods for displaying the calculated result on a display screen to assist the understanding of the user.

However, the first method which generates a uniform mesh for the entire region has great difficulty in generating a suitable mesh for objects to be analyzed which are of complex form, such as headphones, cylinders (of engines) or shafts, or for objects which contain complex clipped-out portions.

The second method where the user divides the object to be analyzed into a plurality of regions in accordance with its form has a drawback in that there is a great increase in the load of the user when, together with an increase in complexity of the object to be analyzed, there is a sudden increase in the number of regions into which the object is to be divided. Here, while the accuracy of numerical analysis generally increases with the fineness the mesh, there is a substantial increase in the load of calculation for such fine mesh. As a result, there are demands for the method to achieve the same high level of accuracy for the desired region with fewer mesh elements. Here, control is performed to ensure that the difference in sizes between adjacent mesh elements is not too extreme and that elongated mesh elements are not used. This means that the user has to exercise great care in dividing the region to be analyzed which makes great demands on the mesh generating skill of the user. In particular, when the object to be analyzed is of a complex three-dimensional form, it is extremely difficult for the user to appropriately divide the three-dimensional object into regions, generating a great workload for the user.

Also, there is the third method which automatically generates mesh using an algorithm which, for the sake of calculation accuracy, is designed not to generate elongated mesh elements. For this reason, depending on the geometric form of the object to be analyzed, when the length of one edge of the object to be analyzed is longer than the other edges, an algorithm which sets the length of the longer edge as the same as length of the other edges is automatically used. As a result, there are cases where unnecessarily fine mesh elements are generated over an unnecessarily large area. For mesh division for a three-dimensional form, an extremely large amount of calculation is necessary, and if the number of mesh elements is increased due to the nature of the mesh division algorithm, there will be an exponential increase in the necessary calculation time for numerical analysis. Also, when a method in which the nodes are generated beforehand and mesh elements are automatically generated from these nodes is used, there is a preference for generating non-elongated mesh elements, so that there are cases when there are great differences in size between adjacent mesh elements.

For the reasons given above, it can be seen that suitably executing mesh division for a complex object to be analyzed and verifying the results takes a great deal of time and requires a fair amount of skill. Here, it is often the case that analysis is repetitively performed for an object to be analyzed with modifications to its form or conditions, so that there is great demand for an improved technique for mesh division and mesh element generation.

SUMMARY OF THE INVENTION

The first object of the present invention is to enable a large reduction in the load of a user in generating mesh to be used for numerical analysis by relieving the user of the necessity of inputting coordinates for an efficient division of a region.

The second object of the present invention is to facilitate an estimation of the size and form of the mesh to be generated so that the user can have his/her desired mesh generated.

The third object of the present invention is to perform mesh generation in a shorter time than is possible with conventional mesh generation techniques, even when generating mesh when the object to be analyzed is complex in form and the mesh to be generated is composed of a great number of mesh elements.

In order to achieve the stated objects, the present invention, in generating mesh by dividing a region which can be made up of the input object to be analyzed and its surrounding space, first receives an input of data which geometrically defines a geometric model in a standard coordinate system, such as rectangular coordinates, cylindrical coordinates or polar coordinates, to enable the distinction of each of the regions in the object to be analyzed from other objects. Blocks are generated by performing at least one division of the input geometric model in at least one coordinate direction of the coordinate system. It should be noted here that the term "blocks" is used to describe the result of division of the region to be analyzed into equal parts in order to generate mesh. Endpoints, vertices and points (when the figures which result from the intersection or touching of the boundaries of the geometric model and a block are points) of figures produced where the boundaries of each of the generated blocks and the boundaries of the geometric model touch or cross each other are then detected and set, along with the vertices of blocks and vertices, endpoints and points of the geometric model, as nodes. Following this, mesh elements are generated for each block based on these nodes, using a fixed procedure which does not generate flat, elongated mesh elements.

The above construction enables a great reduction in the load of dividing the mesh generation region into a plurality of regions when a user generates mesh.

Also, since the divided blocks are of simple form and have few nodes, the user can easily estimate the size of the mesh which will be generated by looking at the results of the block division, so that the user can easily have his/her desired mesh generated.

Furthermore, since the divided blocks are of simplified form with few nodes, the generation of mesh elements for each block is simplified and can so be executed in a short time. Additionally, since mesh elements are generated separately for each block, the total calculation time for generating mesh elements can be seen to be directly proportionate to the number of blocks, so that when there is an increase in the number of mesh elements, the increase in the total time taken for mesh element generation does not exceed the proportionate increase in the number of mesh elements. From this, it can seen that a drastic reduction in the time taken by mesh generation can be achieved using the present invention. In particular, when the objects and regions to be analyzed using numerical analysis are of highly complex form, it is necessary for very fine mesh division to be performed to ensure a high degree of accuracy in numerical analysis. Here, the greater the degree to which such fine mesh is necessary, the greater the effect of the present invention in enabling the generation of fine mesh in a shorter time than conventional techniques.

When the present invention generates mesh elements for each block, the following processes are also possible.

First, all of the blocks may be sorted in terms of block pattern. Next, mesh element patterns are generated for each of the present block patterns based on their nodes. The generated mesh element patterns are then stored in a storage means along with their corresponding block patterns. The generation of mesh elements is then performed for each block using the mesh element pattern in the storage means which corresponds to the block pattern of each block in question. Here, the term "mesh element pattern" refers to a pattern which is generated according to a fixed process from the nodes which compose an arbitrary block pattern and which shows what mesh elements will be generated for blocks which have this arbitrary block pattern.

When generating mesh elements, the block patterns and corresponding mesh element patterns may be stored in the storage means. This is to say, the sorting of blocks in terms of block patterns may be executed for one block at a time. It can then be judged whether the block pattern of a current block is registered in the storage means. If it is judged that the block pattern is not registered, a new mesh element pattern is generated for this block pattern based on the nodes. This newly-generated mesh element pattern is then registered in the storage means along with the corresponding block pattern. After this, mesh elements are generated for the block in question using the mesh element pattern in the storage means which corresponds to the block pattern of the block in question.

The generation of the mesh elements for each block may also include the following procedures. First, an arbitrary number of block patterns and corresponding mesh element patterns may be stored beforehand in a database. Next, all of the blocks for which mesh generation is to take place are sorted by pattern. It is then judged whether each of these block patterns is registered in the database, with a mesh element pattern being generated for each pattern which is judged as not being registered in the database, based on the nodes in each block pattern. The database is then updated so as to include the newly-generated mesh element patterns and their corresponding block patterns. After this, mesh elements are generated for each block in question using the mesh element pattern in the database which corresponds to the block pattern of each block in question.

The generation of the mesh elements for each block may also include the following procedures. First, an arbitrary number of block patterns and corresponding mesh element patterns may be stored beforehand in a database. Next, one of the blocks for which mesh generation is to take place is sorted in terms of its pattern. It is then judged whether this block pattern is registered in the database, with a mesh element pattern being generated for the block pattern if it is judged as not being registered in the database, based on its nodes. The database is then updated so as to include the newly-generated mesh element pattern and its corresponding block pattern. After this, mesh elements are generated for this block using mesh element pattern in the database which corresponds to the block pattern of the current block.

As described above, mesh element patterns which correspond to each block pattern are used in the generation of mesh elements for each block, so that a reduction in the calculation time necessary for the generation of mesh elements for each block can be achieved.

When generating blocks using the present invention, it is also possible to designate a region of the geometric model which is to be divided, with the blocks included in the designated region then being divided into equal parts in at least one of the coordinate directions.

It is also possible to designate at least one of a surface, line or point of the geometric model which is to be divided, with the blocks present on the designated surface, line or point then being divided into equal parts in at least one of the coordinate directions.

By means of the above construction, the user can easily designate the blocks which are to be finely divided and so can achieve a desired grading across the mesh, thereby allowing the user to efficiently generate mesh without having to first put in a lot of practice in order to master mesh generation.

Also, when generating blocks using the present invention, it is possible to input limit data for limiting the difference in size between adjacent blocks, so that for every case where the difference in size between adjacent blocks violates the value in the limit data, the larger of the adjacent blocks is divided into equal parts in at least one coordinate direction. By doing so, changes in the grading of the mesh between adjacent blocks can easily be controlled so that extreme variations in mesh grading and the generation of elongated mesh elements can be avoided.

When generating blocks using the present invention, it is also possible to input fixed limit rules for defining limitations for at least one of the points, lines or surfaces which define the form of the geometric model which appears in each block, with blocks which violate the limit rules being divided into equal parts in at least one coordinate direction. By doing so, a mesh whose grading is related to the complexity of the geometric model in each region can be generated. By adding a limitation on the difference in sizes between adjacent blocks to this arrangement, the number of possible block patterns can be limited in accordance with the regulations over the form of the geometric model which is present in one block. Here, by using mesh element patterns which are generated beforehand for each block pattern, the calculation time necessary for mesh generation can be drastically reduced. Also, since the mesh element patterns can be freely put together by the user, meshes which are combinations of various mesh elements which were not possible under conventional techniques can be generated.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 12 shows examples of patterns of relations between nodes and lines and surfaces of the geometric model inside two-dimensional blocks;

FIGS. 13A and 13B show two examples of patterns of relations between nodes and lines and surfaces of the geometric model inside two-dimensional blocks, for the blocks shown in FIG. 9C;

FIG. 14 shows an example of a table for identifying block patterns;

FIG. 37 shows a three-dimensional region to be analyzed which is divided into blocks using cylindrical coordinates;

DESCRIPTION OF THE PREFERRED EMBODIMENTS

First Embodiment

Figure 3:
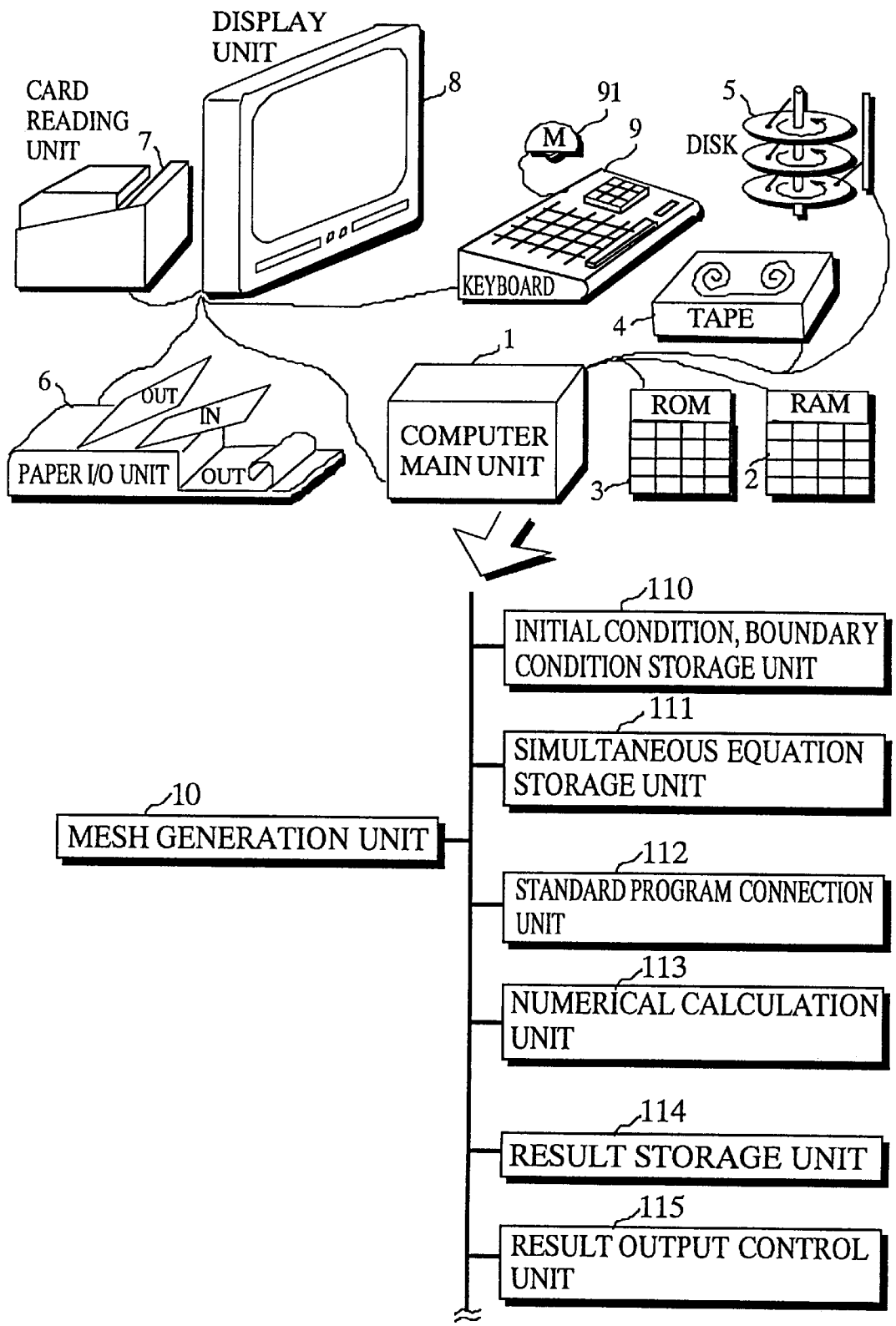
FIG. 3 shows the construction of a numerical analysis device which uses the numerical analysis mesh generation device and method of the present invention, focusing on the hardware in a computer system.

The following is an explanation of the first embodiment of the present invention with reference to the drawings. In the drawings, FIG. 3 shows the entire construction of a numerical analysis device which uses the method of the present invention for the generation of mesh utilized in numerical analysis. As shown in this drawing, the present device includes computer main unit 1, RAM 2 and ROM 3 as internal storage means, magnetic tape 4 for storing programs and data, external storage device 5 made up of an FD, HD, CD-ROM or the like for storing programs and data, paper input/output unit 6 for inputting/outputting the necessary data using electromagnetic exchange and for creating a print output on supplied paper, card reading unit 7, display unit 8 which allows the user to verify the input regions to be analyzed, the results of block division and the midway results of calculation, and a keyboard 9 and mouse 91 used for indicating regions and blocks.

Here, computer main unit 1 is made up of mesh generation unit 10, initial condition/boundary condition storage unit 110, simultaneous equation storage unit 111, standard program connection unit 112, numerical calculation unit 113, result storage unit 114, and result output control unit 115.

Mesh generation unit 10 divides the geometric model of the object to be analyzed to generate mesh. Initial condition/boundary condition storage unit 110 stores initial physical conditions, boundary conditions, physical properties and material properties of the regions to be analyzed which are input before computation is performed. Simultaneous equation storage unit 111 stores various kinds of equations, such as Navier-Stokes equations, and Maxwell's electromagnetic equations and their relations with the mesh elements and nodes. Standard program connection unit 112 converts the stored content of each storage unit so that they can be used by programs in calculation, when calculation is performed by executing standard programs such as NASTRAN. Numerical calculation unit 113 executes the actual calculation using the stored contents of each storage unit. Result storage unit 114 stores the calculation results. Finally, result output control unit 115 controls the state of the output of these final results.

Figure 4:
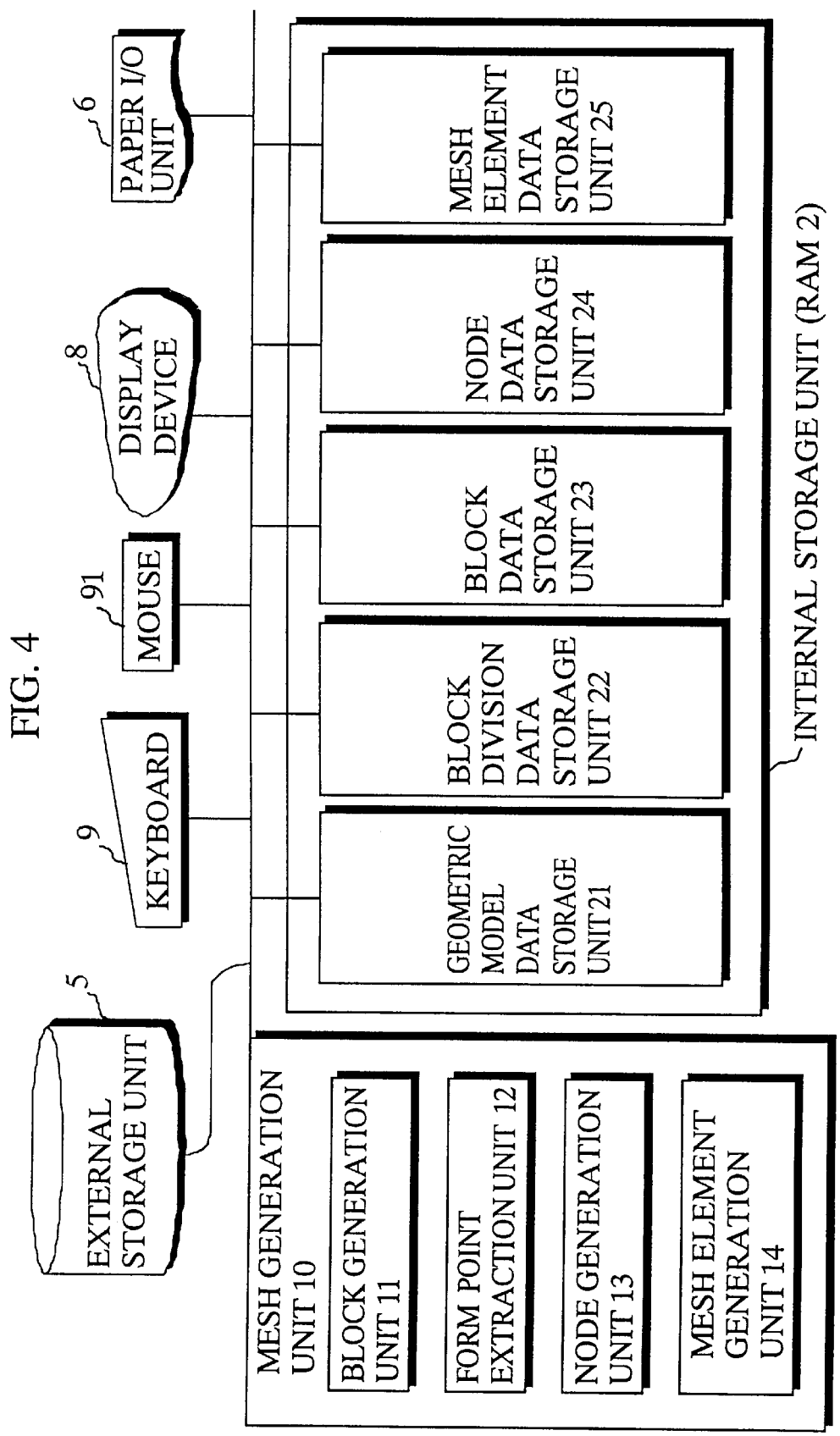
FIG. 4 shows the construction of the mesh generation device to which the present invention relates.

The following is an explanation of the mesh generation device of the present invention with reference to FIG. 4. As shown in this drawing, mesh generation unit 10 is made up of block generation unit 11, form point extraction unit 12, node generation unit 13 and mesh element generation unit 14. It should be noted here that the construction of mesh generation unit 10 is achieved by having a program executed by the computer, with it being possible to store this program on a recording medium such as a floppy disk. Here, RAM 2, provided as an internal storage means for the computer, includes geometric model data storage unit 21, block division data storage unit 22, block data storage unit 23, node data storage unit 24 and mesh element data storage unit 25. In addition to the above, the mesh generation device includes keyboard 9 and mouse 91 for data input, rewritable external storage device 5, display device 8 for displaying the division into blocks, the result of mesh generation and the like and paper input/output unit 6 for outputting the results.

Geometric model data storage unit 21 stores the data for the geometric model which is the region to be analyzed. This data for the geometric model is expressed using coordinates and equations after modeling the region to be analyzed which is input from keyboard 9, external storage unit 5 or the like. Block division data storage unit 22 stores the entire geometric model data as the initial block data for the initial division into blocks, as well as the block division data, which is indication information for the blocks to be divided and data for the division method to be used to divide these blocks. Block division data can be set by a data input from keyboard 9 and mouse 91 or by using data for block division indications and division method indications in a program. Block generation unit 11 generates the blocks by dividing the initial block data stored by block division data storage unit 22 into equal parts in at least one direction parallel to the coordinate axes, based on the block division data also stored by block division data storage unit 22. Here, block generation unit 11 includes a reception means which receives a setting of a block to be finely divided and the division method as well as a judging means which judges whether block division is sufficiently fine. The data for the generated blocks is then stored in block data storage unit 23.

Figure 5A:
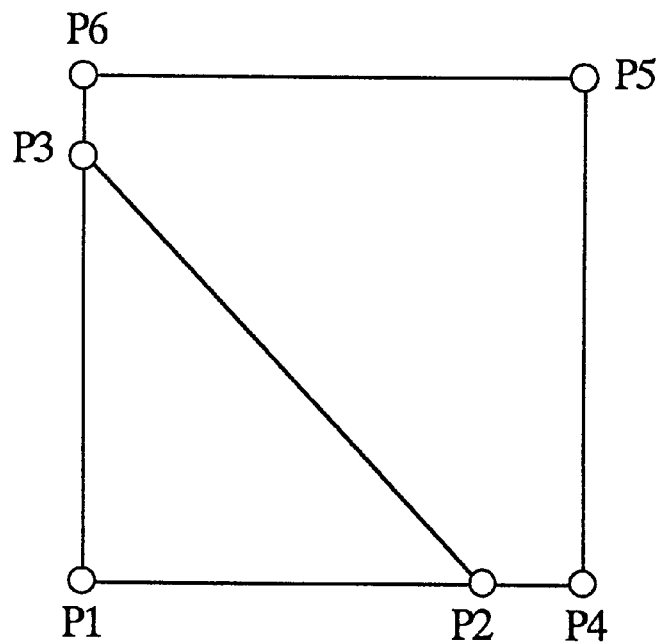
FIG. 5A shows an example of the geometric model.
Figure 5B:
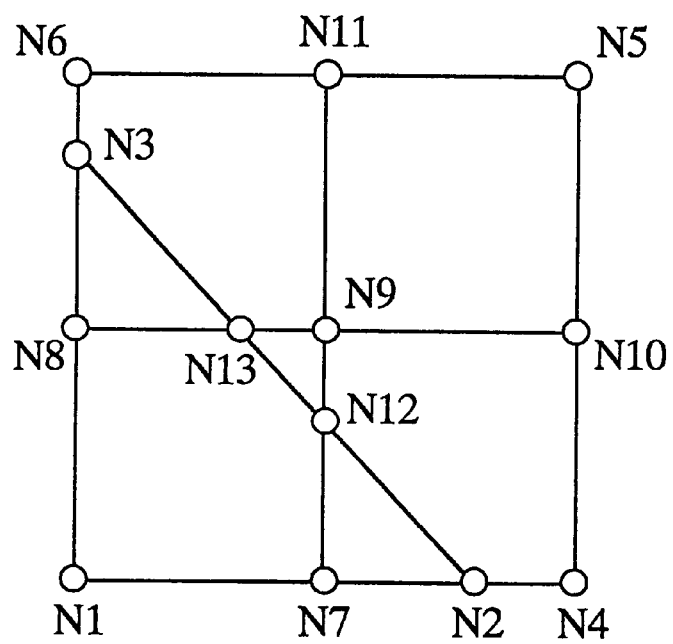
FIG. 5B shows the vertices, endpoints and points of the form produced from the points where the boundary of a block and the boundary of the geometric model touch each other or intersect.

Form point extraction unit 12 then extracts any vertices, endpoints or points of a form created by the touching or intersection of the boundary of the geometric model and the boundary of each generated block. For example, when the geometric model in FIG. 5A is divided as shown in FIG. 5B, the points N12 and N13 are given as points formed by the touching or intersection of the boundary of the geometric model and the boundary of a block. It should be noted that when the object to be analyzed is planar, the figures formed by the touching or intersection of the boundary of the geometric model and the boundary of a block will be points, although when the object to be analyzed is three-dimensional, other figures, aside from points, can be result from the intersection or touching of the boundary of the geometric model and the boundary of a block. In the present invention, the vertices, endpoints and points of the figure formed by the touching or intersection of the boundary of the geometric model and the boundary of a block are set along with the vertices, endpoints and points of the geometric model as form-defining points for the geometric model (points P1 through P6 in FIG. 5A). The form-defining points in FIG. 5B are N1–N6, N12 and N13.

Node generation unit 13 generates nodes using the form-defining points (N1–N6, N12 and N13) and the vertices of each block (N1, N7, N4, N8–N10, N6, N11, N5). However, points where there is coincidence of a form-defining point and a block vertex are treated as single nodes. Accordingly, the nodes N1–N13 are generated in FIG. 5B, with these then being stored in node data storage unit 24 using the coordinates of the nodes for the generated blocks as a standard. Mesh element generation unit 14 generates mesh elements for each of the blocks by joining the nodes according to a fixed procedure, based on the data for the nodes stored by node data storage unit 24. The data for the generated mesh elements is then stored in mesh element data storage unit 25.

Figure 6A:
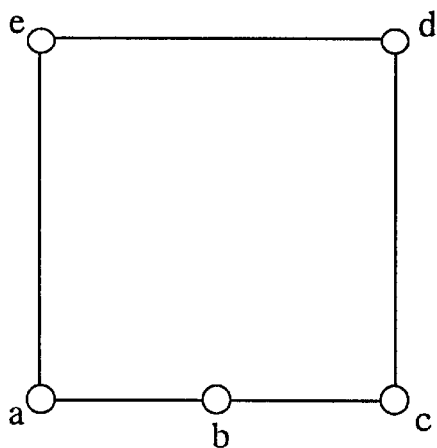
FIGS. 6A–6F are figures which show examples of the generation of triangular mesh elements inside blocks.
Figure 6B:
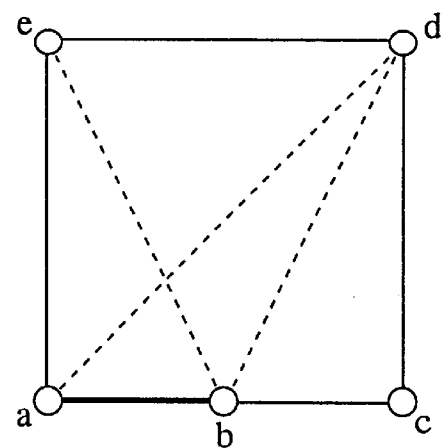
Figure 6C:
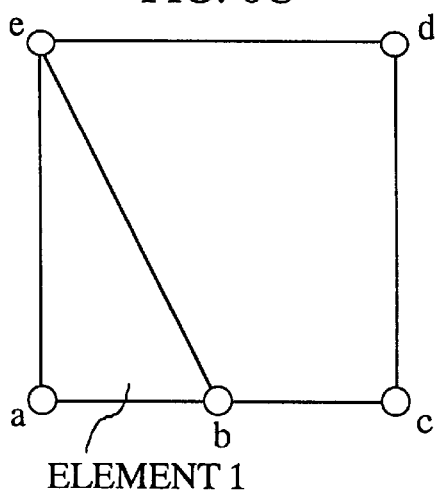
Figure 6D:
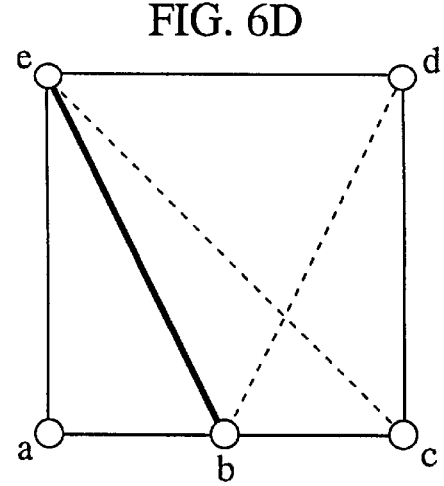
Figure 6E:
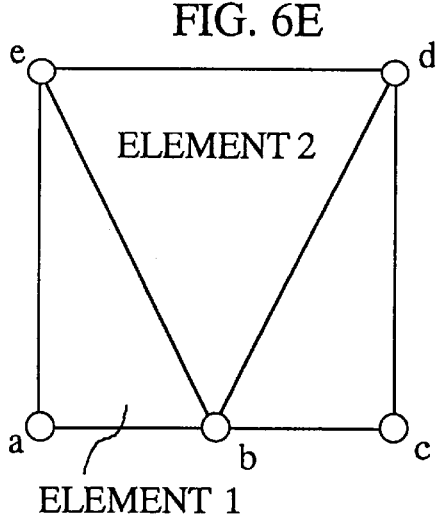

The following is an explanation of the procedure used by mesh element generation unit 14 in the generation of mesh elements with reference to the examples shown in FIGS. 6A–6F and in FIGS. 7A–7F. FIGS. 6A–6F show a specific example of the progressive generation of mesh elements based on nodes supplied to mesh element generation unit 14. First, as shown in FIG. 6A, the nodes in the block to be processed are given as a, b, c, d and e. After this, triangular mesh elements are formed according to the procedure described below.

1. First, one of the line segments which forms the block is selected (in the illustrated example, the line segment ab is chosen). This selection may be made according to a criterion which is set beforehand, such as the selection of the bottom edge of the block.

2. The selected line segment is then set as one of the sides in a triangular mesh element. Here, the setting of one side in the triangle sets two of the three vertices for the triangle. In the illustrated case, this means that the generation of triangles abe and abd is possible (see FIG. 6B). At this point, the elongation (a measure of how far the triangle is from an equilateral form) of each of the two triangles is calculated and the least elongated of the possible triangles (abe) is given priority in the selection (see FIG. 6C). Note here that in this calculation of elongation, the comparison of the shortest and longest of the sides can be performed in order to reduce the necessary amount of calculation, or, for highly precise calculation, the comparison of the radius of an inscribed circle with the radius of a circumscribed circle can be performed.

3. Next, one side of the generated triangular mesh element which is not a line segment which forms the block is selected. In the illustrated example, only the side be fits this criterion so that this side be is selected.

4. The procedure returns to (2), and triangular mesh elements are generated. Triangle bde is selected out of the possible triangles bce and bde (see FIG. 6D) and the triangular mesh element bde is generated (see FIG. 6E).

Figure 6F:
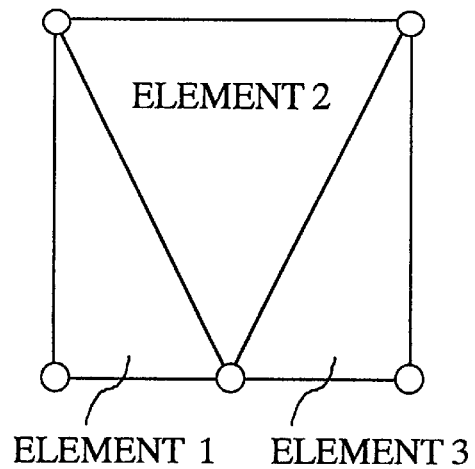

The above procedure is then repeated until the block is covered in triangular mesh elements. As a result, the triangular mesh elements abe, bde and bcd are generated, as shown in FIG. 6F.

Figure 7A:
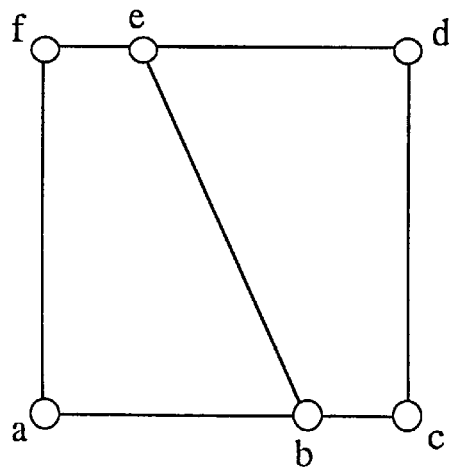
FIGS. 7A–7F are figures which show examples of the generation of triangular mesh elements inside blocks.
Figure 7B:
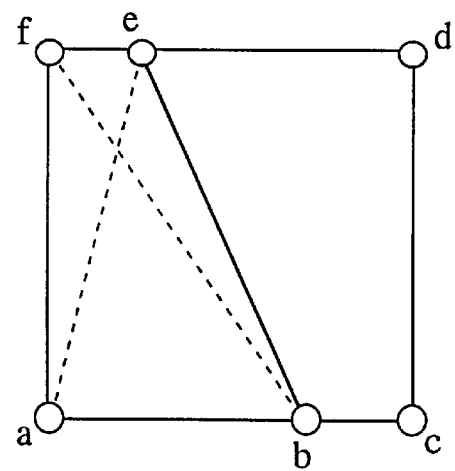
Figure 7C:
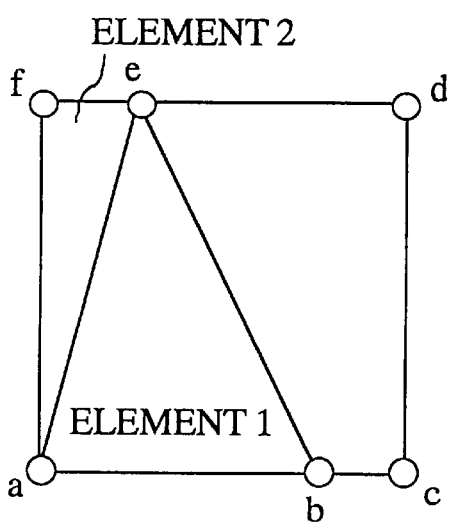
Figure 7D:
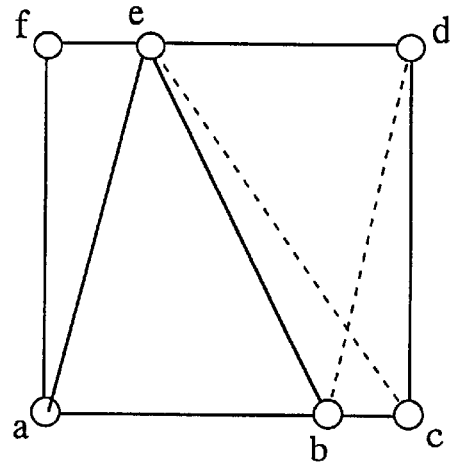
Figure 7E:
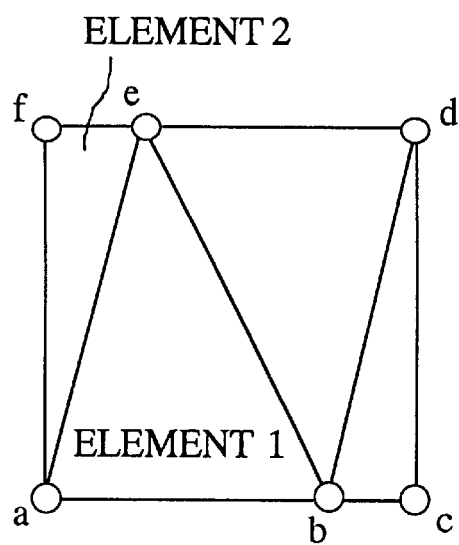
Figure 7F:
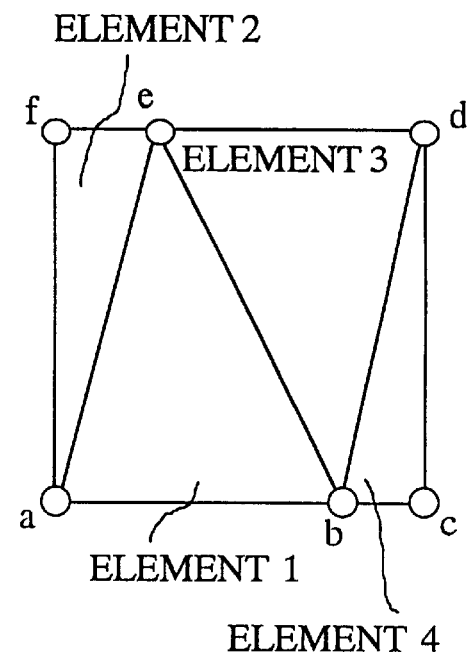

FIGS. 6A–6F show the case when there is no boundary of the geometric model in a block, so that the case when a boundary of the geometric model is present in the block will be explained using FIGS. 7A–7F. First, as shown in FIG. 7A, the nodes in the block to be processed are given as a, b, c, d, e and f. Here, the line ed is part of the boundary of the geometric model. After this, triangular mesh elements are formed according to the procedure described below.

1. The geometric model boundary is set as dividing the block. In this case, the block is divided by the boundary ed into the quadrangles abef and bcde.

2. Next, one of the line segments which forms one of the divided parts of the block (in this case, the quadrangle abef) is selected. In the illustrated example, the line segment be is chosen.

3. The selected line segment is then set as one of the sides of the triangular mesh elements generated inside this divided part of the block (see FIG. 7B). Here, the least elongated of the possible triangles (abe) is selected in the same way as before.

4. This process is repeated until this part of the block is covered with triangular mesh elements, with, as a result, the triangular mesh elements abe, aef being generated (see FIG. 7C).

5. The process in (2.) and (3.) above are repeated for the other divided part of the block, so that the triangular mesh elements bde, bcd are generated (see FIGS. 7D–7F).

As can be seen above, when there is a boundary of the geometric model in a block, the boundary is used to divide the block and is then set as the first line segment used in mesh element generation in each of the divided parts of the block.

It should be noted here that the above example gives the case for only first-order elements, although, for higher-order elements, there are cases when nodes are generated at the same time as the mesh elements.

It should be also noted that the reference to mesh elements being triangular is simply for the sake of convenience and that this should not be construed as a limit of the present technique. For example, there will be many cases where quadrangular, tetrahedral, pentahedral or other such mesh elements are used.

After completing the generation of mesh elements for a first block, mesh element generation unit 14 proceeds with the generation of mesh elements for a next block according to the same procedure as above.

The following is an explanation of the mesh generation method for the mesh generation device of the construction described above.

Figure 8:
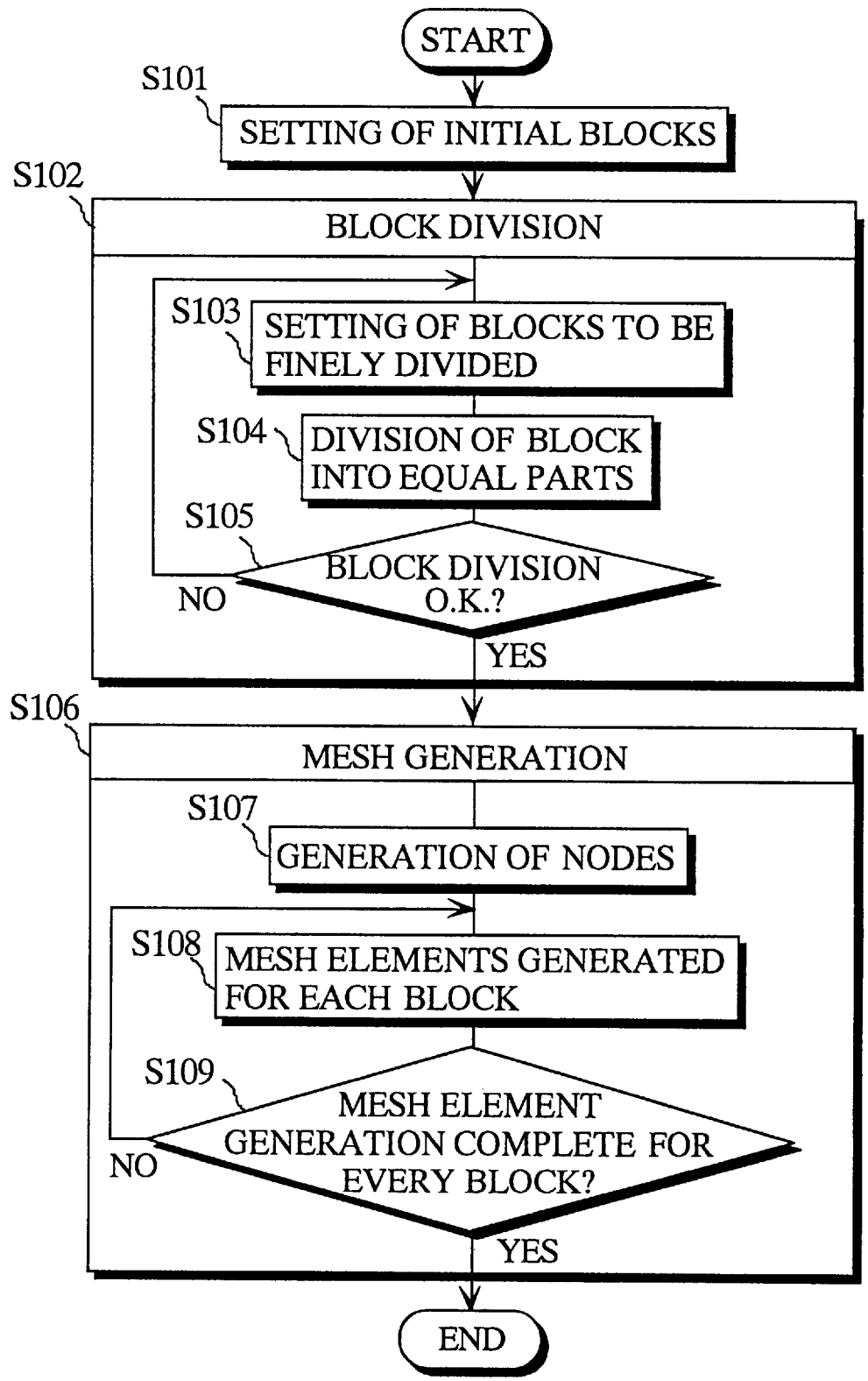
FIG. 8 shows the processing method for mesh generation according to first embodiment of the present invention.

FIG. 8 shows the processing method for the present embodiment, with the following explanation with giving a outline description of its content.

(S101) An initial block is set for block division. Here, it should be obvious that only half of the entire region will be input when there is reflective or rotational symmetry.

(S102) Block division is performed for the mesh generation region by repeatedly dividing the object into equal parts.

(S106) Mesh elements are generated for each block so that mesh is generated for the entire mesh generation region.

FIGS. 9A–9D show examples of mesh generation by the present embodiment. In this example, the mesh generation region is the same as that in FIG. 2C with a planar mesh being generated in an xy perpendicular coordinate system. The following is a detailed explanation of the steps in the above procedure with reference to the illustrated example.

(S101) Keyboard 9 or external storage device 5 has the data for the geometric model, which is modelled for the object to be analyzed, stored in geometric model data storage unit 21, with the entire mesh generation region being stored as the initial blocks in block division data storage unit 22. The data for the geometric model referred to here is data which uses points, straight and curve lines and flat or curved surfaces to express the modelled form of the object to be analyzed. In the example illustrated in FIG. 9A, the data for the geometric model is expressed by the data for ten points P1–P10, eleven lines L1–L11, and two surfaces (S1 surrounded by the seven line segments L1–L7 and S2 surrounded by nine line segments L2–L6, L11, L10, L9 and L8), with xy coordinates as being used as standards. (S102) Each of the following steps is executed by block generation unit 11.

First, in (S103), the setting of the blocks to be finely divided and of the fine division method are performed. The setting method for blocks to be finely divided which is used here can be either a direct indication from the user of the blocks to be finely divided themselves, which can be made using a mouse or keyboard, or an automatic block setting which is performed after an indication of a part of the data for the geometric model which is to be finely divided. Examples of indications of blocks to be finely divided are dealt with in the succeeding embodiments.

In (S104), the initial block data stored in block division data storage unit 22 is divided into equal parts in the x and y coordinate directions. It should be noted here that in addition to division into equal parts in each coordinate direction, other fine division methods may be used, such as a division into equal parts in one or two of the coordinate directions, a division into equal parts in which some positions are more finely divided than others depending on their coordinates, or a division in which the number of divisions changes depending on the coordinate axis direction.

In (S105), it is judged whether the block division is sufficient, with block division being repeated until blocks of a desired size are attained. This judgement can be made by displaying the divided blocks on display unit 8 or printing them on paper using paper input/output unit 6 so that the user can make the judgement based on a visual display of the blocks. Alternatively, the divided blocks can be compared to a predetermined size to determine whether they are the correct size in a program-based method. Here, it is also possible to use a method where block division is executed a predetermined number of times. Here, it should also be clear that depending on the form of the object to be analyzed, equal division may not repeated and instead executed just once without judging whether the division is sufficient, when an indication, such as for division into one hundred parts, is received from the user.

Figure 9A:
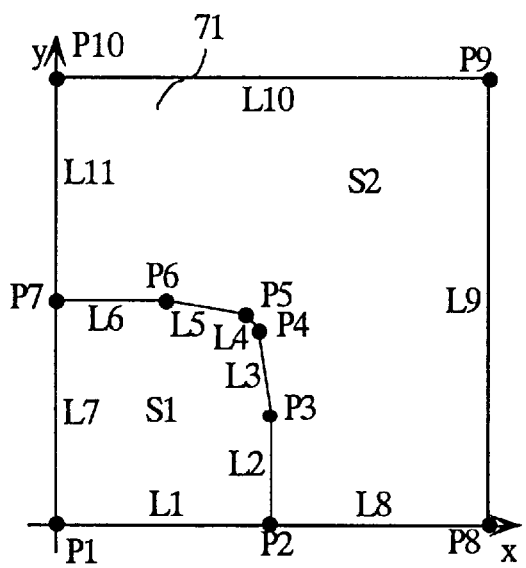
FIG. 9A shows an example of a geometric model.
Figure 9B:
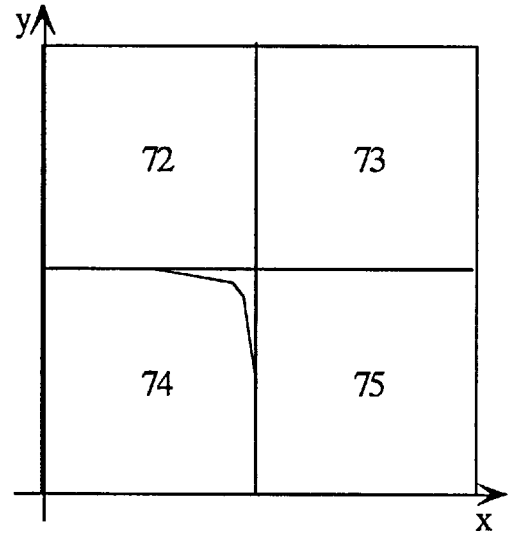
FIG. 9B shows the geometric model of FIG. 9A divided into equal parts in the x and y axes.
Figure 9C:
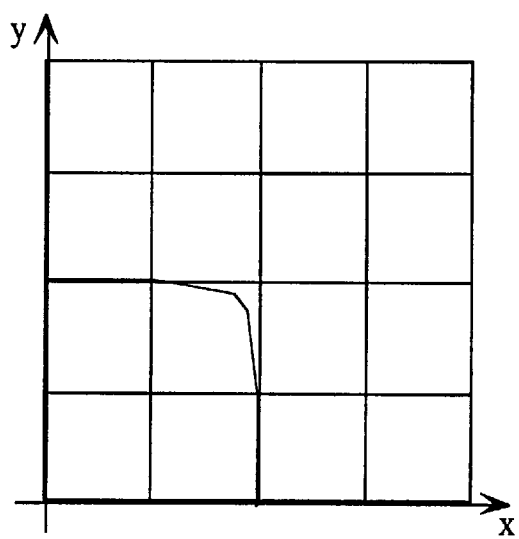
FIG. 9C shows the blocks of FIG. 9B further divided into equal parts in the x and y axes.

By executing the steps described above, the initial blocks shown in FIG. 9A are divided to become as shown in FIG. 9C via the state shown in FIG. 9B. In FIG. 9B, the initial blocks 71 (mesh generation region) is divided in two in both the x and y directions to generate the four blocks 72–75. FIG. 9C shows the result of when the user gives an indication to finely divide each of the four blocks 72–75, so that these four blocks 72–75 are further divided in two in both the x and y directions to generate a total of sixteen blocks.

Figure 9D:
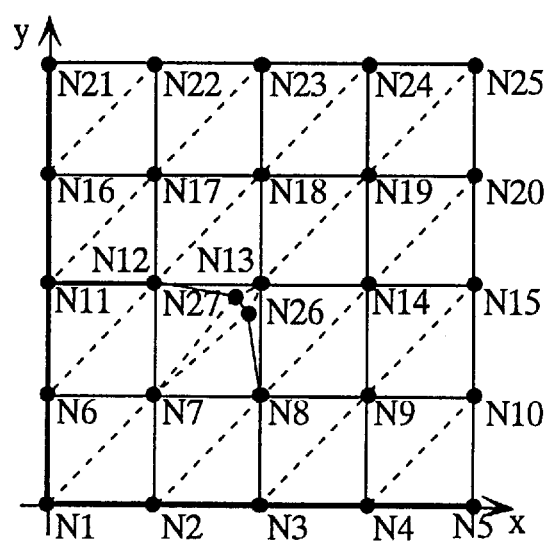
FIG. 9D shows the generation of mesh elements for the nodes taken from FIG. 9C.

The following is a detailed description of step S106. In (S107), nodes are generated for each block by form point extraction unit 12 and node generation unit 13. As a result, the nodes N1–N27 in FIG. 9D are generated. In FIG. 9D, the nodes due to form-defining points are N1, N3, N5, N8, N11, N12, N21 and N25–N27 and the nodes due to vertices of the blocks are N1–N25, with the points where a form-defining point coincides with a vertex of a block each being considered as one node. In this example, since the points on the boundary of the geometric model where there is no intersection with the block boundary all coincide with the block vertices, there are no form-defining points of the geometric model which are not block vertices on the block boundary. However, supposing that there were a point of the geometric model due to the intersection of the boundaries of the geometric model and the block boundary or a point which is not a block vertex, such points would also be set as form-defining points. The nodes generated by the above process are stored in node data storage unit 24.

In (S108), mesh element generation unit 14 generates mesh elements for each block according to the process described above, based on the node data stored in node data storage unit 24.

In (S109), it is determined whether mesh elements have been generated for every block, with mesh element generation being repeated until mesh elements have been generated for every block. Here, the generated mesh elements are stored in mesh element data storage unit 25.

As a result of the aforementioned operation, triangular mesh elements are generated in each block, as shown by the solid lines and dashed lines in FIG. 9D. In this drawing, the solid lines show the division of blocks while the broken lines and solid lines (in fact, broken lines which coincide with solid lines and which are shown as solid lines) show the mesh elements.

Figure 40A:
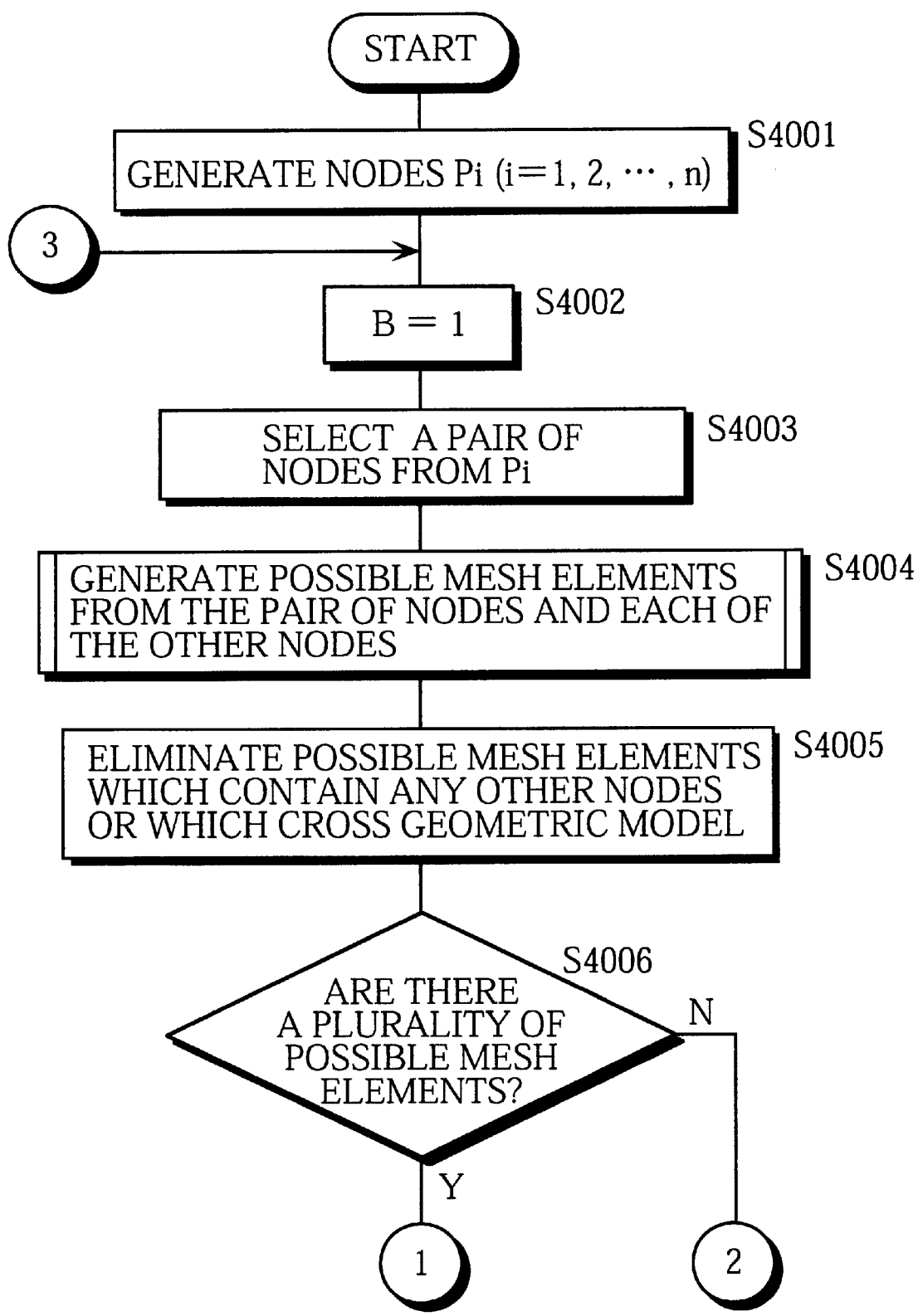
FIGS. 40A–40C show the mesh generation step shown in FIG. 8 in greater detail.
Figure 40B:
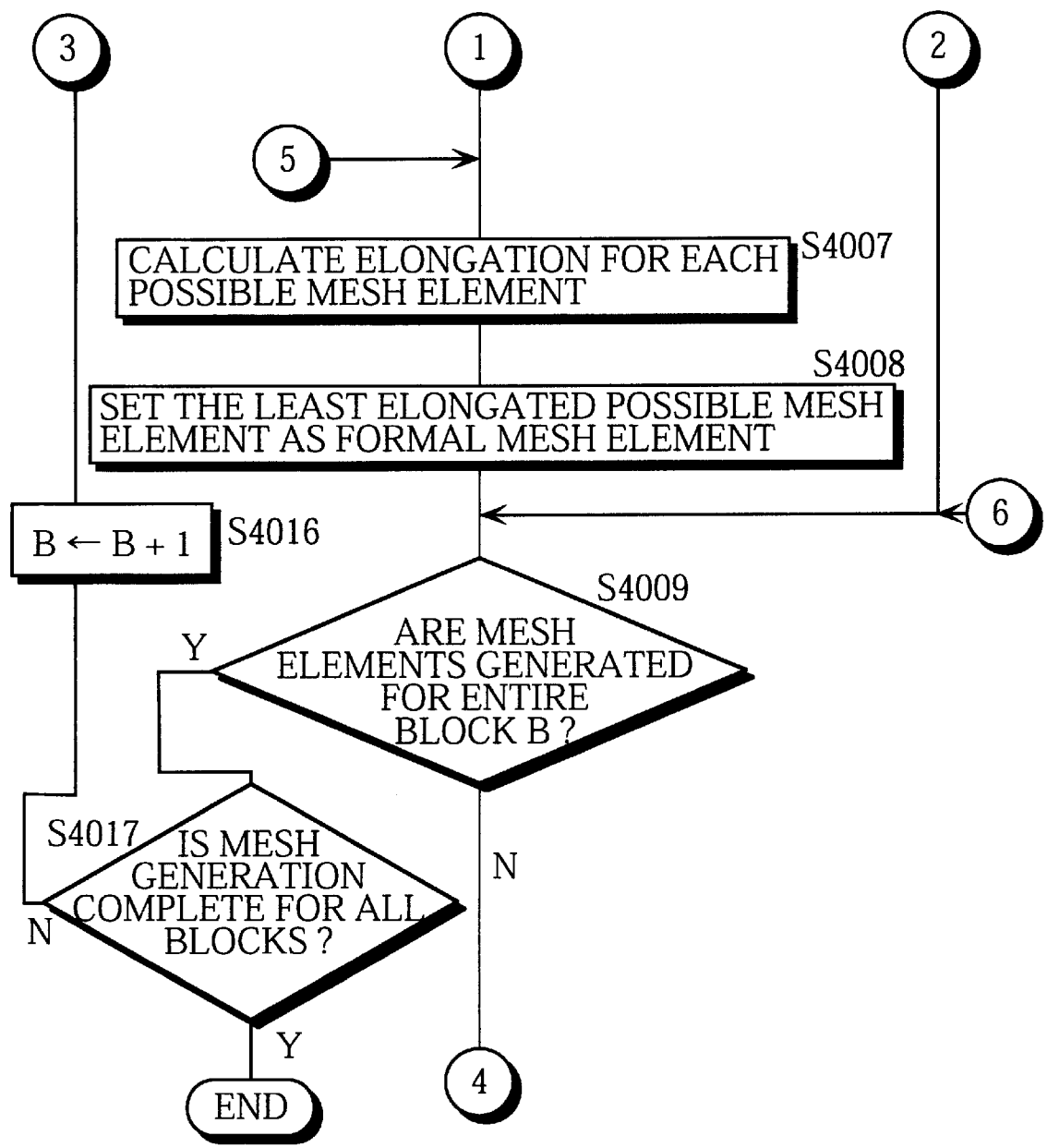
Figure 40C:
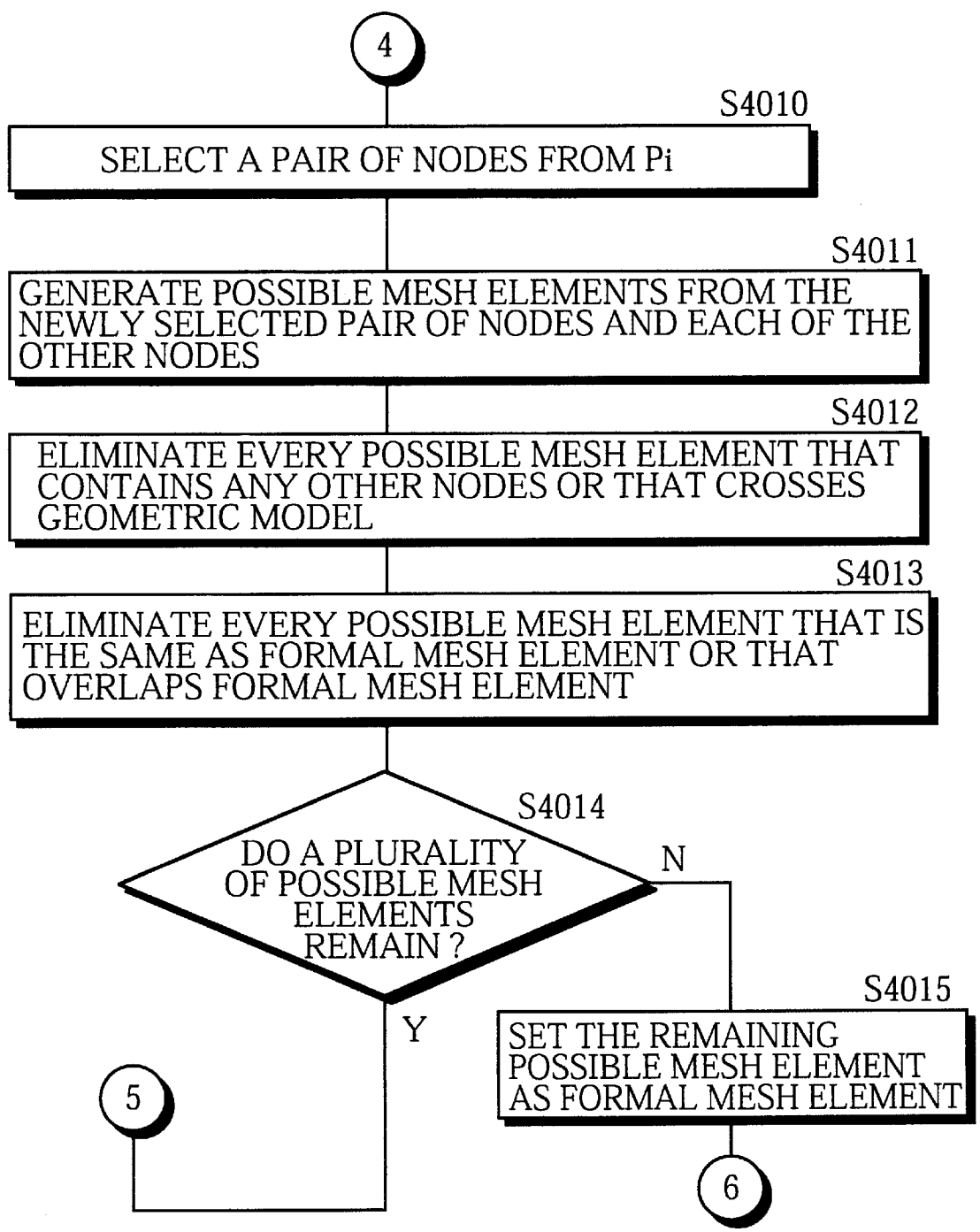

FIGS. 40A–40C are flowcharts showing the mesh generation step (S106) shown in FIG. 8 in greater detail. In (S4001) in FIG. 40A, nodes for every block are extracted, as described above, the extracted nodes include vertices of a block, intersection points between the block and a geometric model, and points which define the form of the geometric model present in the block.

In (S4002), "B-1" shows block number 1. After the mesh generation region was divided into the blocks in steps S101 and S102 in FIG. 8, each of the blocks is given a block number, such as in order from the smallest x and y coordinates to the largest x and y coordinates. In (S4002), block 1 is selected to be processed.

In (S4003), a pair of nodes present in block 1 are selected from the extracted nodes Pi. Here, the pair of nodes is selected from a line segment at the bottom edge of block 1, as described in FIG., 6. Line segments which have another node between a pair of nodes or which cross the geometric model are excluded here, so that endpoints of a line segment aside from the excluded line segments are selected as a pair of nodes.

In (S4004), triangles generated by joining the selected pair of nodes with each other and with each of the other nodes in block 1 are set as possible mesh elements.

Figure 41A:
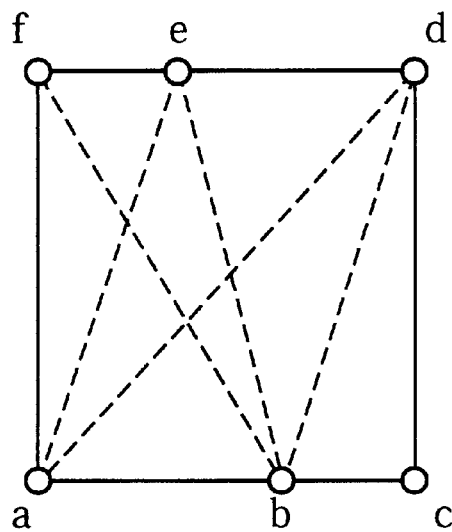
FIGS. 41A–41D show the process of mesh generation according to the processing method shown in FIGS. 40A–40C.

FIG. 41A shows a block with the six nodes a-f same as that shown in FIG. 7A. As shown in the figure, the possible triangular mesh elements abf, abe and abd are generated when the line segment al at the bottom edge of the brook is selected in step S4003.

Figure 41B:
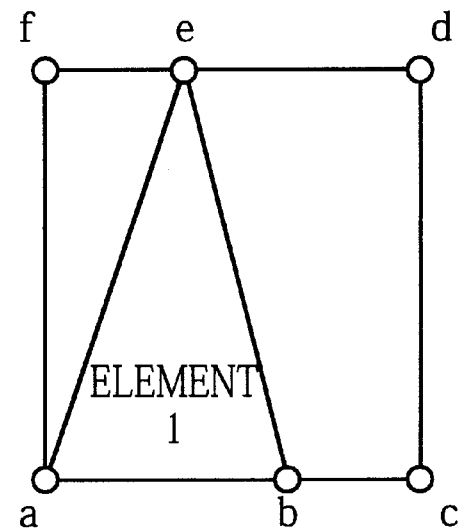

After generating the possible mesh elements, it is judged in (S4005) whether each possible mesh element encloses an area including any node aside from its vertices and whether each possible mesh element crosses the geometric model. All possible mesh elements that satisfy any of the above conditions are excluded from possible mesh elements. Then it is judged in (S4006) whether there are a plurality of possible mesh elements remaining after (S4005). It there are a plurality of possible mesh elements, the elongation is calculated for each possible mesh element in (S4007), and the least elongated of the possible mesh elements is selected as a formal mesh element in (S4008). When the least elongated of the three possible mesh elements abf, abe, and abd in FIG. 41A is abe, abe is set as mesh element 1 as shown by the solid lines in FIG. 41B, and the other possible mesh elements abf and abd are deleted.

Figure 41C:
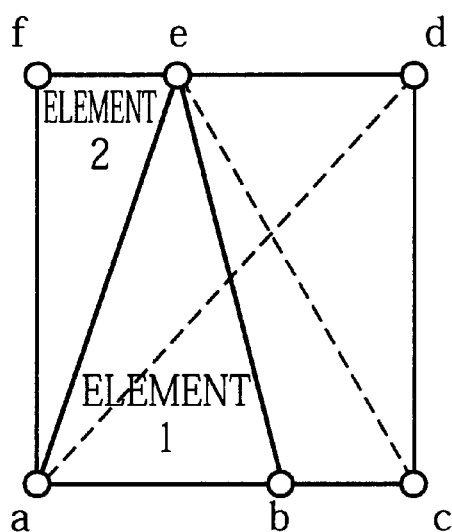

After the formal mesh element is generated in (S400B), it is judged in (S4009) whether mesh elements are generated for the entire block 1. If block 1 has not yet entirely been covered with mesh elements, a pair of nodes in block 1 is selected from Pi in (S4010). Here, the selection of a new pair of nodes is arbitrarily made, such as by selecting one of the two line segments ae and be that forms mesh element 1 generated in (S4008) and that was not selected in (S4003) for generating mesh element 1. Here, line segments which contain another node between a pair of nodes or which cross the geometric model are excluded, so that a pair of nodes is selected from a line segment aside from the above excluded line segments in the same way as (S4003). For instance, when the line segment ae is selected in (S4010), possible mesh elements generated by joining two nodes a and e with each other and with each of the other nodes present in block 1 in (S4011) are the triangles aef, aeb, aec, and aeb shown in FIG. 41C.

Among these possible mesh elements, each possible mesh element which encloses an area including any node aside from its vertices or which crosses the geometric model is eliminated in (S4012), and each possible mesh element that is the some as or overlaps an existing mesh element is eliminated in (S4013). Accordingly, the possible mesh elements aed and aec which overlap mesh element 1 and the possible mesh element abe which is the same as mesh element 1 are eliminated, and as a result the remaining possible mesh element aef is set as mesh element 2 in (S4015).

Figure 41D:
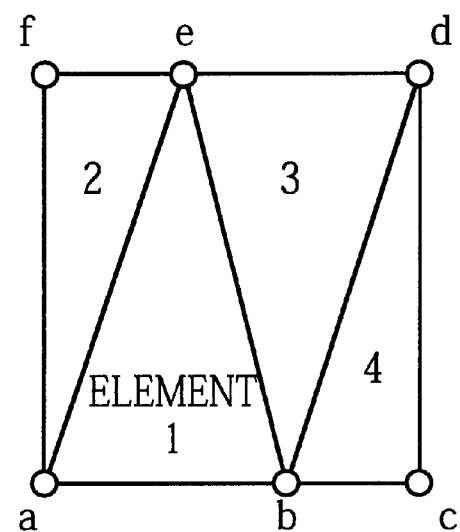

The procedure then returns to step S4009 and, if it is judged that mesh elements have not been generated for the entire block 1, the above mesh generation is further performed an a part of block 1 that has not been covered with mesh elements. On the other hand, if there remain a plurality of possible mesh elements in (S4014), the procedure returns to step S4007 and steps S4007, S4008 are performed on those remaining possible mesh elements to select a formal mesh element. The above processing is repeated until the entire block is covered with mesh elements. Then, the block number is updated in (S4016) and the same processing is performed on the new block. On completing the mesh generation for all of the blocks in (S4017), the procedure ends. FIG. 41D shows a state where mesh is generated for the entire block 1 according to the procedure shown in FIG. 40.

Figure 42:
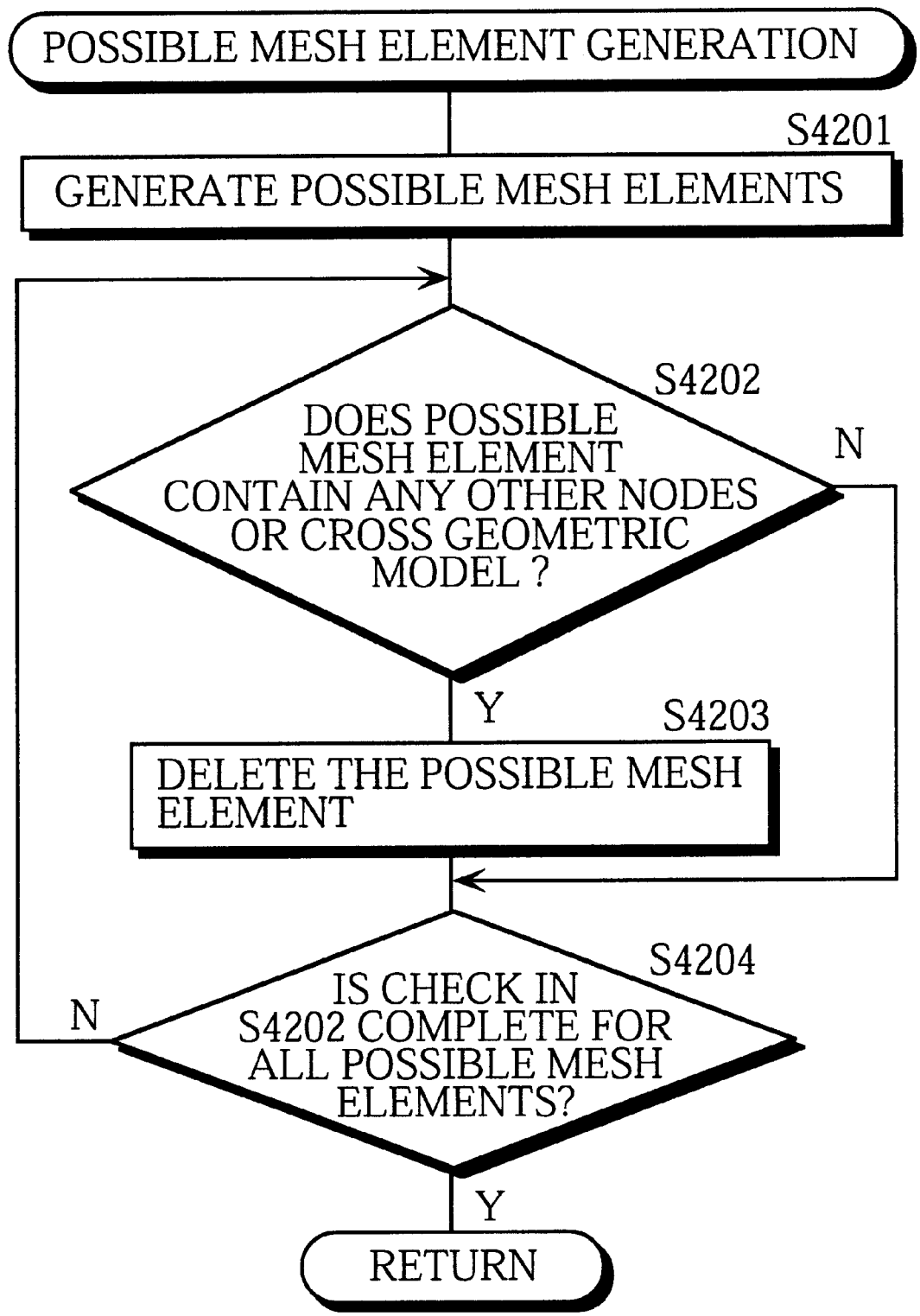
FIG. 42 shows a subroutine used in steps S4005 and S4012 shown in FIG. 40.
Figure 43A:
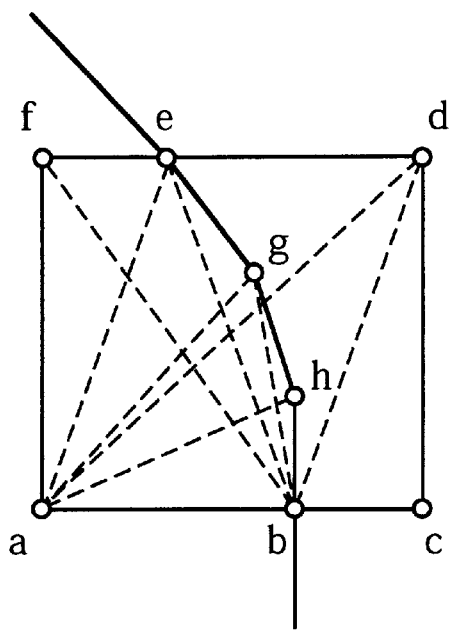
FIGS. 43A–43D show an example of mesh generation that uses the subroutine in FIG. 42.
Figure 43B:
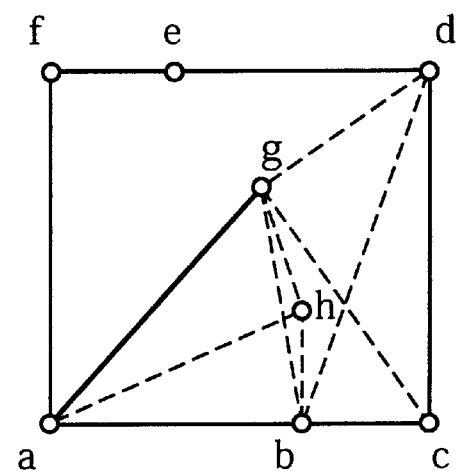
Figure 43C:
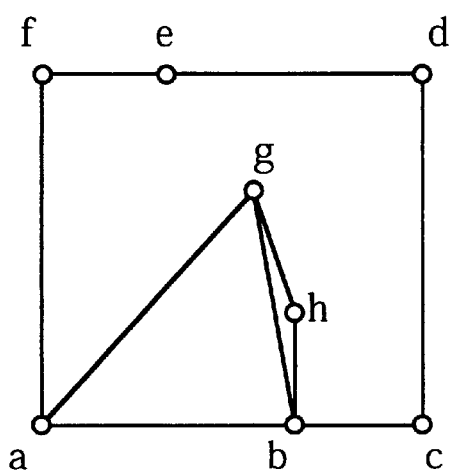
Figure 43D:
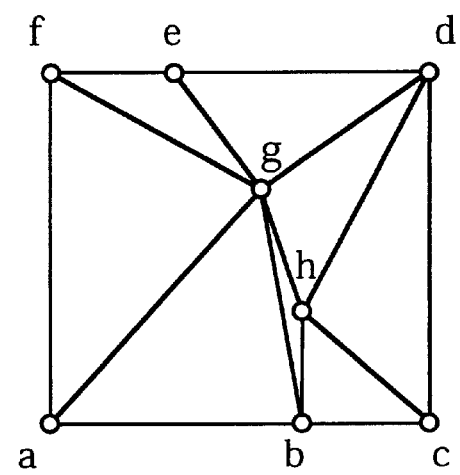

FIG. 42 shows a subroutine used in steps S4005 and S4012 in FIG. 40 for excluding possible mesh elements which meet the predetermined conditions. When nodes (g and h in FIG. 43A), such as vertices or endpoints of a geometric model, are present within a block, this subroutine is effectively used to generate mesh through use of such node. In FIG. 43A, when two nodes a and b at the bottom edge of the block are selected and the line segment ab is joined with each of the other nodes, five triangles abf, abe, abg and abd are generated as possible mesh elements. Among these, a region enclosed by the possible mesh element abd contains the vertex h of the geometric model. If such a possible mesh element that contains a vertex of the geometric model is selected as a formal mesh element, the contained vertex of the geometric model can no longer be used as a vertex of a mesh 1 element, so that mesh generation becomes incomplete. To avoid this, every possible mesh element which contains a vertex or endpoint of the geometric model is excluded from possible mesh elements, so that a formal mesh element can be selected from the remaining possible mesh elements. The above procedure corresponds to steps S4202–S4204 shown in FIG. 42. FIGS. 43A–43D show an example of mesh generation based on the flowcharts in FIGS. 40 and 42 for a block that contains vertices and/or endpoints of a geometric model.

As can be understood from the preceding explanation, when mesh generation is executed using the present embodiment, it is only necessary for the user to convert the object to be analyzed into a model and generate geometric model data, to set the block division method for fine division of blocks and to judge whether block division is satisfactory. Here, since the object to be analyzed is input as x, y, z coordinate values, the user can consider these x, y, z coordinates as standards. Also, since it is very common for a user to conceive of the form of three-dimensional objects to be analyzed as having a left-right dimension and an up-down dimension (and a depth dimension), it is easy for the user to verify the block division, especially when it is a division into equal parts. As a result, there is a great reduction in the amount of necessary operations when compared to conventional techniques, which makes the system easier to master.

Here, when actually performing analysis, special physical property values and the like need to be input, although in this case most of these can be input as x, y (and z) coordinates, so that the correspondence between each block and the physical property values and material values of that part can easily be understood.

Furthermore, since the relation between (i) the divided blocks and their nodes and (ii) the lines and surfaces in the geometric model is extremely simple, the generation of mesh elements for each block can be executed in a short time, which leads to a great reduction in the time taken by mesh generation for the entire mesh generation region.

Also, by dividing objects to be analyzed which have complex forms into small blocks, the form of the object to be analyzed which is present in one block becomes extremely simple. This fine division of a complex form can also be seen to be necessary for numerical analysis to be executed accurately. As a result, objects to be analyzed of complex form can be analyzed with a high degree of accuracy, with simple blocks and mesh being generated.

Furthermore, while the present embodiment has been explained using an example where all of the mesh generation region is divided into equal blocks, blocks which require further fine division can be divided by giving an appropriate indication, enabling simple achievement of fine division of blocks. This in turn means that block division of an appropriate grading for the form of the geometric model can be achieved.

For the sake of convenience in explaining the present embodiment, the outline form of the geometric model of the mesh generation region was given as a rectangle which can easily be divided into equal parts, although it should be obvious that the present technique is not limited to such rectangles. For example, the following would apply for the non-rectangular form of mesh generation region 32 shown in FIG. 2A. First, a rectangular virtual mesh generation region is generated surrounding mesh generation region 32. Next, once a mesh has been generated for the entire virtual mesh generation region, the unnecessary portion between the virtual mesh generation region and mesh generation region 32 is removed. By executing this process, only mesh for the necessary geometric model is obtained.

While two-dimensional blocks and geometric models have been used in the above embodiment, the present invention can also be applied to three-dimensional blocks and geometric models. In such a case, mesh elements are generated as three-dimensional elements (hereinafter, polyhedron mesh elements). In polyhedron mesh generation, first a polygon mesh element is created using node information on vertices of a block, points that define a form of a geometric model, and intersection points and lines between the block and the geometric model, and then vertices of the created polygon mesh element are connected with one of nodes aside from the vertices of the polygon mesh element to form a polyhedron mesh element. Note here that the following points should be taken into consideration in polyhedron mesh generation.

Figure 44:
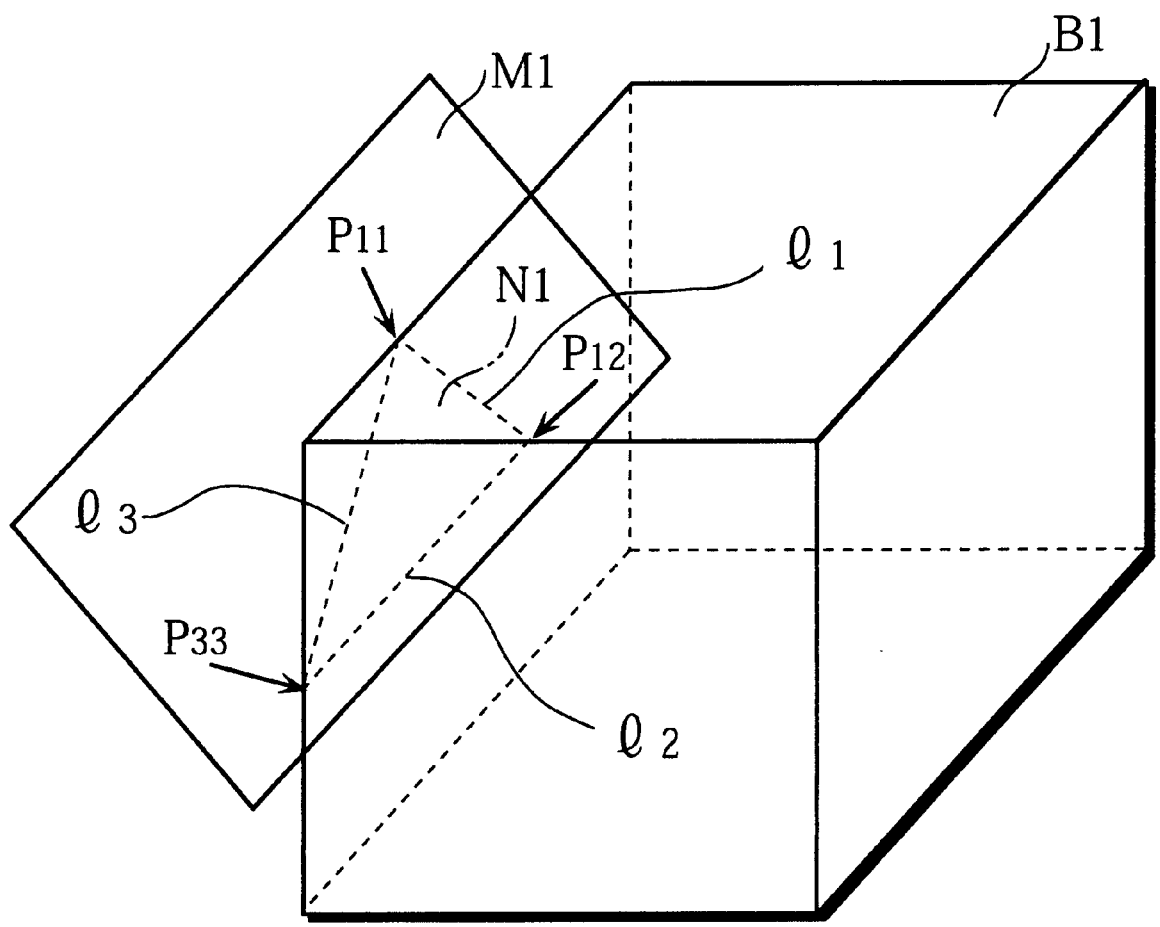
FIG. 44 shows an intersection surface between a block and a geometric model.

(1) Since a block and a geometric model are both three-dimensional, parts at which the geometric model intersects the boundary of the block are not limited to a point but include an area, such as surface N1 encircled by three lines 11, 12, and 13 in FIG. 44. In the Figure, B1 is a block, M1 is a surface of a geometric model, and P11, P12, and P13 are endpoints of lines 11–13. Note that in the mesh generation device of the present invention, information related to the points P11–P13 is expressed by formulas on the three-dimensional coordinate system, so that such points can be easily obtained using those formulas.

Figure 45A:
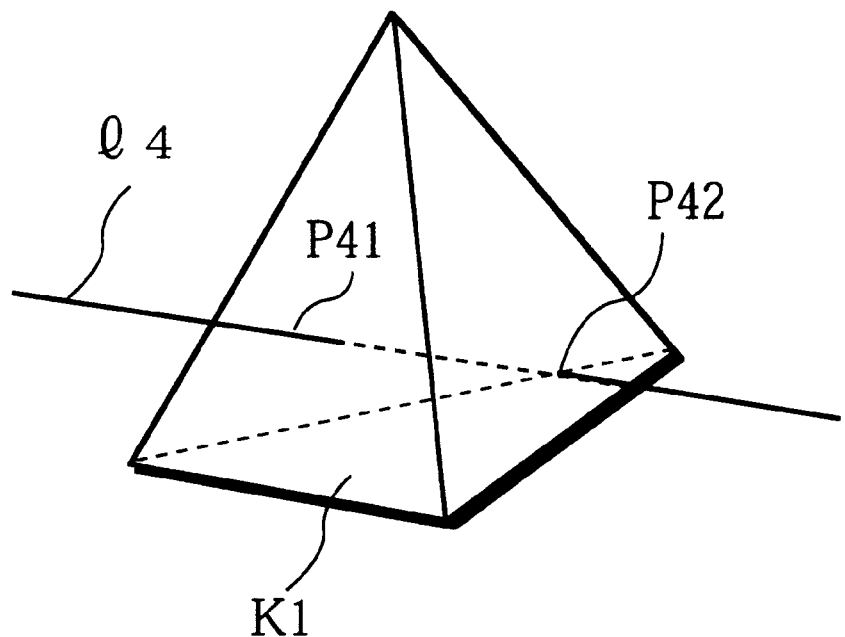
FIGS. 45A and 45B show possible polyhedron mesh elements which cross a line or surface of a geometric model.
Figure 45B:
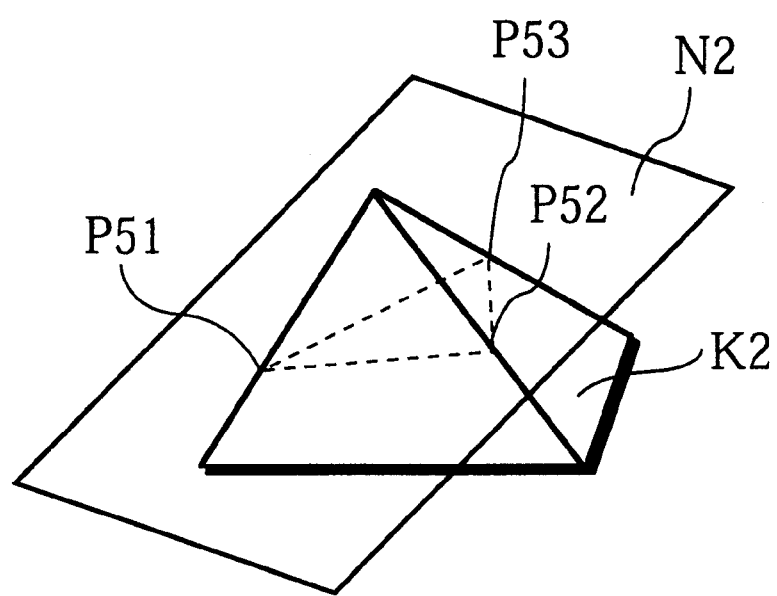

(2) When selecting one of a plurality of possible polyhedron mesh elements, it is necessary to exclude not only each possible polyhedron mesh element that contains any node aside from its vertices but also each possible polyhedron mesh element that, as a result of crossing a geometric model, prompts a need to create new nodes. In other words, every possible polyhedron mesh element which, though not containing any other nodes, crosses a line or surface of the geometric model is eliminated. FIGS. 45A and 45B show possible polyhedron mesh elements that cross such a line or surface. In the Figures, K1 and K2 are possible polyhedron mesh elements, 14 is a line of a geometric model, and N2 is a surface of a geometric model. K1 and K2 are excluded from possible polyhedron mesh elements, since intersection points P41 and P42 between possible polyhedron mesh element K1 and line 14 and intersection points P51, P52 and P53 between possible polyhedron mesh element K2 and surface N2 need to be set as new nodes.

In the mesh generating device of the present invention, information on such lines and surfaces is expressed by formulas on the three-dimensional coordinate system, and information on possible polyhedron mesh elements is expressed by formulas which show each surface of a polyhedron mesh element on the same coordinate system. Accordingly, a state of a possible polyhedron mesh element crossing any of the above lines and surfaces can be geometrically obtained without difficulty, so that the exclusion of possible polyhedron mesh elements which cross any of such lines and surfaces can be automatically executed.

Figure 46:
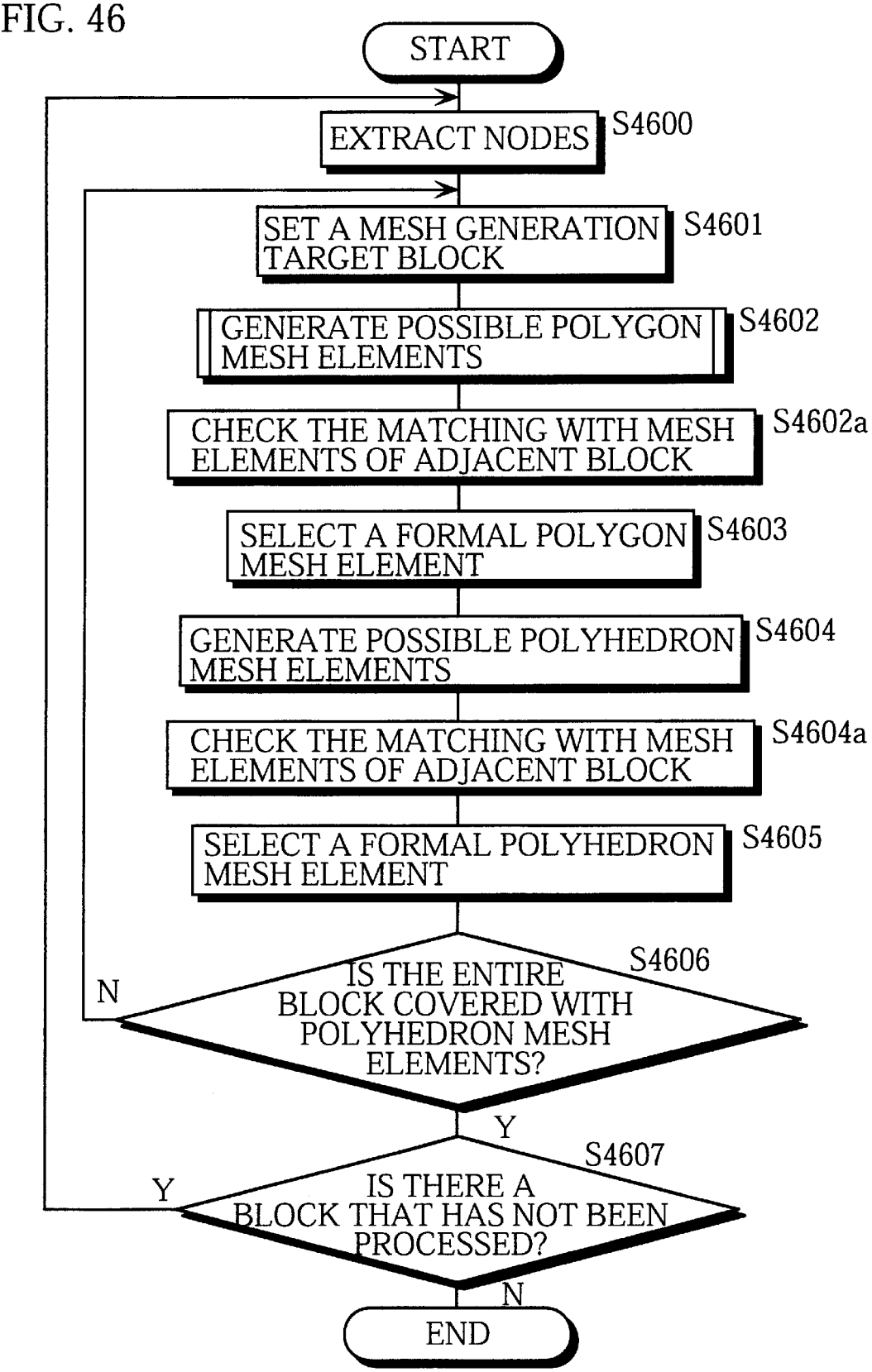
FIG. 46 is a flowchart showing the polyhedron mesh generation processing.

FIG. 46 is a flowchart showing the method of generating polyhedron mesh based on the above selection conditions. In (S4600), vertices of each block, points which define a form of a geometric model present in each block, and intersection points between each block and the geometric model are extracted as nodes for each block. Here, the points defining the form of the geometric model are extracted from input data for the geometric model which was inputted in the mesh generating device in advance. The intersection points between each block and the geometric model include endpoints of lines at which a block intersects the geometric model In (S4601), one of the blocks is selected as the mesh generation target block.

Figure 47:
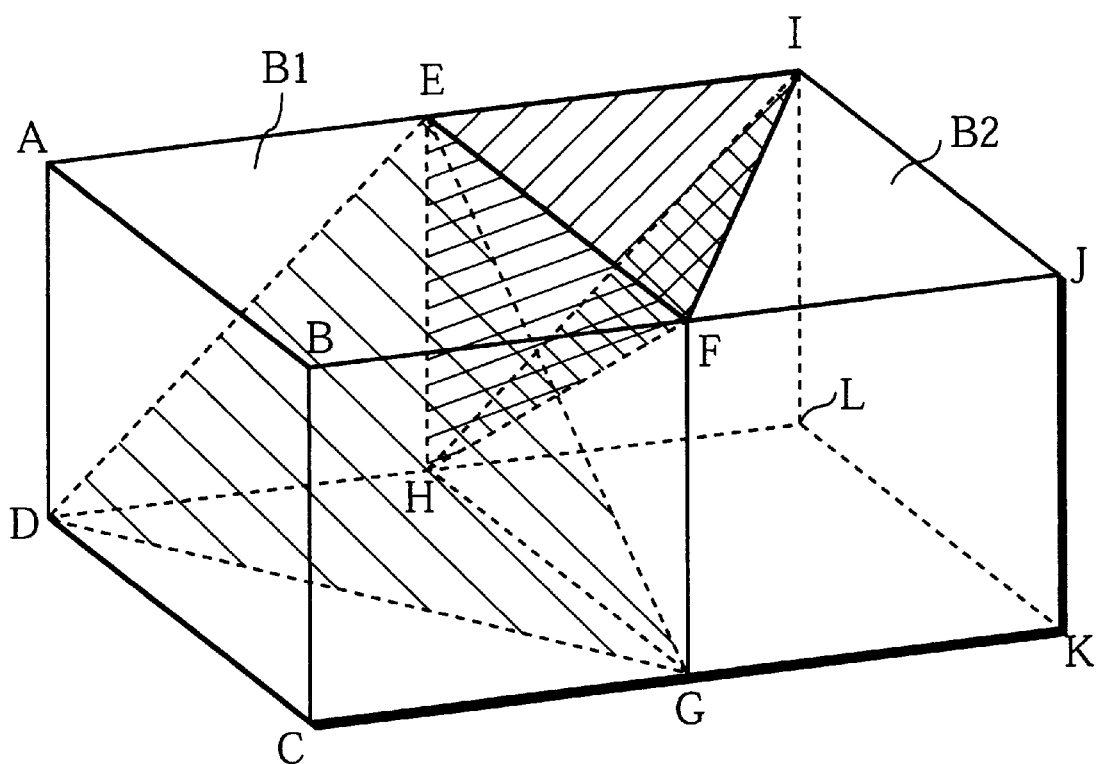
FIG. 47 shows a state where a possible mesh element on a boundary of a block does not match a mesh element of an adjacent block on the boundary.

In (S4602), combinations of three nodes are arbitrarily selected from all nodes in the target block to generate possible polygon mesh elements. Here, it is judged for each possible polygon mesh element present on a boundary of the target block whether it matches an existing polygon mesh element of the adjacent block on the boundary in (S46021a). In FIG. 47, for example, when target block B1 is adjacent to block B2 in which mesh has already been generated and possible polygon mesh element EHG is generated in target block B1, possible polygon mesh element EHG does not match a pattern of polygon mesh element EHF of polyhedron mesh element EHFI in block B2 on the boundary between the two blocks. It is necessary to avoid such inconsistency between two adjacent blocks, so that every possible polygon mesh element of the target block which does not match an existing mesh element of an adjacent block on a boundary of the two blocks is excluded from possible polygon mesh elements.

In (S4603), among the possible polygon mesh elements remaining after (S4602), each possible polygon mesh element which does not contain any node aside from its vertices and which does not cross the geometric model and prompt a need to create new nodes is selected, When there in only one possible polygon mesh element that satisfies the above conditions, that possible polygon mesh element is set as the formal polygon mesh element. When, on the other hand, there are a plurality of possible polygon mesh elements that satisfy the conditions, the least elongated of the possible polygon mesh elements is selected as the formal polygon mesh element. In (S4604), all vertices of the generated formal polygon mesh element are connected with each of other extracted nodes in the target block to form possible polyhedron mesh elements. Here, each polyhedron mesh element whose surface is on a boundary of the target block and does not match an existing mesh element of an adjacent block on the boundary is excluded from the possible polyhedron mesh elements in (S4604a) for the same reason as step S4602a.

In (S4605), among possible polyhedron mesh elements remaining after (S4604), each possible polyhedron mesh element which satisfies the same conditions as (S4603) is selected. When there is only one possible polyhedron mesh element that satisfies the conditions, that possible polyhedron mesh element is set as the formal polyhedron mesh element. When, on the other hand, there are a plurality of possible polyhedron mesh elements that satisfy the conditions, the least elongated of the possible polyhedron mesh elements is selected as the formal polyhedron mesh element.

The above procedure is repeated until the entire region of the target block is covered with polyhedron mesh elements in (S4606), and then the same processing is performed on the next block in (S4607).

Second Embodiment

Figure 10:
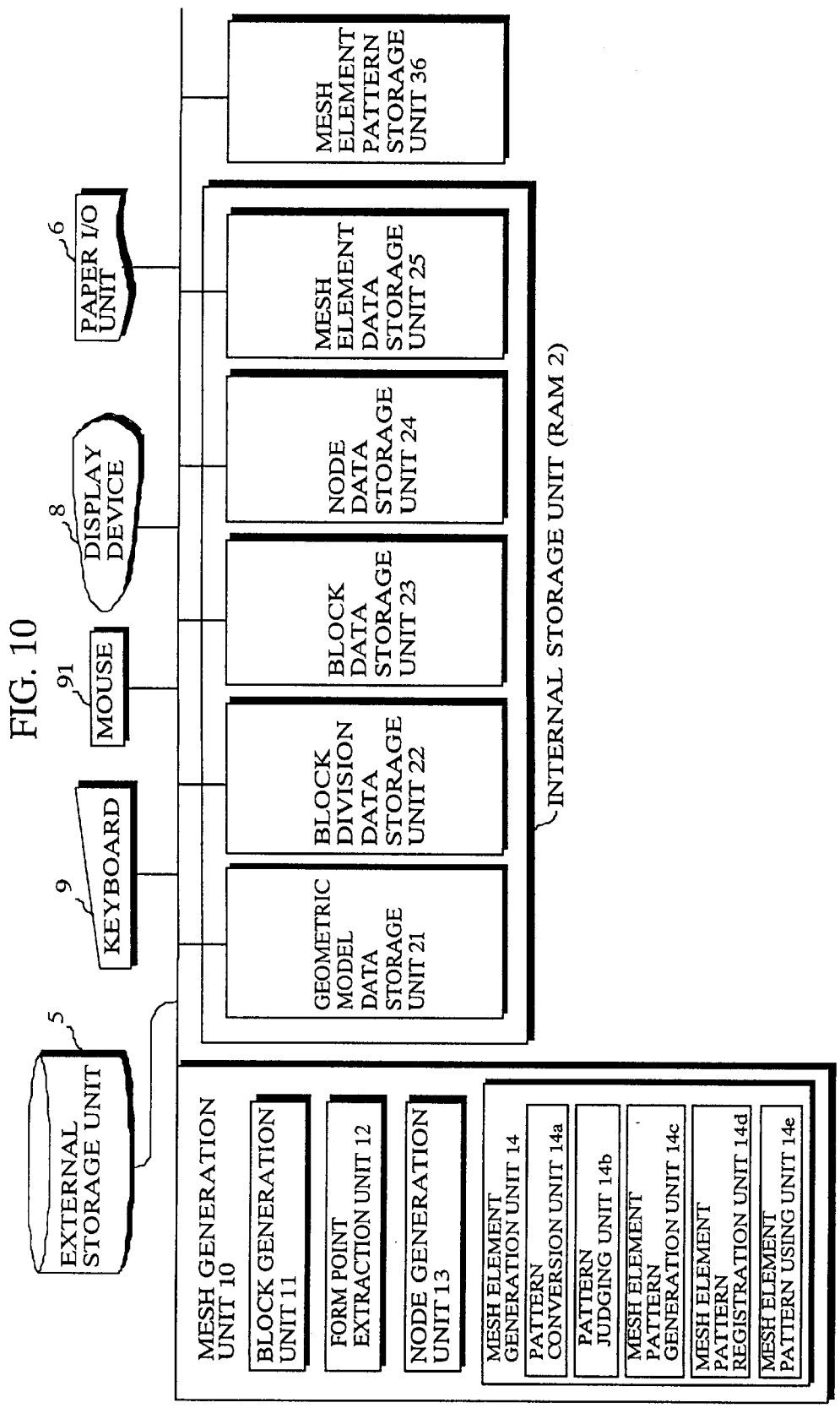
FIG. 10 shows the construction of the mesh generation device to which the second embodiment of the present invention relates.

FIG. 10 shows the construction of the mesh generation device of the second embodiment. The difference between this embodiment and the previous embodiment lies in provision of mesh element pattern storing unit 36 for storing a mesh element pattern corresponding to each block pattern. Also, mesh element generation unit 14 includes pattern conversion unit 14a, pattern judging unit 14b, mesh element pattern generation unit 14c, mesh element pattern registration unit 14d and mesh element pattern using unit 14e. Here, pattern conversion unit 14a sorts each of the blocks according to pattern, based on geometric interrelations between nodes and, if present, on geometric relations between any of points, lines and surfaces present in a block and on a block boundary which are necessary for defining the form of the geometric model and nodes. Pattern judging unit 14b then judges whether the pattern of a block obtained by pattern conversion unit 14a is registered in mesh element pattern storing unit 36. Mesh element pattern generation unit 14c generates mesh element patterns based on nodes, for each block pattern which is judged by pattern judging unit 14b as not being registered in mesh element pattern storing unit 36. Mesh element pattern registration unit 14d registers the mesh element patterns generated by mesh element pattern generation unit 14c and the corresponding block patterns in mesh element pattern storing unit 36. Mesh element pattern using unit 14e generates the mesh elements for each block using the mesh element pattern stored in mesh element pattern storing unit 36 in accordance with the block pattern. It should be noted here that the construction of mesh generation unit 10 is the same as in the first embodiment, and again is achieved through the execution of a program by the computer, the program being stored beforehand on a recording medium.

Figure 11:
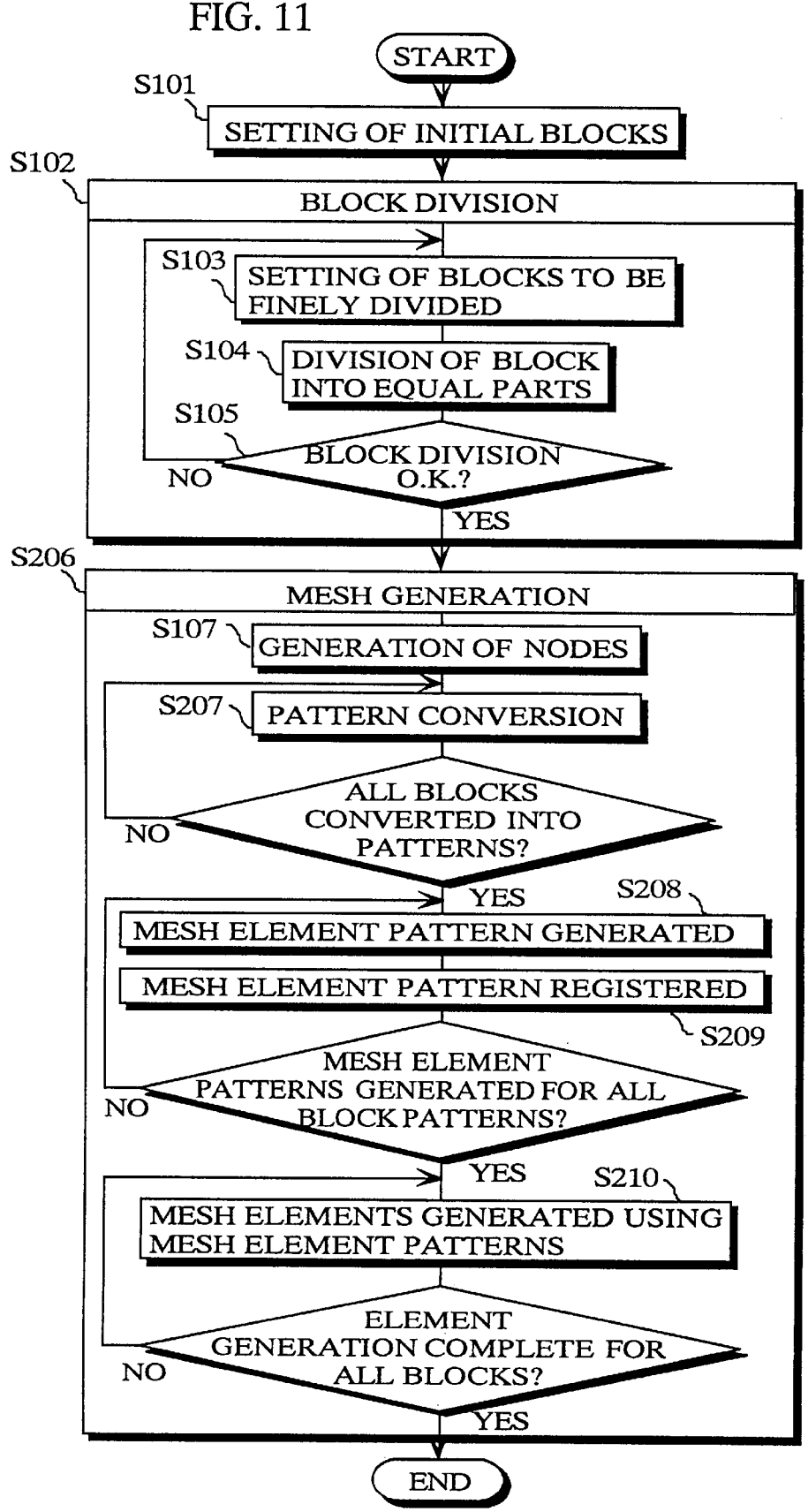
FIG. 11 shows the first processing method for mesh generation to which the second embodiment relates.

FIG. 11 shows the processing method for the generation of mesh for numerical analysis to which the second embodiment relates. In comparison with the first embodiment, the present mesh generation procedure differs from that shown in FIG. 8 (S106) by including a process (S207) for sorting each of the blocks according to pattern, based on geometric interrelations between nodes and, if present, on geometric relations between any of points, lines and surfaces present in a block and on a block boundary which are necessary for defining the form of the geometric model and nodes, a process (S208) for generating a mesh element pattern for each block pattern, a process for registering mesh element patterns (S209) and a process (S210) for generating the mesh elements for each block using a mesh element pattern in accordance with a block pattern.

First, the following explanation will deal with the sorting of blocks by pattern. Examples of block pattern are shown in FIGS. 12A–12F. Of these, FIG. 12A shows a block whose nodes are simply the block vertices N1–N4. FIG. 12B shows a block pattern when one node N5, which is a mid-point of one of the line segments, is present. FIG. 12C shows a block pattern when two nodes N5, N6, which are mid-points of two adjacent line segments, are present. FIG. 12D shows a block pattern when two nodes N5, N7, which are mid-points of two opposite line segments, are present. FIG. 12E shows a block pattern when three nodes N5–N7, which are mid-points of three of the line segments, are present. Finally, FIG. 12F shows a block pattern when four nodes N5–N8, which are the mid-points of all four line segments, are present.

It should be noted here that these drawings only show example block patterns, so that when there is a great difference in size between adjacent blocks or when lines and surfaces of the geometric model are present in a block, patterns are generated where an increase in the number of nodes or in the points, lines and surfaces of the geometric model are taken into consideration.

Here, a same pattern of mesh elements is generated for blocks which have a same pattern. For example, every block which has nodes N5, N6 at the mid-points of two adjacent line segments will have the mesh element pattern shown in FIG. 12C. To put this in other words, if the mesh element pattern corresponding to a block pattern is known, the mesh elements for other blocks of the same block pattern can easily be generated by referring to the mesh element pattern which corresponds to this block pattern.

When blocks are generated by repeatedly dividing regions into equal parts, a very large number of identical block patterns are generated. For the example of FIG. 9D, since there are only the two patterns shown in FIG. 13, only two sets of mesh element pattern data are necessary for all of the blocks. Accordingly, if mesh element generation is performed for each block by sorting all of the blocks by pattern and using mesh element pattern data for each block pattern, the calculation necessary for mesh element generation for all of blocks which have a same pattern as the blocks shown in FIG. 9D only has to be executed once. In this way, a large reduction in the time needed for calculation for the entire mesh generation region can be achieved. It should be noted here that this investigation of patterns is performed by investigating the pattern of each block by searching for vertices in order, starting with a vertex which is closest to the origin of each block which is found by giving preference to a vertex with a lowest x coordinate, and selecting a vertex with a lowest y coordinate when a plurality of vertices have the same lowest x coordinate.

As specific methods, blocks can be sorted using information such as the number of nodes created from adjacent block vertices, the number of nodes from intersection of the boundaries of the block and the geometric model, the number of nodes due to vertices of the geometric model, or the number of sides of the geometric model in a block. When sorting the blocks, each block is given a pattern identification number corresponding to its pattern. Examples of this are shown in FIG. 14. Here, it should be clear that blocks with a same pattern are given a same pattern identification number.

FIG. 14 shows a table which classifies the blocks using the block patterns, based on the information in the columns headed "Nodes due to vertices of an adjacent block", "Nodes due to intersection of the block and geometric model boundaries", "Nodes due to vertices of geometric model" and "No. of sides of geometric model". In this table, blocks 2 and 4 have a same pattern and so have been given the same pattern identification number "2". Here, pattern identification number "1" corresponds to the pattern shown in FIG. 12A. Pattern identification number "2" corresponds to the pattern shown in FIG. 12B. Pattern identification number "3" corresponds to the pattern shown in FIG. 12C. Pattern identification number "4" corresponds to the pattern shown in FIG. 12D. Here, the above patterns are for when each node is due to the vertices of the block, so that if in FIG. 12C, nodes N5 and N6 are due to intersections of the boundaries of the block and geometric model, the dashed line connecting N5 and N6 will actually be a line segment of the geometric model, with this pattern being given the pattern identification number "5" (see the entry for block number 6). Similarly, if in FIG. 12C, if there is a node NC due to a form-defining point of the geometric model which is located in the center of a square block (at the intersection of N1N4 and N2N3), then there will be two line segments of the geometric model NCN5 and NCN6 in the block, with this pattern being given the pattern identification number "6" (see the entry for block number 7).

Here, pattern identification numbers can be set so as to be composed of "Nodes due to vertices of adjacent blocks", "Nodes due to intersection of block and geometric model boundaries", "Nodes due to vertices of geometric model" and "Number of sides of geometric model" listed in order to give numbers such as "0000000", "1000000", "1100000", "1010000", "0000201" or "0000212" in which a clear relation between the pattern and its pattern identification number is expressed. By doing so, patterns can be understood from their pattern identification numbers alone. When fixed pattern identification numbers are used in mesh generation, the judgement of whether there is a mesh element pattern which corresponds to a pattern can be made by simply comparing pattern identification numbers, so that it is no longer necessary to make judgements on the existence of mesh element data corresponding to the pattern by comparing the number of nodes created from vertices of adjacent blocks, the number of nodes from intersection of the block and geometric model boundaries, the number of nodes due to vertices of the geometric model, or the number of sides of the geometric model.

FIG. 11 shows the processing method for numerical analysis mesh generation to which the second embodiment relates, under the premises described above. This method also generates the mesh shown in FIG. 9D for the geometric model shown in FIG. 9A. The processing method in the present embodiment is the same as in the first embodiment as far as (S107), so that no further explanation of this part will be given and the following explanation will start at (S207).

In the steps up to (S107), nodes N1–N27 are generated as shown in FIG. 9D. Following this, pattern conversion unit 14a sorts the blocks by pattern, by investigating "Nodes due to vertices of adjacent block", "Nodes due to intersection of block and geometric model boundaries", "Nodes due to vertices of geometric model" and "Number of sides of geometric model" for each block (S207). As a result, the blocks are sorted into the two kinds of block pattern shown as FIG. 13A and FIG. 13B.

Next, mesh element pattern generation unit 14c generates a mesh element pattern for each of these block patterns (S208). This generation of a mesh element pattern for each of block pattern is performed using the method described in the first embodiment, based on such information as the number of nodes due to the vertices of adjacent blocks and the number of nodes due to intersections of the block and the geometric model boundaries. However, when mesh elements are higher-order elements, or when mesh elements are quadrangular and the blocks are three-dimensional, an amended process and a suitable form of mesh elements are used. The generated mesh element patterns and block patterns are then registered in mesh element pattern storing unit 36 by mesh element pattern registration unit 14d.

Finally, mesh element pattern using unit 14e generates mesh elements for each block by using a mesh element pattern which corresponds to the block pattern for each block (S210).

Figure 15:
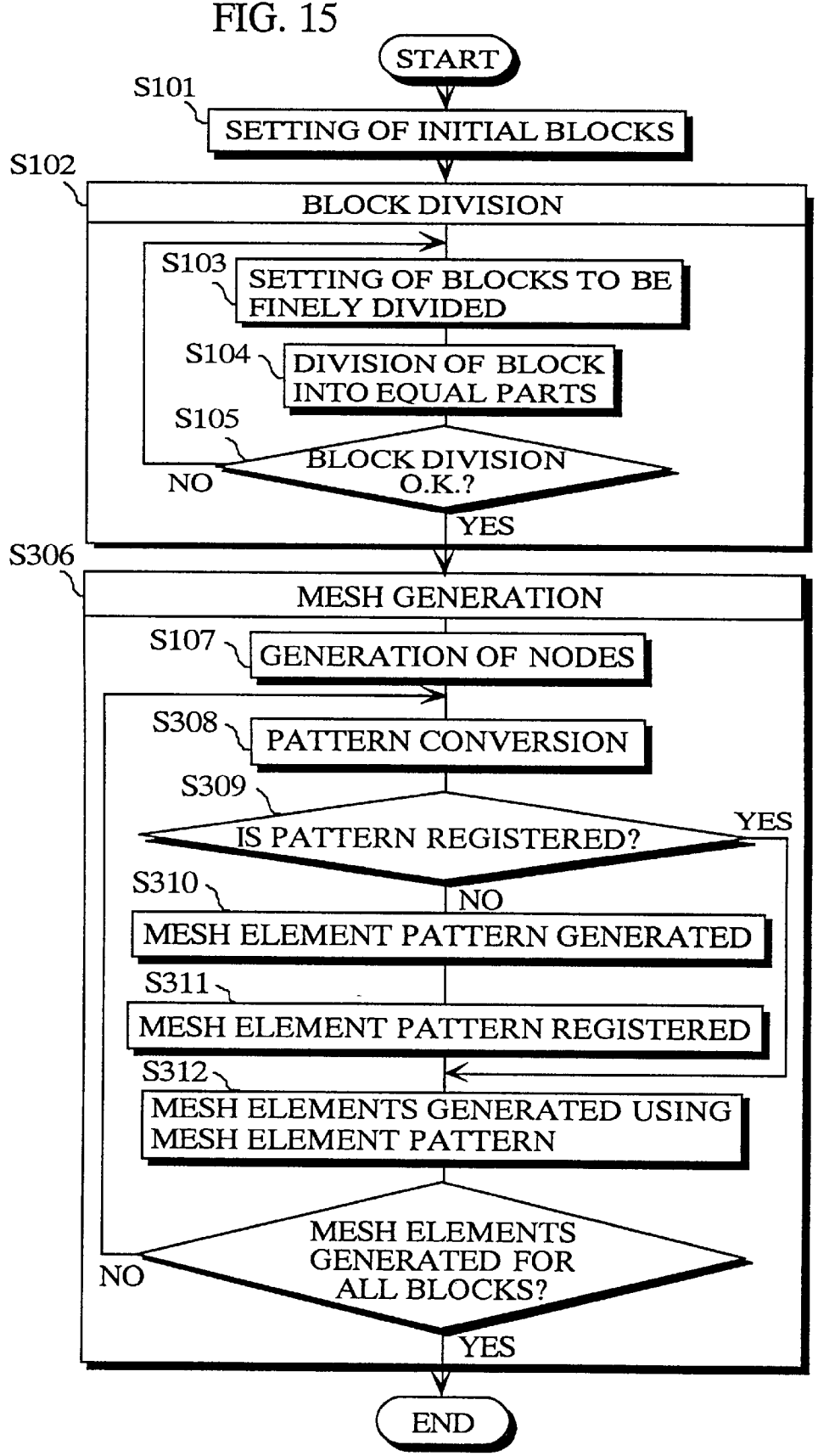
FIG. 15 shows the second processing method for mesh generation to which the second embodiment relates.

It should be noted here that in the above example, generation of a mesh element pattern for each block pattern is executed after converting all of the blocks in the mesh generation region into patterns and detecting all of the block patterns. However, it is also possible to use a method where one of the blocks is converted into a pattern, with an existing mesh element pattern corresponding to the generated pattern being used when available, or otherwise a corresponding mesh element pattern being generated. This method is shown by the flowchart in FIG. 15. It should be noted that for this case, the judgement of whether a corresponding mesh element pattern already exists or not is performed by the pattern judging unit 14b.

In general, it is normal for numerical analysis to be performed a number of times for an object to be analyzed with slightly modified conditions in order to obtain optimal design data. Even when supposing that this is not the case, there are still many incidences when, regardless of geometric form of the region to be analyzed, a large number of blocks with a same pattern will emerge due to the generation of small blocks by equally dividing the region to be analyzed parallel to the coordinate axes. As a result, it is also possible to write the data for a mesh element pattern of each block pattern which is generated during processing onto a disk or the like, not as data to be used during calculation, but as independent data with its own identification code, so that this can then be stored as part of a database. This is to say, a database can be formed of the data stored by mesh element pattern storing unit 36.

When generating mesh for performing numerical analysis of a different object, data in such a database can be used when a block pattern in the database corresponds to data for a block pattern which is present in this different object. In this way, generation of a mesh element pattern is only necessary when a corresponding pattern is not present in the database. By doing so, a great reduction in the time taken by generating mesh element data for each block can be made. Here, if newly-generated mesh element patterns are added to the database with their corresponding block patterns, the content of the database can be increased when mesh generation is performed, thereby enabling a reduction in the time taken by subsequent mesh generation operations and a reduction in the calculation time taken by numerical analysis of other objects. Examples of processing methods for mesh generation using a database are shown in FIGS. 16 and 17.

Figure 16:
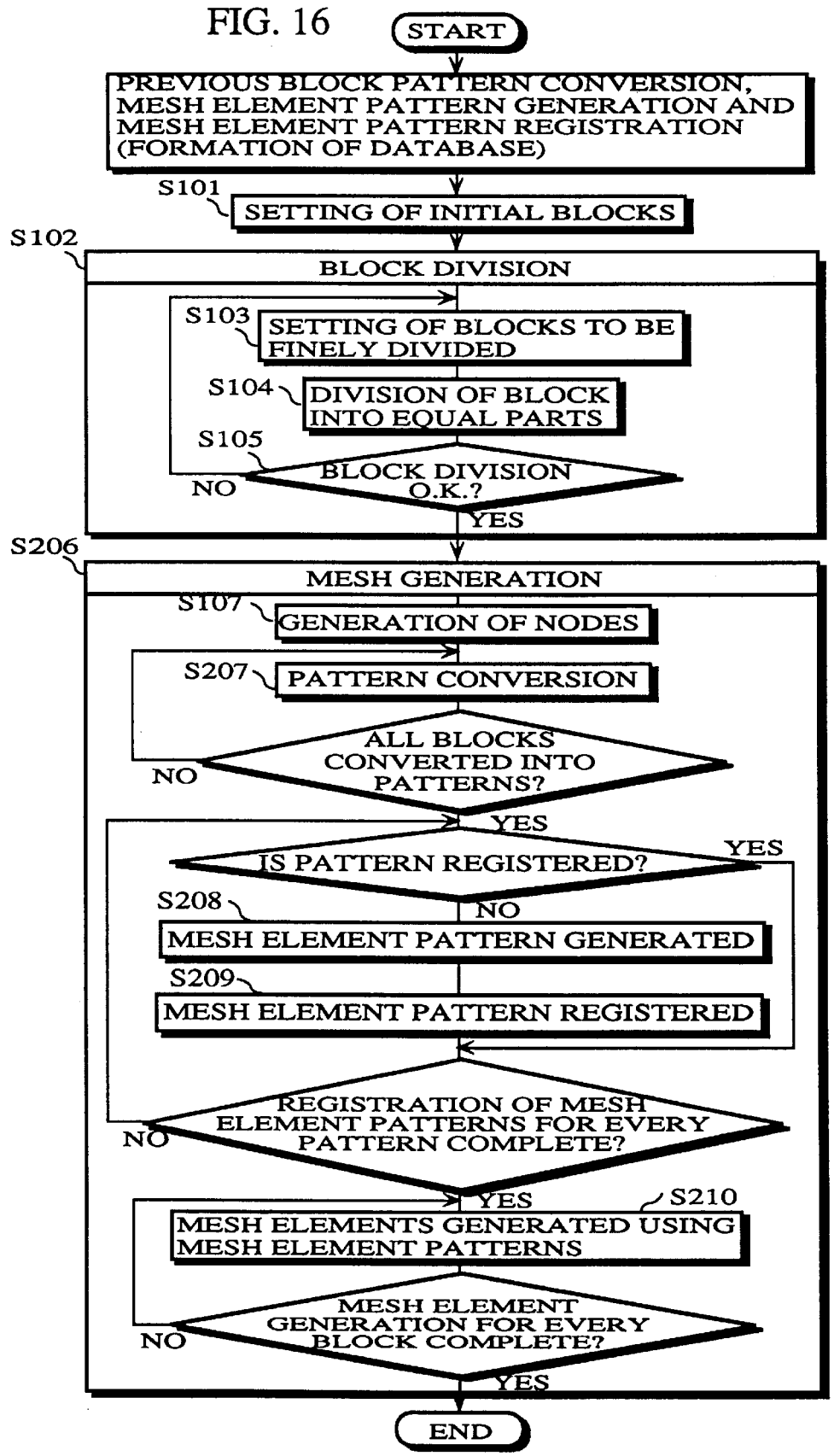
FIG. 16 shows the third processing method for mesh generation to which the second embodiment relates.

For the process in FIG. 16, the patterns for an arbitrary number of blocks are stored in a database with their corresponding mesh element patterns. Block division is then performed according to a predetermined process and nodes are generated. Following this, the blocks to have mesh generated are all sorted by pattern. It is then judged whether each of these patterns is registered in the database. Here, mesh element patterns are generated for the block patterns not present in the database using their nodes. Each of these generated mesh element patterns are then stored in the database together with their corresponding block pattern. After this, mesh elements are generated for each block using the mesh element patterns in the database which correspond to each block pattern.

Figure 17:
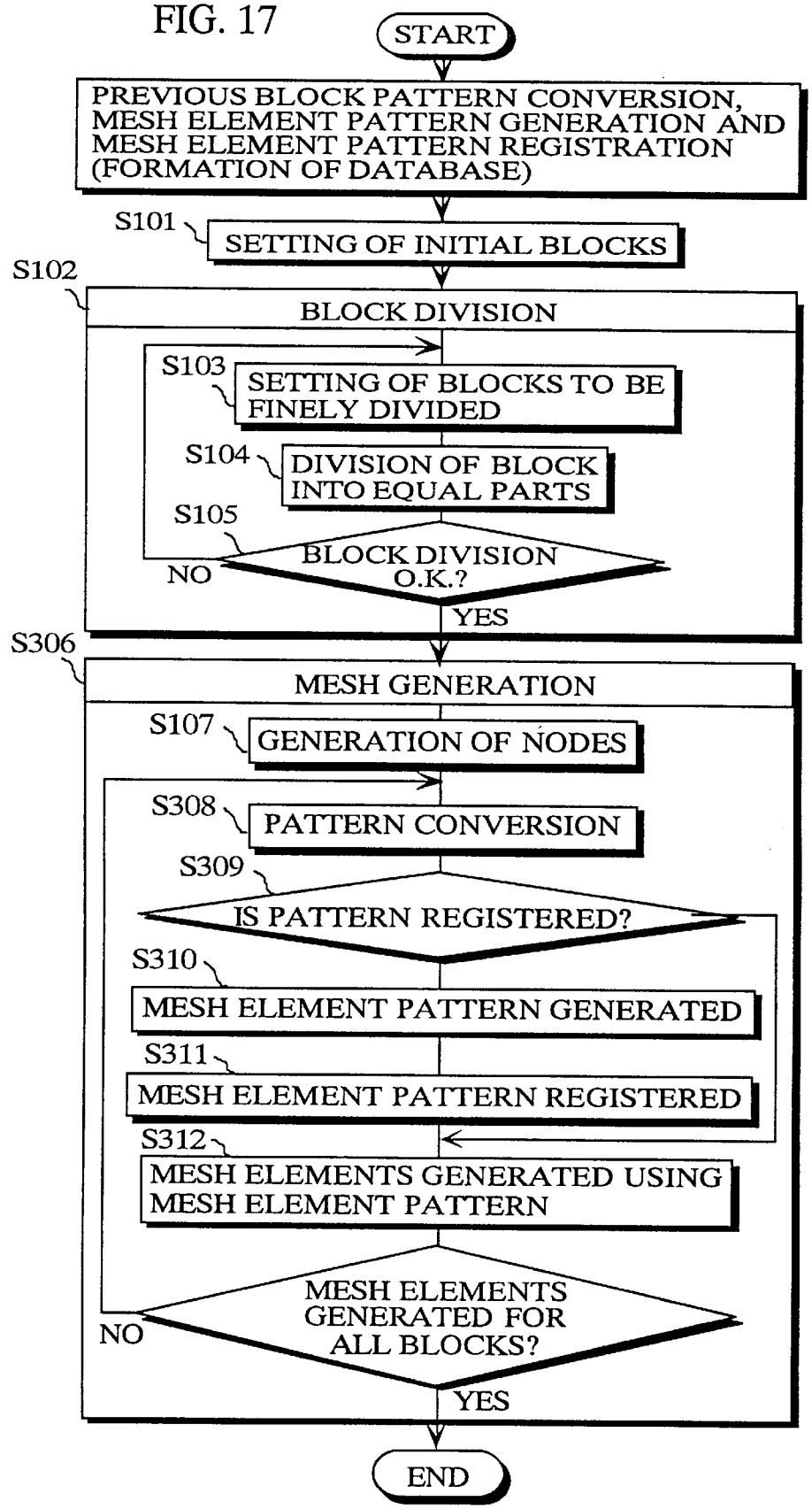
FIG. 17 shows the fourth processing method for mesh generation to which the second embodiment relates.

The process shown in FIG. 17 is the same as the process shown in FIG. 16 up until the generation of the nodes. Following this, one block to have mesh generated is sorted according to its pattern. It is then judged whether this patterns is registered in the database. Here, if the block pattern is not present in the database, a mesh element pattern is generated based on the nodes in the block pattern. This generated mesh element pattern is then stored in the database together with the corresponding block pattern. After this, mesh elements are generated for the block using the mesh element pattern stored in the database corresponding the current block pattern. This is then repeated for every block.

It should be noted here that in the processes shown in FIGS. 16 and 17, the block patterns are simple, regardless of geometrical form of the object or region to be analyzed, so that it is also possible for the data for the mesh element patterns for each block pattern to be foreseen by the user and so registered beforehand in the database.

Third Embodiment

Figure 18:
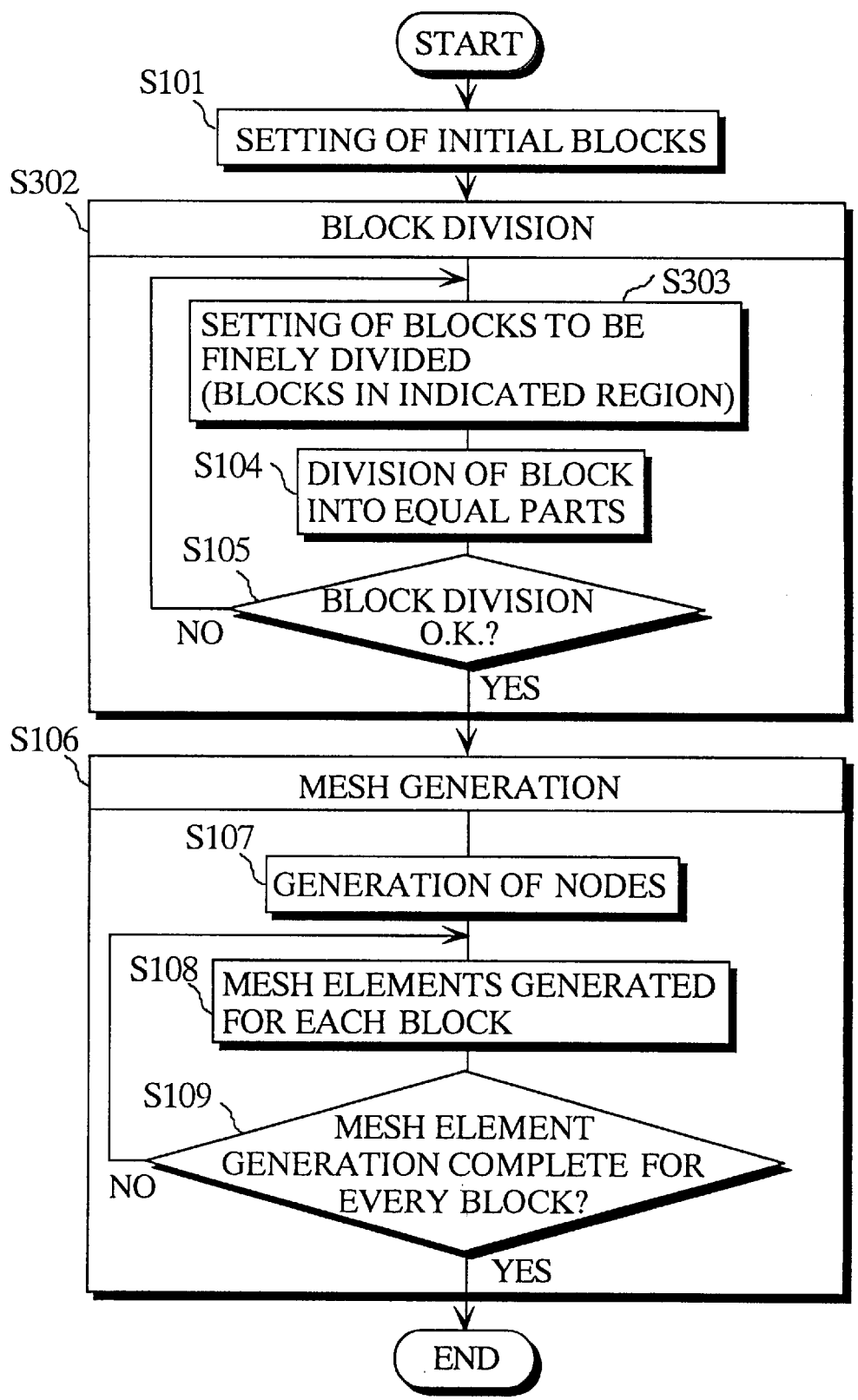
FIG. 18 shows the processing method for mesh generation to which the third embodiment relates.

FIG. 18 shows the processing method for numerical analysis mesh generation to which the third embodiment of the present invention relates. This embodiment is also fundamentally the same as the first embodiment. However, the present embodiment differs in including a process (S303) which, by indicating a region of the geometric model (this region being hereinafter referred to as the "indicated region") as part of the setting of blocks to be divided (S103) in the block division (S102) of FIG. 8, can set blocks which include part of the indicated region as blocks to be divided.

Figure 19:
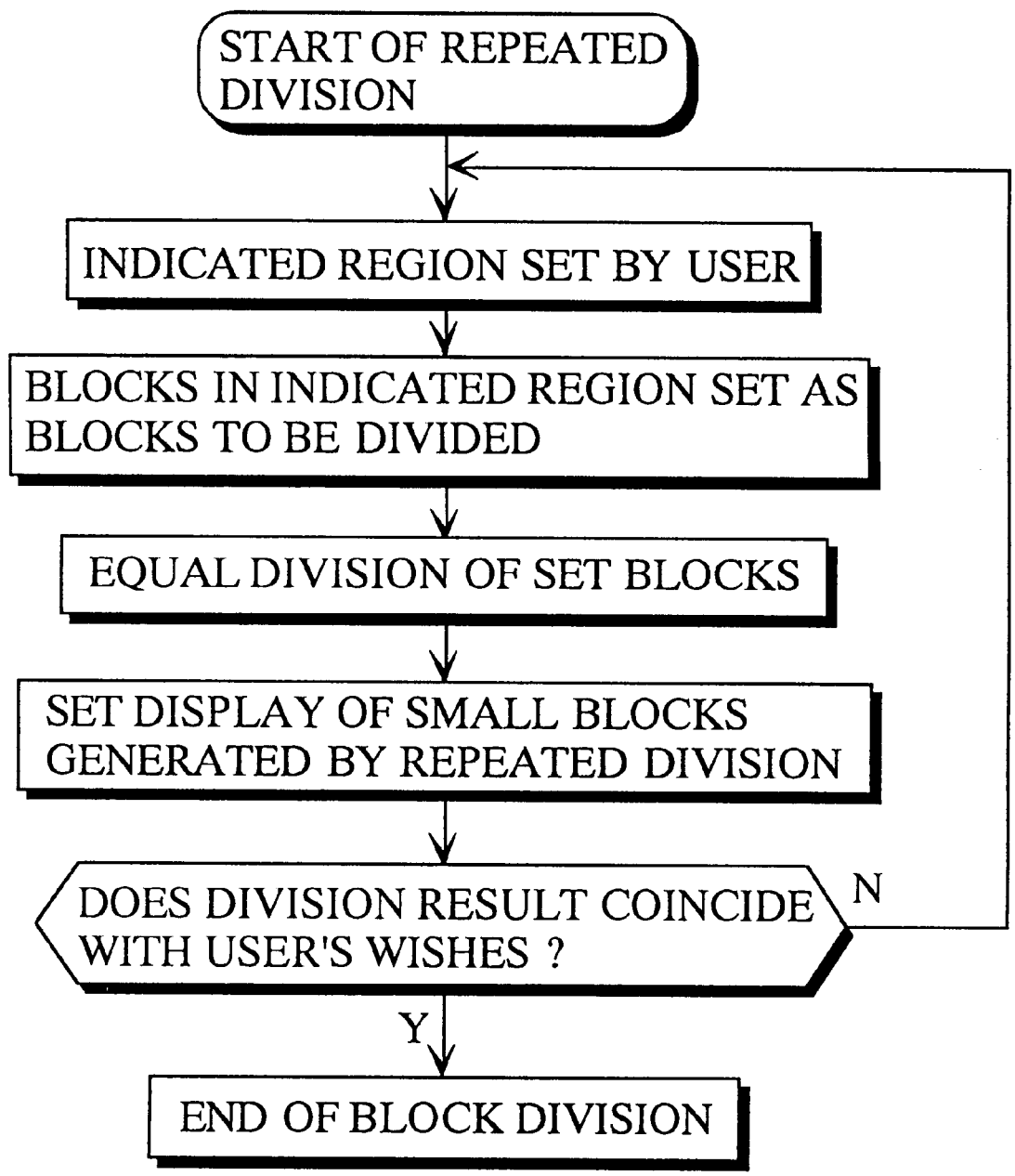
FIG. 19 shows the details of steps (S303), (S104) and (S105) in FIG. 18.

The detailed processing method of (S302) in FIG. 18 is shown in FIG. 19. As shown in FIG. 18, if the user sets an indicated region of the geometric model in the present embodiment, the blocks which include part of the indicated region are all divided equally. While verifying the results of this division, the user can repeat this process until his/her desired division is achieved. After this, mesh generation is performed for the blocks thus obtained.

Figure 1:
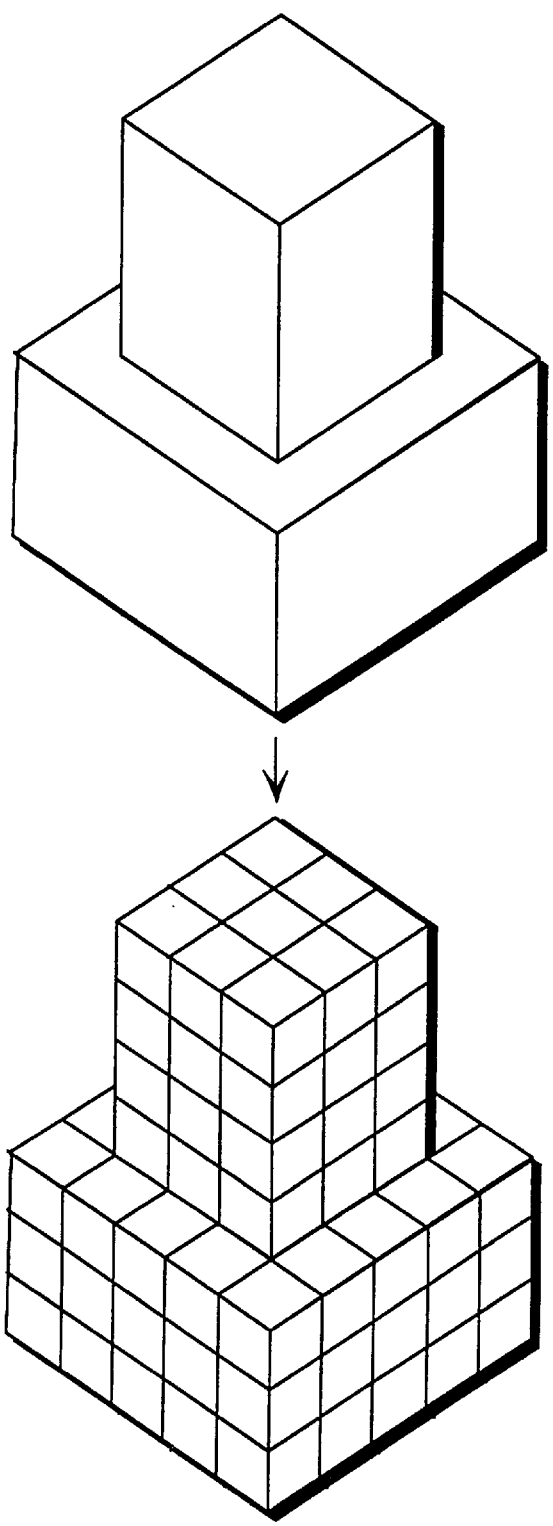
FIG. 1 shows an example of mesh division of a three-dimensional object according to a conventional technique.
Figure 2A:
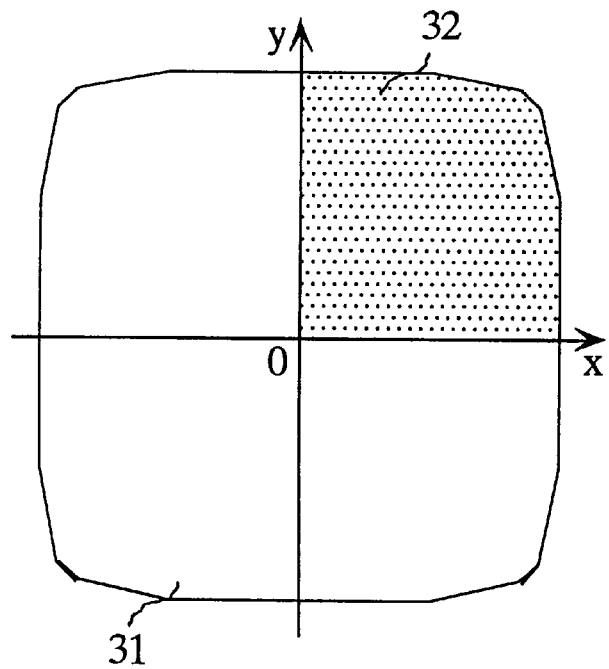
FIG. 2A shows an example of a planar region to be analyzed.
Figure 2B:
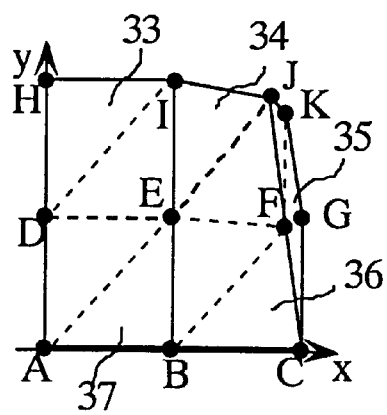
FIG. 2B shows region division of the planar region to be analyzed and the generation of mesh according to a conventional technique.
Figure 2C:
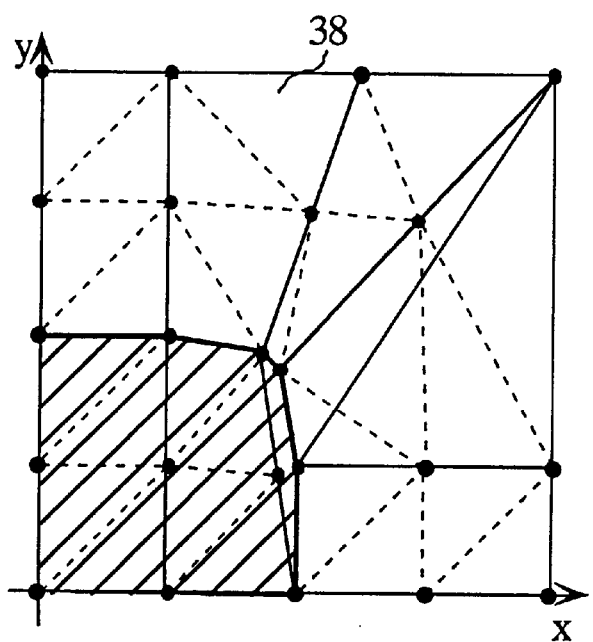
FIG. 2C shows the region division of the planar region to be analyzed and its surrounding space and the generation of mesh according to a conventional technique.
Figure 20:
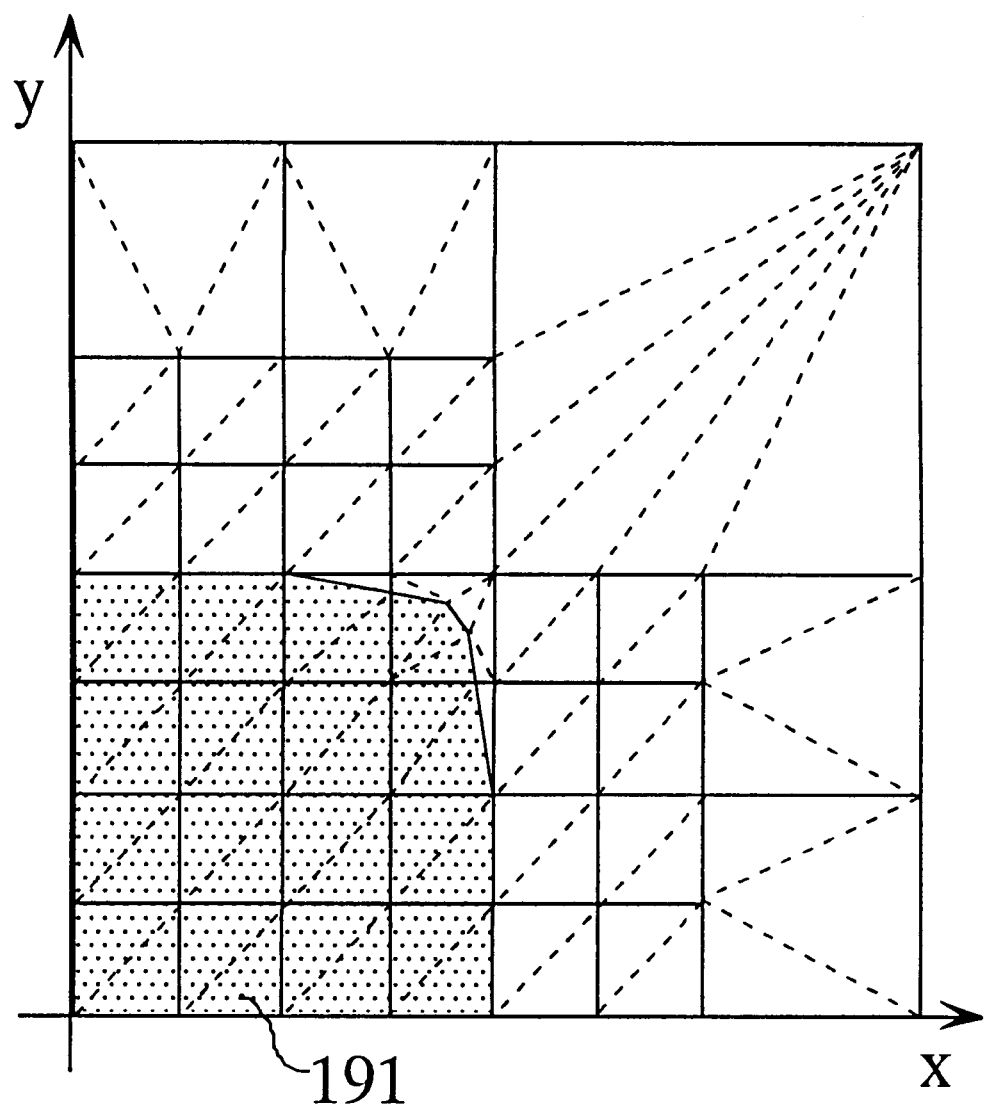
FIG. 20 shows an example of the blocks and mesh generated using the third embodiment.

FIG. 20 shows an example of the block division in the present embodiment and the mesh which is generated as a result. Here, region 191 in FIG. 20, which is of the form shown as 32 in FIG. 2A, is indicated and, after the blocks which include this region have been divided, region 191 is once again indicated and the blocks which include this region 191 are again divided. Note here that in this embodiment, the blocks which include part of a region further include blocks which touch the boundaries of the region. By repeating block division according to the indication of a region, a finer division of blocks is possible. In this way mesh grading can easily be controlled. It should be further noted here that it is possible to set a fixed range for the difference in size between blocks which touch the boundaries of the region, and that it is possible to divide the blocks which touch the boundaries of the region so that their size is between the size of blocks which include part of the indicated region and the original block size.

Also, since the size of the region for which fine division is necessary will largely depend on the form of the object to be analyzed, mesh grading for the form can easily be set using the geometric model. Accordingly, the grading of mesh desired by the user can easily be achieved by generating the geometric model beforehand with this in mind.

Furthermore, by changing the content of the indicated region, a desired mesh grading can be achieved even for objects to be analyzed whose form is extremely complex.

Finally, it is possible for regions, such as regions where the line segments of the geometric model are short and their adjacent regions, to be automatically indicated as regions to be finely divided.

Fourth Embodiment

Figure 21:
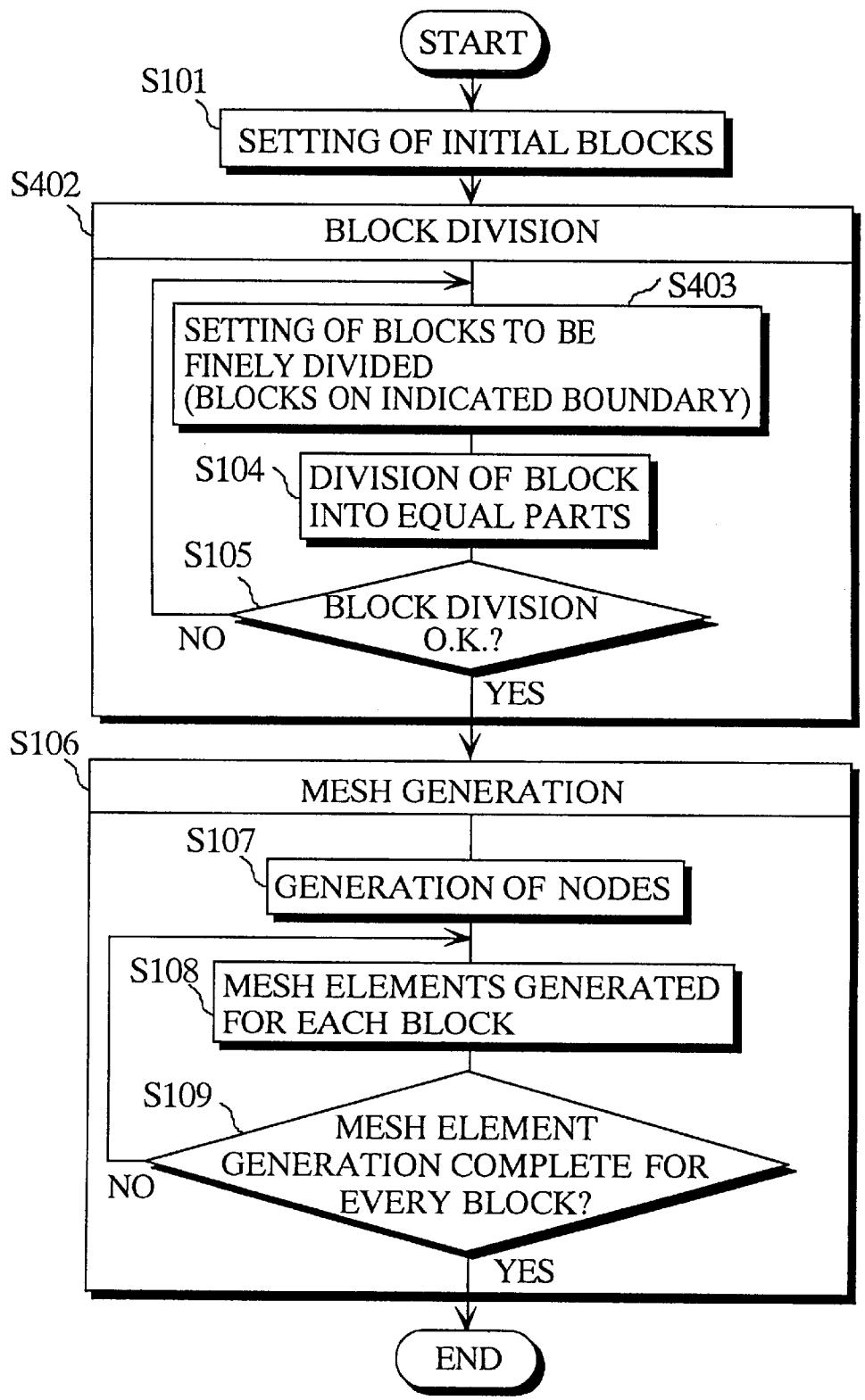
FIG. 21 shows the processing method for mesh generation to which the fourth embodiment relates.

FIG. 21 shows the processing method of this embodiment. This embodiment is also fundamentally the same as the first embodiment. However, the present embodiment differs in including a process (S403) which, by indicating a boundary of the geometric model which is to be finely divided (this boundary being hereinafter referred to as the "indicated boundary") as part of the setting of blocks to be divided (S103) in the block division (S102) of FIG. 8, can set blocks on the indicated boundary as blocks to be divided. This is to say, the present embodiment further includes a function for indicating blocks on an indicated boundary as blocks which are to be finely divided. Here, boundaries of the geometric model are any of surfaces, lines or points on the boundary of the geometric model.

Figure 22:
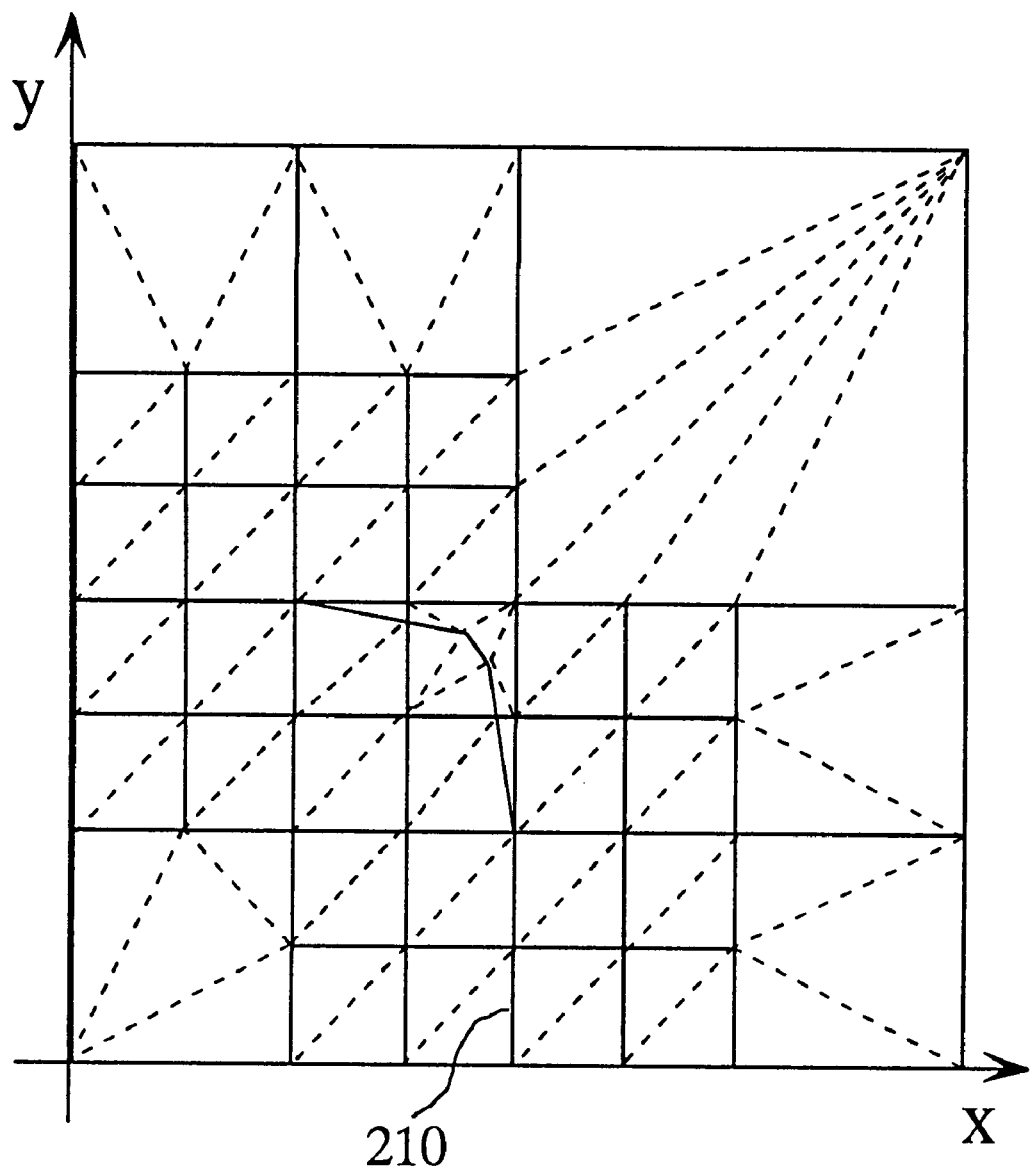
FIG. 22 shows an example of the blocks and mesh generated using the fourth embodiment.

FIG. 22 shows an example to be used for explaining the present embodiment. This figure shows the result when block division is performed when boundary line 210 is set as the indicated boundary for fine division, and the mesh which is generated as a result. Here, boundary line 210, in FIG. 22 which is of the same form as shown in region 32 in FIG. 2A, is indicated and, after the blocks on this boundary have been divided, boundary line 210 is once again indicated and the blocks on it are again divided. Note here that in this embodiment, the blocks which are finely divided include blocks which touch the blocks on the indicated boundary. In this embodiment, repeating block division for blocks on the indicated boundary 210 becomes simple, so that a finer division of blocks, depending on their proximity to the indicated boundary, can easily be achieved. This is to say, mesh grading can easily be controlled according to the distance of blocks from boundaries.

Also, since the boundaries for which fine division is necessary will largely depend on the form of the object to be analyzed, mesh grading for the form can easily be set using the geometric model, in the same way as when indicating a region. Accordingly, the grading of mesh desired by the user can easily be achieved by keeping this in mind when generating the geometric model beforehand.

Furthermore, by changing the indicated boundaries during block division, a desired mesh grading can be achieved even for objects to be analyzed whose form is extremely complex. In this way, since in numerical analysis there are many cases where it is important to observe the behavior at a boundary between two different materials, it can be especially beneficial to have the grading of the generated mesh related to proximity to such a boundary.

Finally, aside from the process shown in FIG. 21, it is also possible for boundaries to be automatically indicated as boundaries whose blocks are to be finely divided, such as boundaries where the line segments of the geometric model are short and other boundaries in the proximity.

Fifth Embodiment

Figure 23:
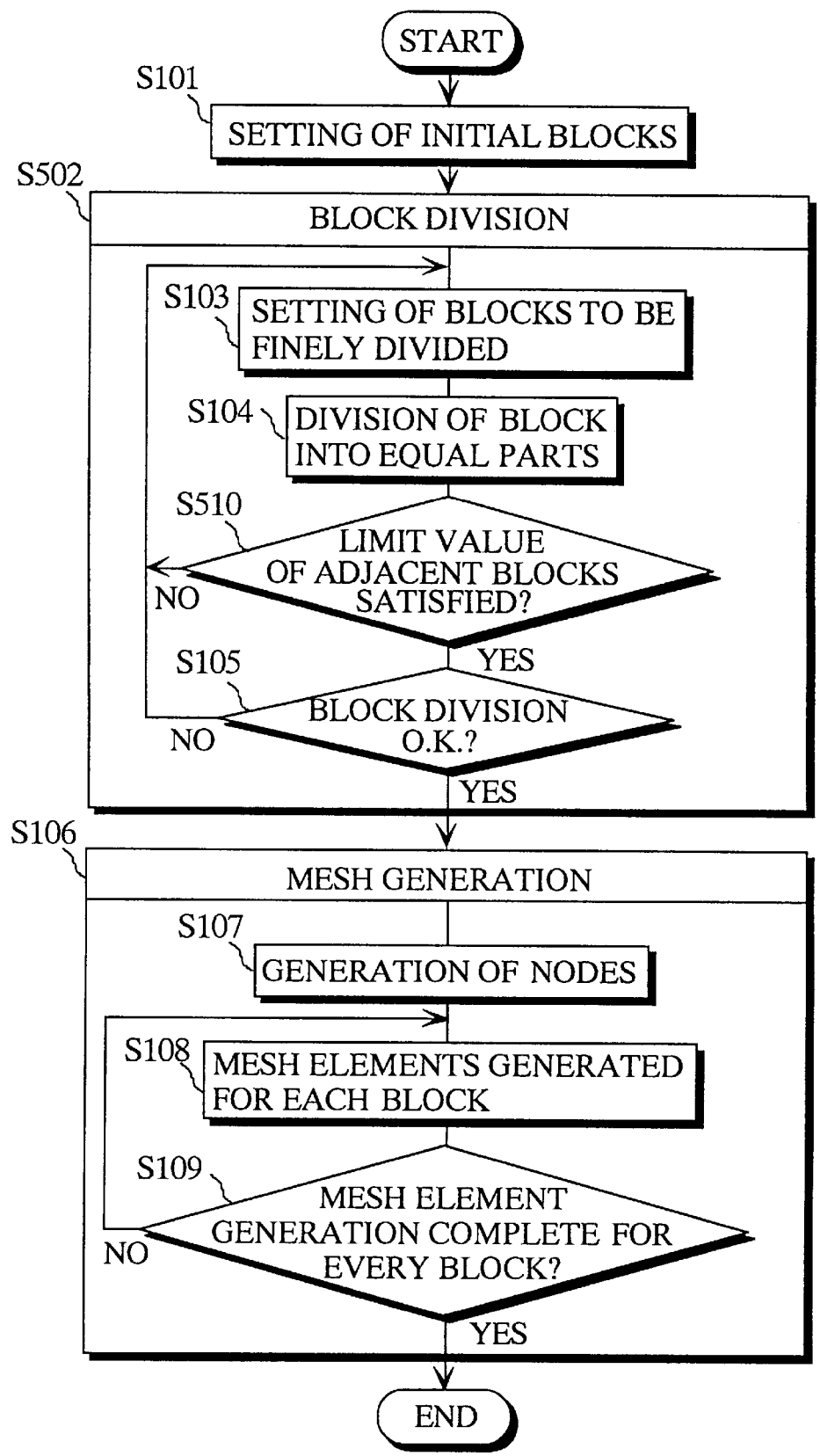
FIG. 23 shows the processing method for mesh generation to which the fifth embodiment relates.

FIG. 23 shows the processing method for numerical analysis mesh generation to which the fifth embodiment relates. This embodiment is also fundamentally the same as the first embodiment. However, the present embodiment differs in including a function for judging, in the block division of (S102) in the numerical analysis mesh generation method shown in the processing method of FIG. 8, whether a preset limit for the difference in sizes between adjacent blocks is being observed, which is to say, whether the ratio of sizes between adjacent blocks falls within a specified range, and a function for remedying the situation when the ratio is outside the specified range. This additional step is (S510) which judges whether the ratio of sizes between each pair of adjacent blocks which have been divided in (S104) is within the preset limit value. When the limit value is exceeded, the process returns to (S103), the larger of the blocks is set as a block to be divided, and block division is repeated. By changing this adjacent block limit value, the transition of mesh grading across the region to be analyzed can easily be controlled.

Figure 24:
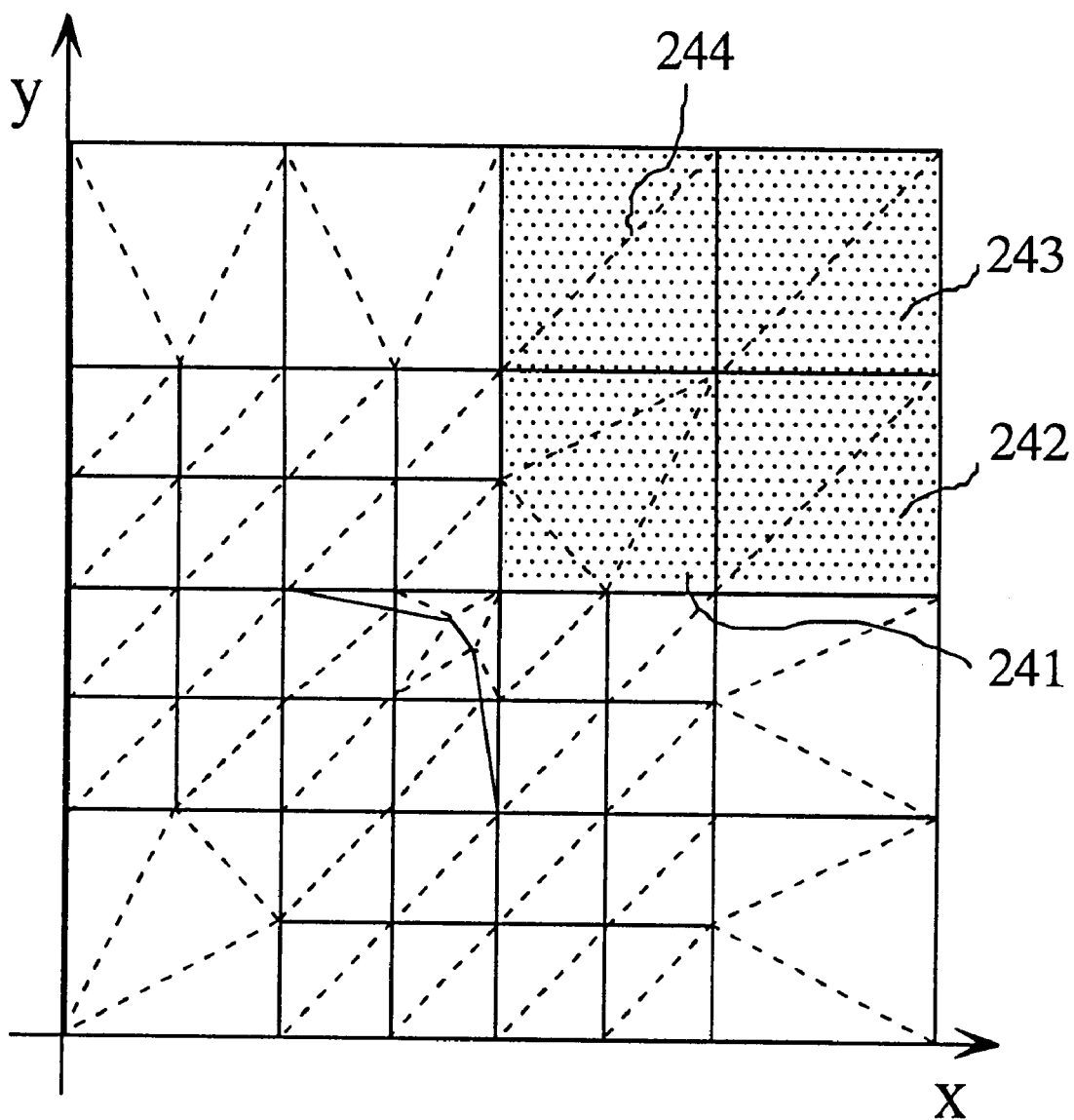
FIG. 24 shows an example of the blocks and mesh generated using the fifth embodiment.

FIG. 24 shows an example of the operation of the present embodiment. This drawing shows the case where the present embodiment is used for the blocks shown in FIG. 22. It should be noted here that in the present embodiment, the limit value for edges of blocks which are adjacent in a direction parallel to one of the coordinate axes is set as "2". In FIG. 22, the largest block which is top right is four times larger (in terms of dimensions, not area) than the small blocks at the lower part of its left boundary and the small blocks at the left side of its bottom boundary, so that the ratio of the length of the edges in the x and y coordinate axes of these blocks is 4:1. This can be seen to exceed the limit value, so that as shown in FIG. 24, the largest block is divided into two in both the x and y axes so as to generate the four blocks 241, 242, 243 and 244.

By limiting the difference in size between adjacent blocks in the present embodiment, extreme differences in block grading can be avoided and few elongated mesh elements will be generated. This kind of mesh is especially effective in enabling accurate numerical analysis. It should be noted here that the limit value for dimensions in the coordinate axes of adjacent blocks in the present embodiment is given here as "2", although this limit value can be set in accordance with the allowable range for elongated mesh elements which will differ according to such factors as whether structural analysis or magnetic field analysis is being performed. Here, value "2"is selected in the present embodiment as the limit value because this value enables the avoidance of problems caused by errors due to a large difference in the size of adjacent blocks, regardless of the kind of numerical analysis which is being performed.

Also, it is also possible for the present embodiment to be used in conjunction with a variety of block division methods, such as the division of blocks on an indicated boundary, the division of blocks which include part of an indicated region and the division of blocks according to an indication by the user.

It should be noted here that the comparison of size of adjacent blocks is performed by comparing the lengths of block edges, although since each block to be compared is fundamentally generated by making equal divisions in each of the coordinate axes directions x, y (and z) of the blocks which are initially set, such comparison can be visually made by the user, not just by calculation by a computer. The comparison of block sizes has been described as being performed in each of the x, y (and z) coordinate axes, although it is also possible for the ratio of lengths to be 2:1 or below in one or more of the coordinate axes, depending on the conditions of the analysis to be performed or the nature of the object to be analyzed.

Furthermore, when dividing the larger of a pair of adjacent blocks which do not conform to the limit value, it is also possible to execute an equal division of this larger block in only a direction in which the ratio of length of sides exceeds the limit value, or alternatively in all directions.

Sixth Embodiment

Figure 25:
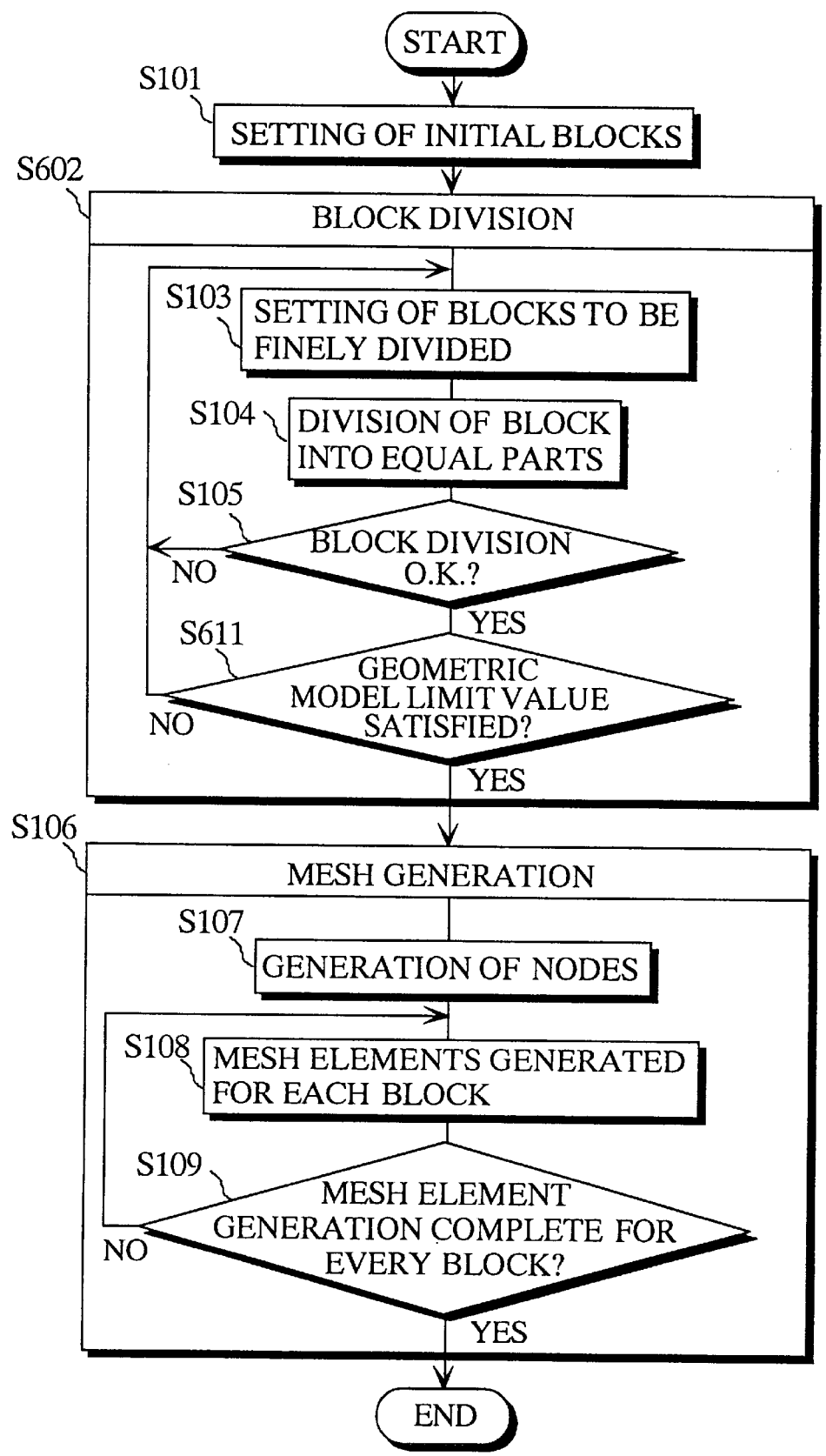
FIG. 25 shows the processing method for mesh generation to which the sixth embodiment relates.

FIG. 25 shows the processing method for numerical analysis mesh generation to which the sixth embodiment relates. This embodiment is also fundamentally the same as the first embodiment. However, the present embodiment differs in including a function for judging, in the block division of (S102) in the numerical analysis mesh generation method shown in the processing method of FIG. 8, whether the limit condition that a block contains no more than one point, line or surface which defines the form of the geometric model is satisfied, and a function for coping with the situation when the limit condition is not satisfied. This additional step is (S611) which judges whether the limit condition is satisfied for a block, with the process returning to (S103) and the block being newly set as a block to be divided when the limit condition is not satisfied.

Figure 26A:
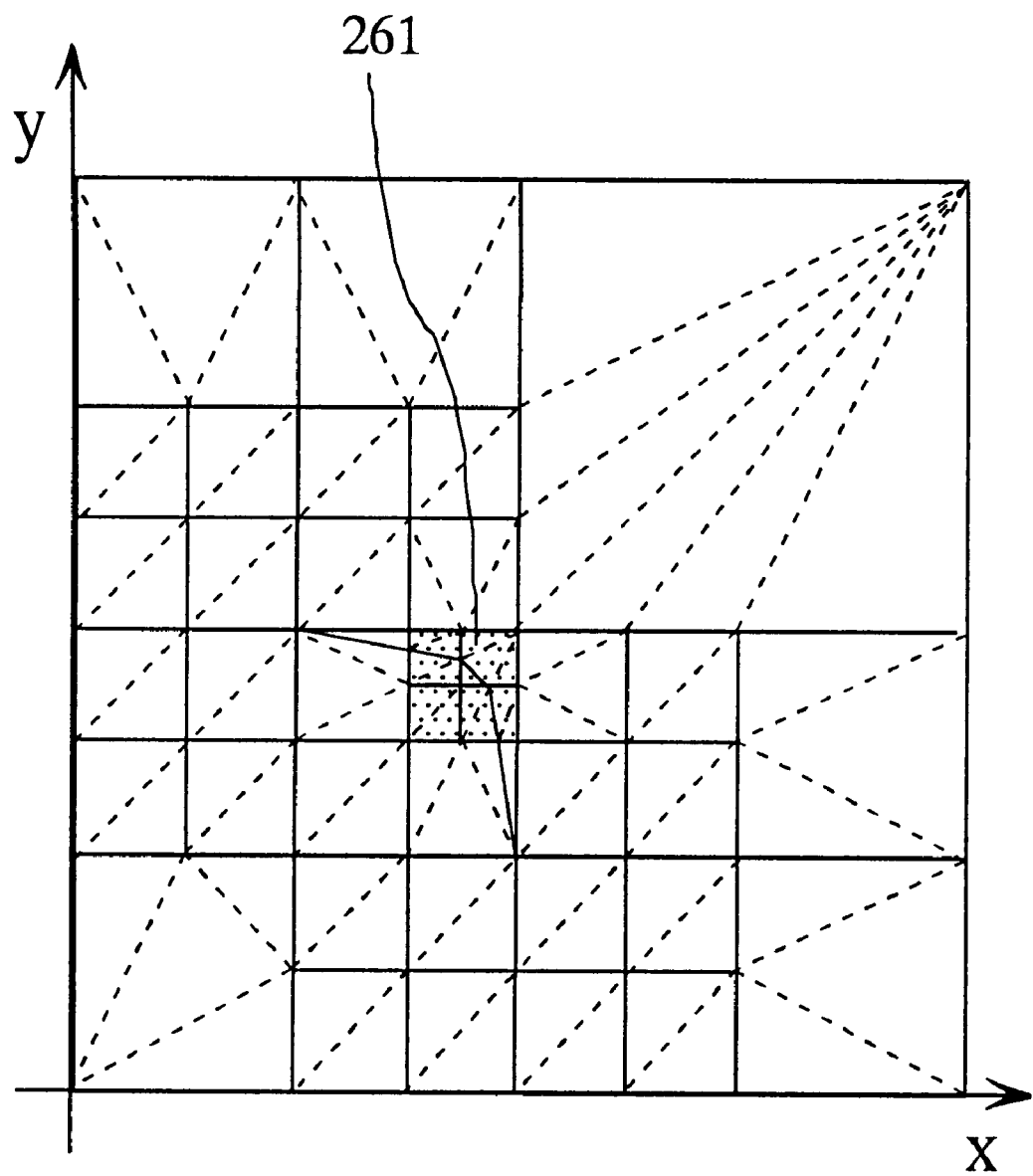
FIG. 26A shows an example of the blocks and mesh generated using the sixth embodiment.
Figure 26B:
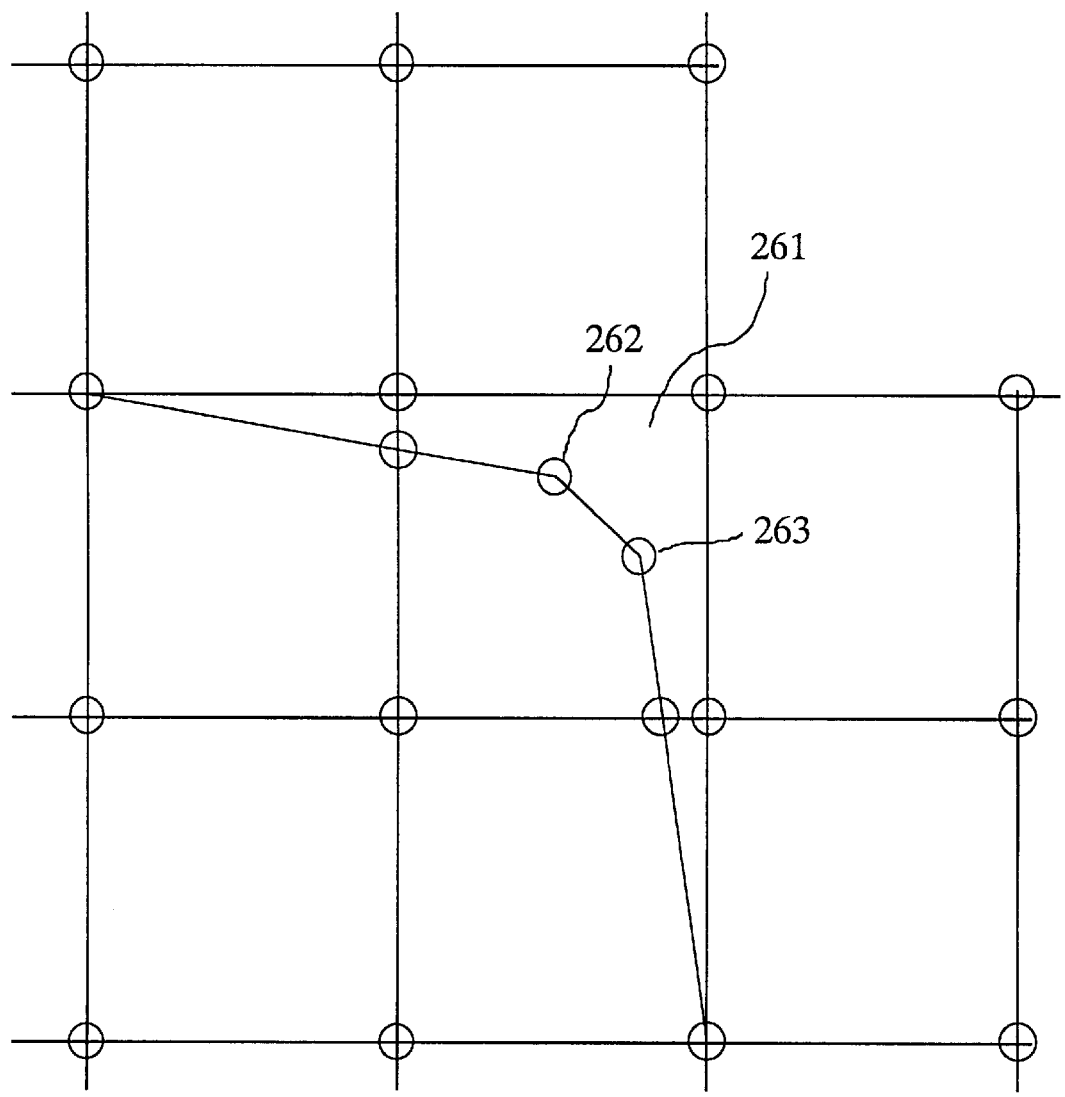
FIG. 26B shows an enlargement of the vicinity of the blocks which are finely divided in FIG. 26A.
Figure 26C:
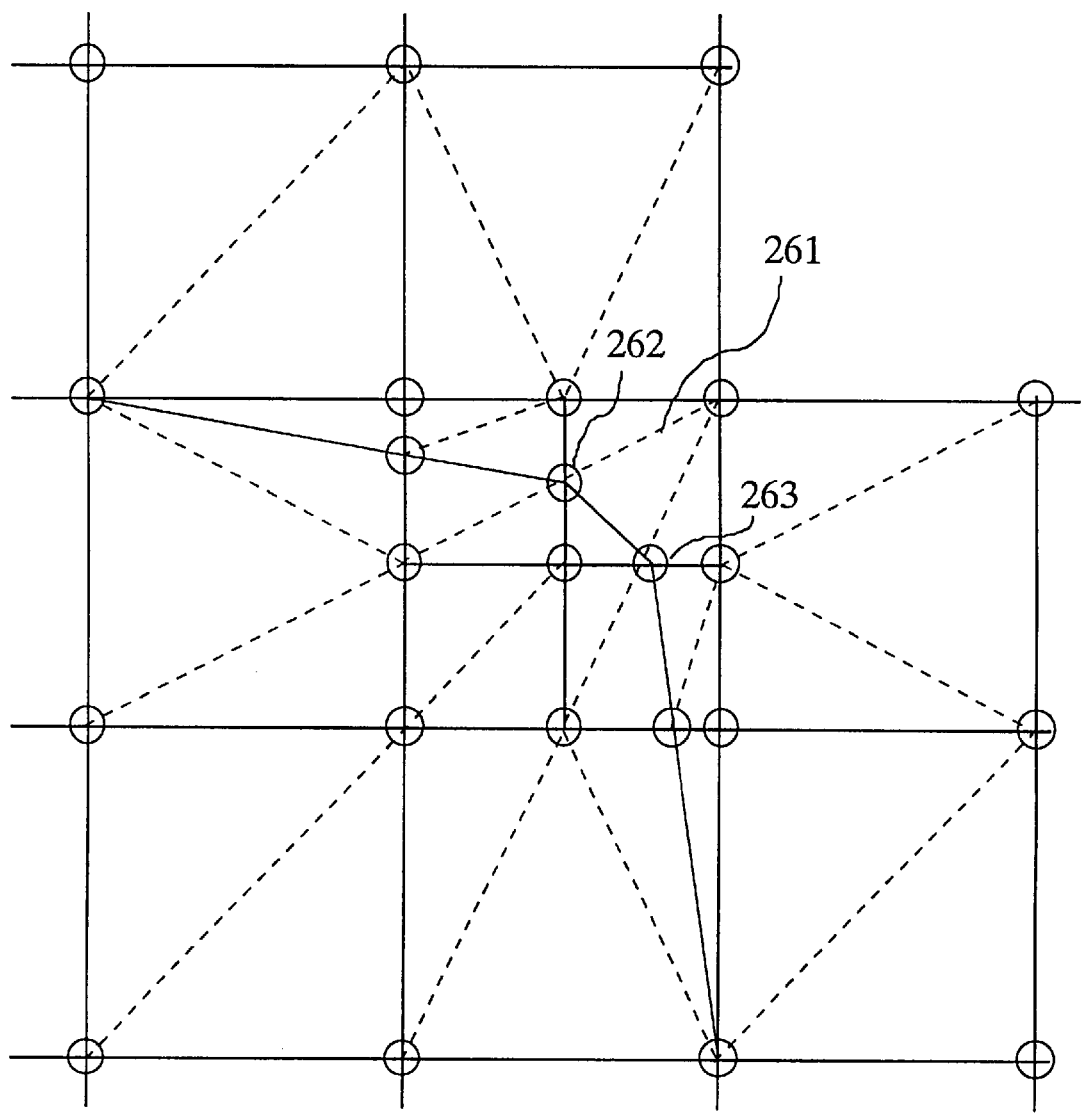
FIG. 26C shows the nodes and mesh elements generated from FIG. 26B.

FIG. 26A shows an example situation for explaining the operation of the present embodiment using the same example blocks which were shown in FIG. 22. Here, the limit condition for the geometric model in the present embodiment is "the boundary line of the geometric model is continuous within each block and that no block contains more than one point where the boundary line of the geometric model is joined". When the blocks shown in FIG. 22 are given as the object to be analyzed, the small block 261 which is located just below and to the right of the center of the region can be seen to violate the limit condition. An enlargement of this block 261 is shown in FIG. 26B. As can be seen from FIG. 26B, while the boundary line of the geometric model is continuous within block 261, there are two points which connect the boundary line of the geometric model in the block, (points 262, 263) so that the second part of the limit condition is not satisfied. Accordingly, the characteristic operation of the present embodiment divides block 261 in two in both the x and y axes. The result of the division of block 261 is shown in FIG. 26C. By means of this division, there are no longer any blocks which do not satisfy the limit condition. Here, the result of this operation is that block 261 shown in FIG. 22 is divided as shown in FIG. 26A.

Since in the present embodiment, the component parts of the geometric model which can be present in a block are limited in accordance with the object to be analyzed, it becomes possible to finely divide blocks neighboring the geometric model boundary or blocks where the line segments of the geometric model boundary are short, making the mesh finer at these places. This is especially effective in improving the accuracy of numerical analysis. It should be noted here that although the present embodiment sets "the boundary line of the geometric model is continuous within each block and that no block contains more than one point where the boundary line of the geometric model is joined" as the limit condition for each block regarding the present geometric model, it is possible for this limit condition to change depending on the form of the object to be analyzed and the like.

Also, it is possible for the present embodiment to be used in conjunction with a variety of block division methods, such as the division of blocks on an indicated boundary, the division of blocks which include part of an indicated region and the division of blocks according to an indication by the user, with combinations of these methods also being possible. Finally, the fine division of blocks need not be confined to division into two equal parts in the x and y axes.

Seventh Embodiment

This embodiment is also fundamentally the same as the first embodiment.

Figure 27:
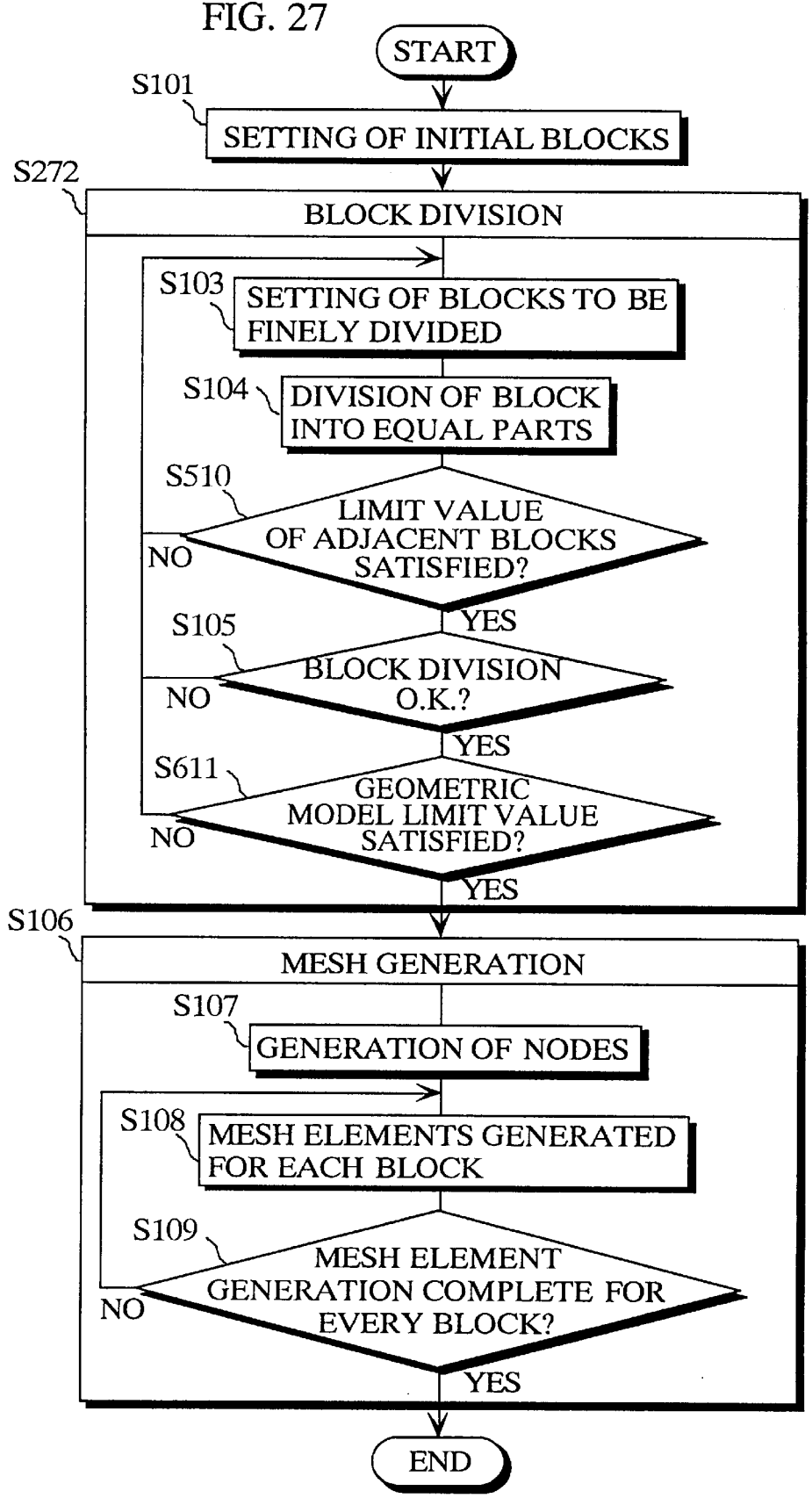
FIG. 27 shows the mesh generation process to which the seventh embodiment relates.

FIG. 27 shows the processing method for the present embodiment. This present embodiment differs from the first embodiment in including a function for judging, in the block division of (S102) in the numerical analysis mesh generation method shown in the processing method of FIG. 8, whether the block limit value of adjacent blocks is satisfied and whether the limit conditions of the geometric model are satisfied, and a function for coping with the situation when either condition is not satisfied. This first additional step is (S510), with, when the difference in size between adjacent blocks exceeds the adjacent block limit value, the larger of the blocks being set as a block to be divided and the process returning to (S103). The second additional step is (S611), so that when the part of the geometric model inside a block does not conform to the model limit conditions, the block in question is set as a block to be divided and the process returns to (S103). This is to say, the present mesh generation method includes the block division function of the fifth embodiment which was shown in FIG. 22 and the block division function of the sixth embodiment which was shown in FIG. 24.

In the present embodiment, the difference in size between adjacent blocks and the part of the geometric model inside a block are both controlled, so that the relation between the nodes inside a block and the lines and surfaces of the geometric model becomes extremely simple. That is, by providing limits for the difference in size between adjacent blocks, the number of nodes due to the existence of small blocks along the edge of a large block is limited, which therefore limits the number of patterns of nodes on the edges of one block. Furthermore, by providing limits on the part of the geometric model which appears in a block, the number of patterns of nodes made up from the form-defining points of the geometric model in a block is also limited, with the relation with the lines and surfaces of the geometric model also being simplified. As a result, it can be ensured that the relation between the nodes in a block and the lines and surfaces of the geometric model will not be too complicated.

Figure 28:
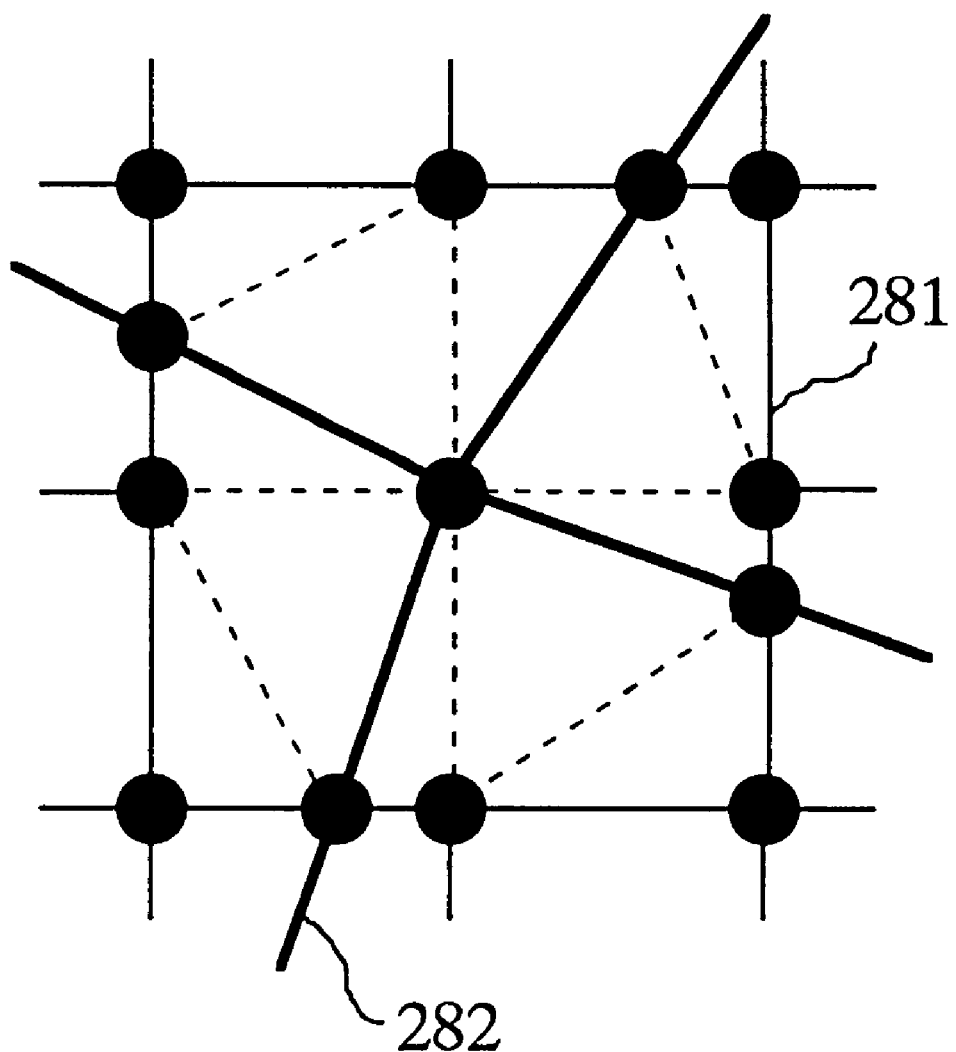
FIG. 28 shows the pattern of relations between the nodes and the lines and surfaces of the geometric model in the most complicated block in the seventh embodiment.

The above operation enables the mesh element generation of each block to be executed in a short time using a simple process, without recourse to complex algorithms. As one example, when the adjacent block limit value and the geometric model limit value are the same as the fifth and sixth embodiments shown in FIG. 23 and FIG. 25, the most complex possible relation between a block and the geometric model is the case where the dimensions of the adjacent blocks on all sides are half the size of the present block and a plurality of boundary lines of the geometric model are joined at one point in the block. Such an example is shown in FIG. 28. In this Figure, 281 is the boundary line of the present block and 282 is the boundary line of the geometric model. When a plurality of boundary lines of the geometric model are joined at a single point in this way, the relation between the block and this point will remain unaffected even if block division is repeated, with the exception of when the point falls on a block boundary. On the other hand, if block division is repeated in any other case, there will definitely only be one boundary line of the geometric model in each block. That is, FIG. 28 shows the block layout for which mesh element generation for the program is most problematic. This is to say, mesh element generation which is more complex or problematic than the illustrated case will not occur. Here, for ease of understanding, the object to be analyzed has been described as a planar surface, but there are in fact many cases where the object will be three-dimensional, with in such cases the simplification of mesh element generation being even more remarkable. Accordingly, by providing a limit value and limit conditions for both the size of adjacent blocks and the part of the geometric model in each block as in the present embodiment, a clear and simple mesh can easily be generated by changing the relations between adjacent blocks and the relations between blocks and the geometric model.

Eighth Embodiment

FIG. 25 shows the processing method for numerical analysis mesh generation to which the eighth embodiment relates.

This embodiment is also fundamentally the same as the first embodiment, and is a combination of the second and seventh embodiments. That is, by comparing FIG. 29 of the present embodiment with FIG. 15 of the second embodiment, it can be seen that the block division step (S102) has been replaced with the block division step (S272) in FIG. 27. In more detail, in addition to the steps in the block division step (S102) of FIG. 15, there is a step (S510) for judging whether the ratio of sizes between each pair of adjacent blocks is within the preset limit value and for having the larger of the adjacent blocks divided in a return to step (S103) when the difference in size between the adjacent blocks exceeds the limit value, and a step (S611) for judging whether the part of the geometric model in a block satisfies the geometric model limit conditions, with the process returning to (S103) and the block being newly set as a block to be divided when the limit condition is not satisfied.

As described above, the difference in size between adjacent blocks and the part of the geometric model inside a block are both controlled, so that the relation between the nodes inside a block and the lines and surfaces of the geometric model becomes extremely simple. These limits on the relation between the nodes inside a block and the lines and surfaces of the geometric model further limit the number of possible block patterns.

As one example, the adjacent block limit value and the geometric model limit conditions are set as the same as shown in FIGS. 24 and 26 of the fifth and sixth embodiments, and the geometric model has the pattern shown in FIG. 28 where four boundary lines of the geometric model are joined at a single point as the most complex pattern. This is to say, all of the block patterns are achieved by having the adjacent block limit value, the geometric model limit value and the geometric model fixed, with the mesh element patterns corresponding to these block patterns then being generated. Accordingly, when mesh generation is actually performed, the use of the data for the mesh element patterns which is generated beforehand corresponding to each block pattern means that it is not necessary to execute calculation for new mesh elements because mesh element generation can be performed by referring to the pattern of each block and then using a corresponding mesh element pattern. This allows a great reduction in the time taken by calculation for the different patterns. It should be noted here that the data for the mesh element patterns of all of the block patterns can also be obtained through calculation or data for a mesh element pattern conceived by the user may be used. This is to say, when the user prepares data for a mesh element pattern for each block pattern beforehand, it becomes possible for the user to generate a mesh with many kinds of mesh elements, such as triangular elements, quadrangular elements, a mixture of triangular elements and quadrangular elements, or, for three-dimensional mesh, tetrahedral elements, pentahedral elements, and hexahedral elements. Such generation was very difficult to achieve using a program under conventional techniques. It should finally be noted that depending on the types of mesh elements used, there are also cases where it is necessary to change the patterns (such as by providing new nodes).

Ninth Embodiment

The present embodiment is a combination of the above first through eighth embodiments which were described as dealing with planar objects to be analyzed, and is used for dealing with more complex geometric models.

Figure 29:
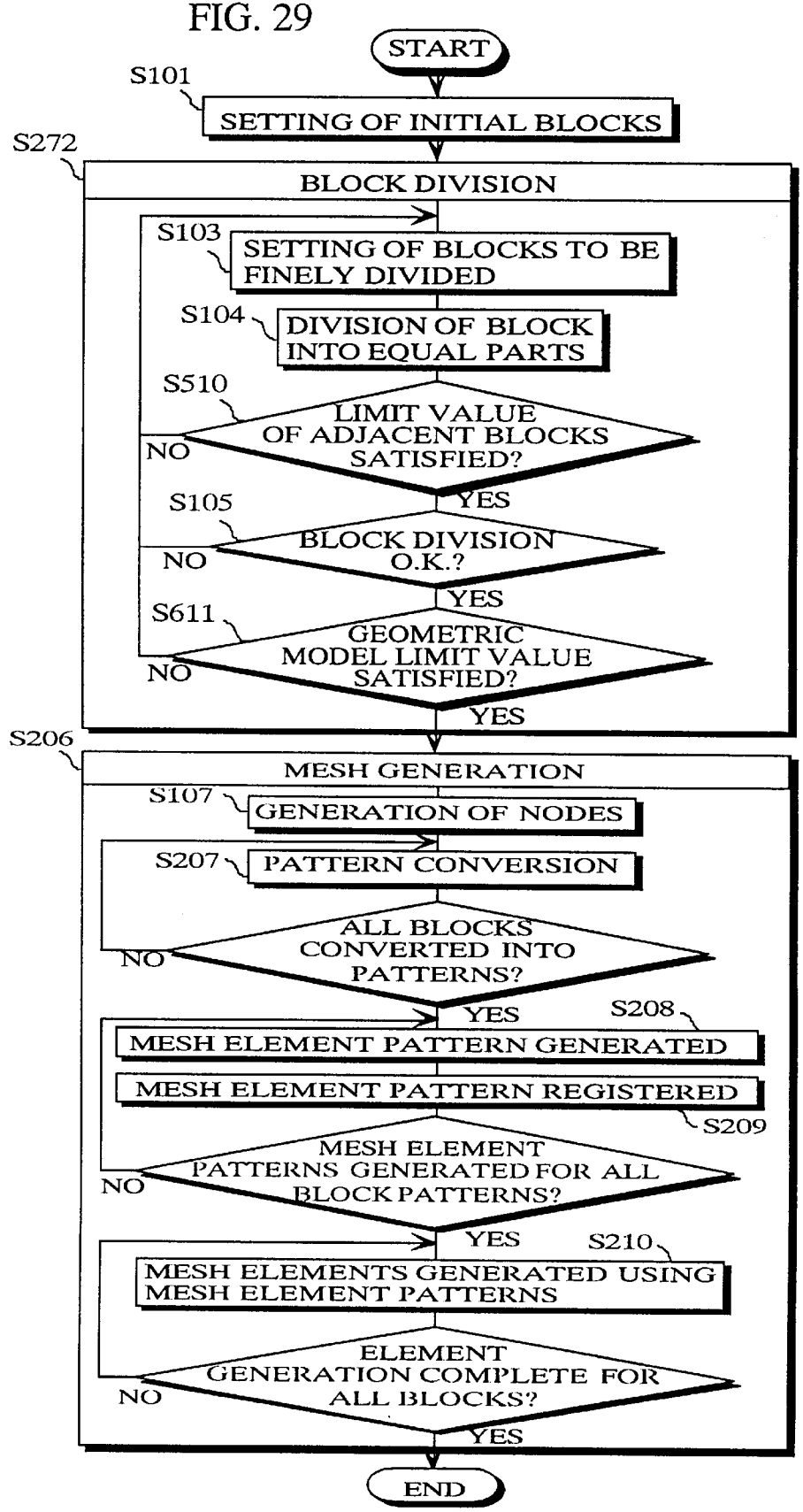
FIG. 29 shows the mesh generation process to which the eighth embodiment relates.

The processing method of this embodiment is shown in FIG. 29, with the setting of blocks on an indicated boundary being the method used for setting the blocks to be divided in (S103). The operation of the present embodiment is described below.

Figure 30:
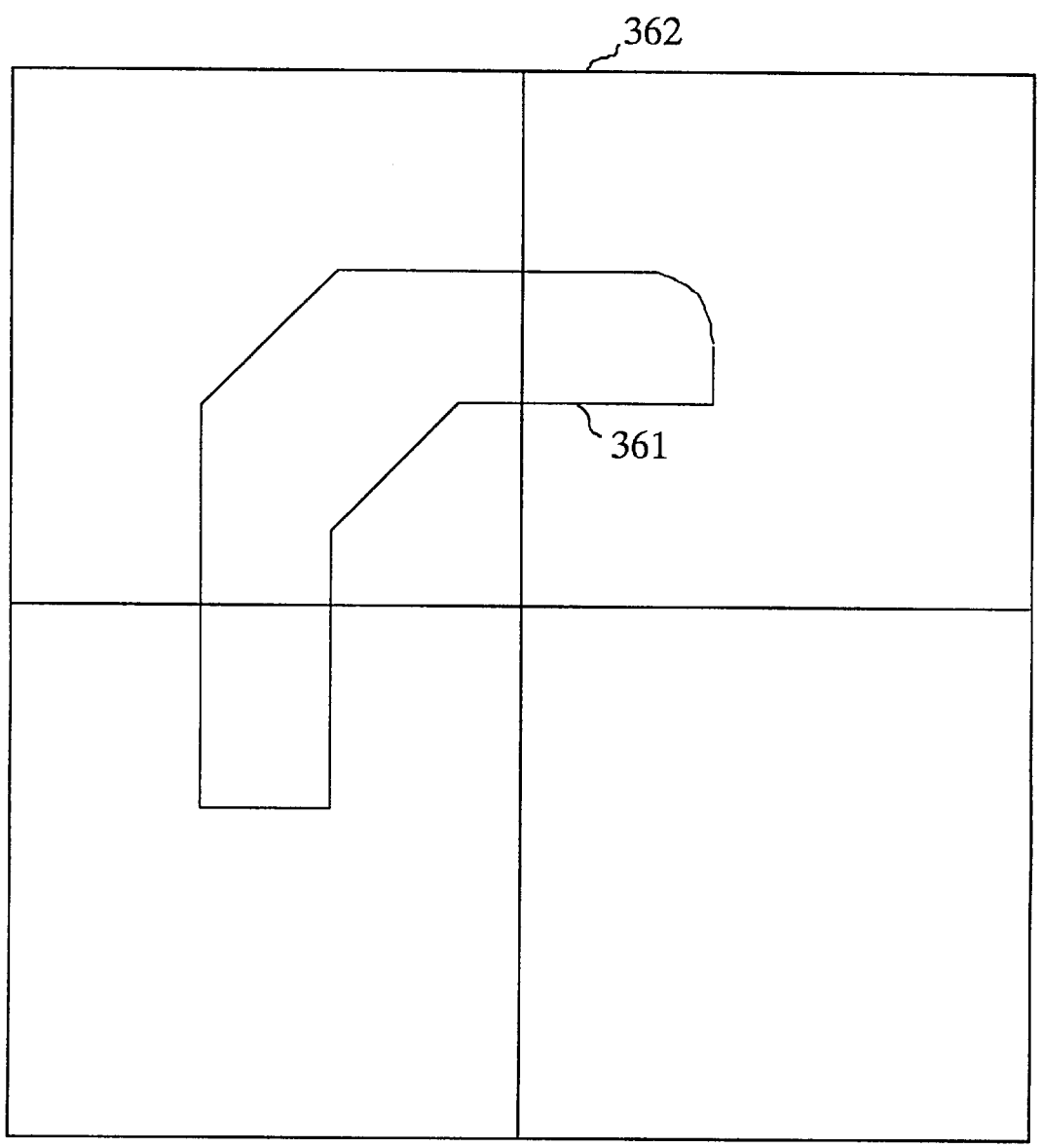
FIG. 30 shows the division of the geometric model into 4 by the ninth embodiment.

FIG. 30 shows the case when the blocks on boundary 361 which defines the form of the L-shaped object to be analyzed are selected as the blocks to be finely divided in the mesh generation region 362. As a result, the initial blocks present on boundary 361 are each divided into four.

Figure 31:
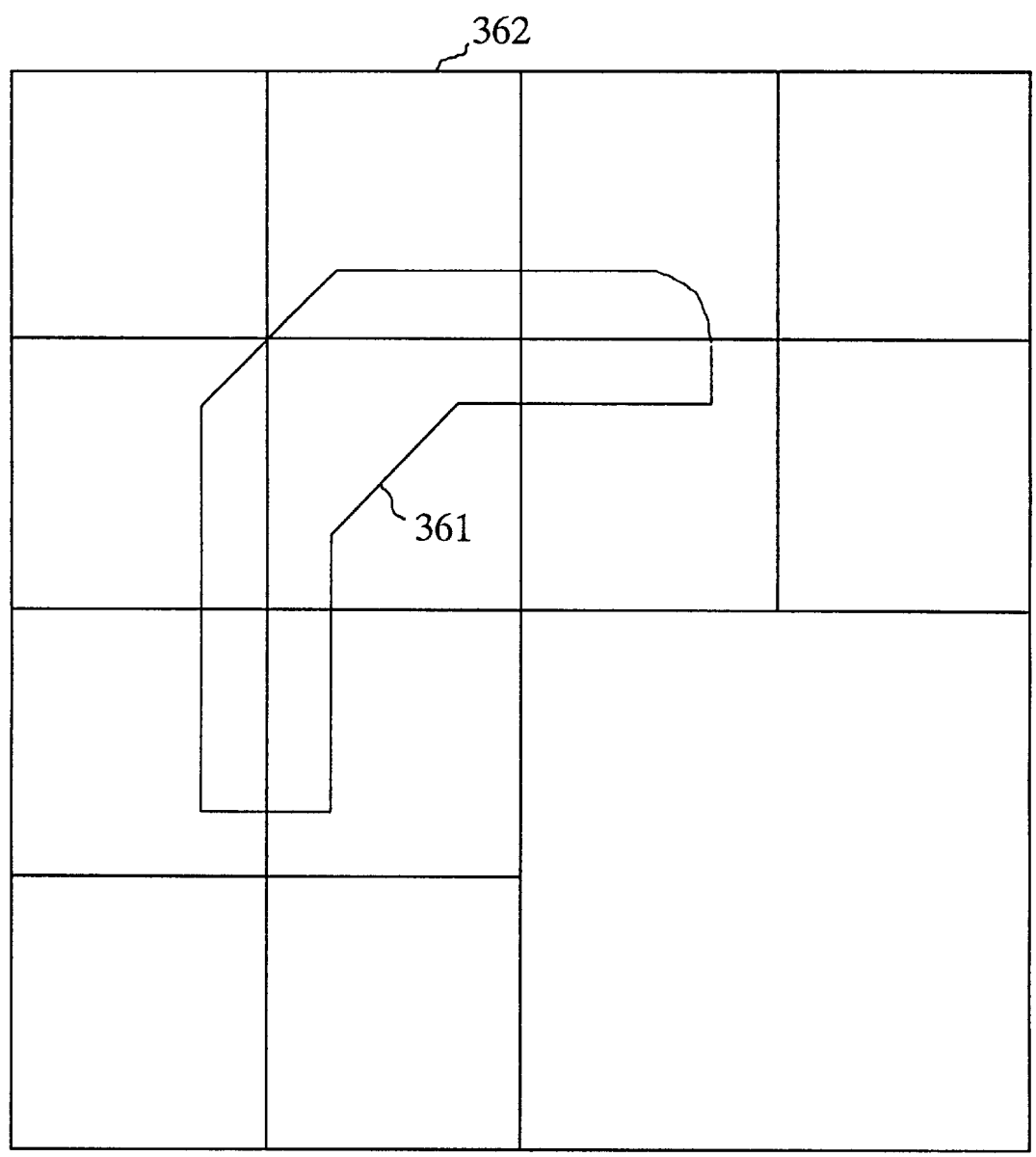
FIG. 31 shows the further division into 4 of the blocks on the indicated boundaries from the state shown in FIG. 30.

FIG. 31 shows the same mesh generation region when boundary 361 in FIG. 30 is selected once more as the indicated boundary and the blocks which are on boundary 361 are again finely divided into four.

Figure 32:
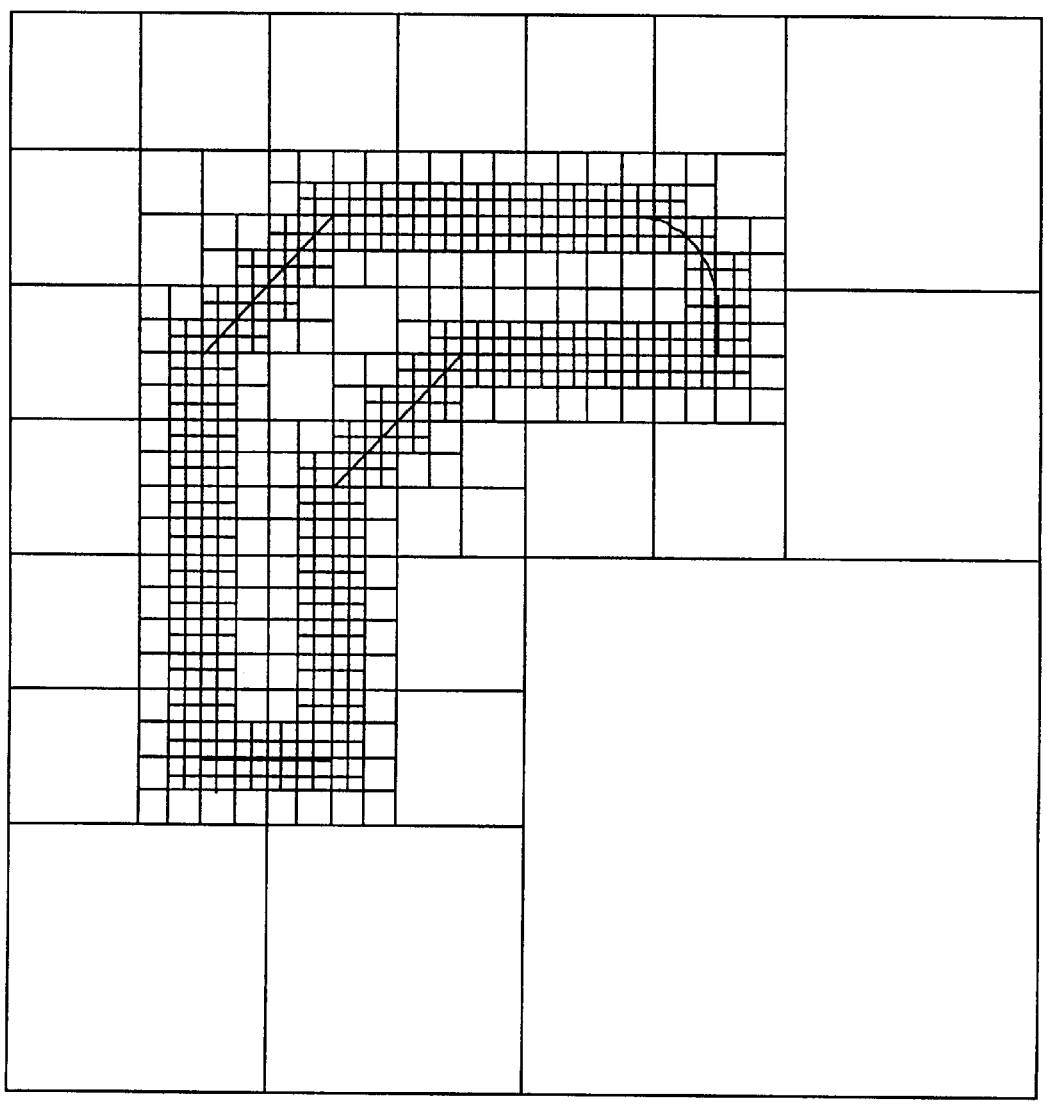
FIG. 32 shows a further fine division of the blocks on the indicated boundaries from the state shown in FIG. 31.

FIG. 32 shows the case when boundary 361 is indicated again and the blocks which are on boundary 361 in FIG. 31 are repeatedly divided into four, so that there is very fine block division near the indicated boundary. This enables very accurate numerical analysis. It should be noted here that FIG. 32 is a figure used for explaining the operation of the present embodiment and so is not displayed in reality.

Figure 33:
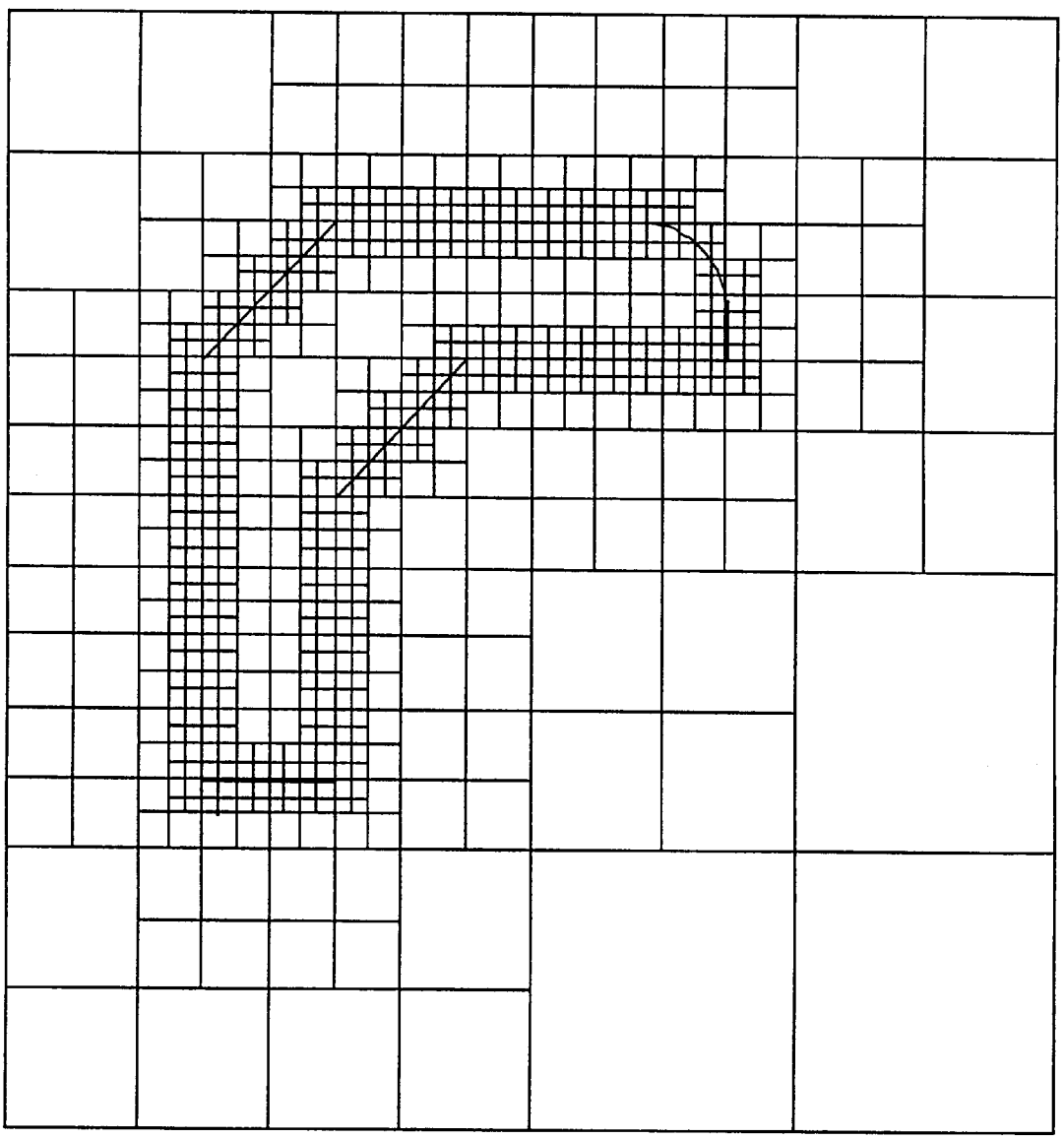
FIG. 33 shows a further fine division of the blocks on the indicated boundaries from the state shown in FIG. 32 so that the ratio between the length of sides of adjacent blocks does not exceed 1:2.

FIG. 33 shows the case where blocks in the mesh generation region of FIG. 32 are further divided to ensure the ratio of sizes between neighboring blocks does not exceed 1:2.

Figure 34:
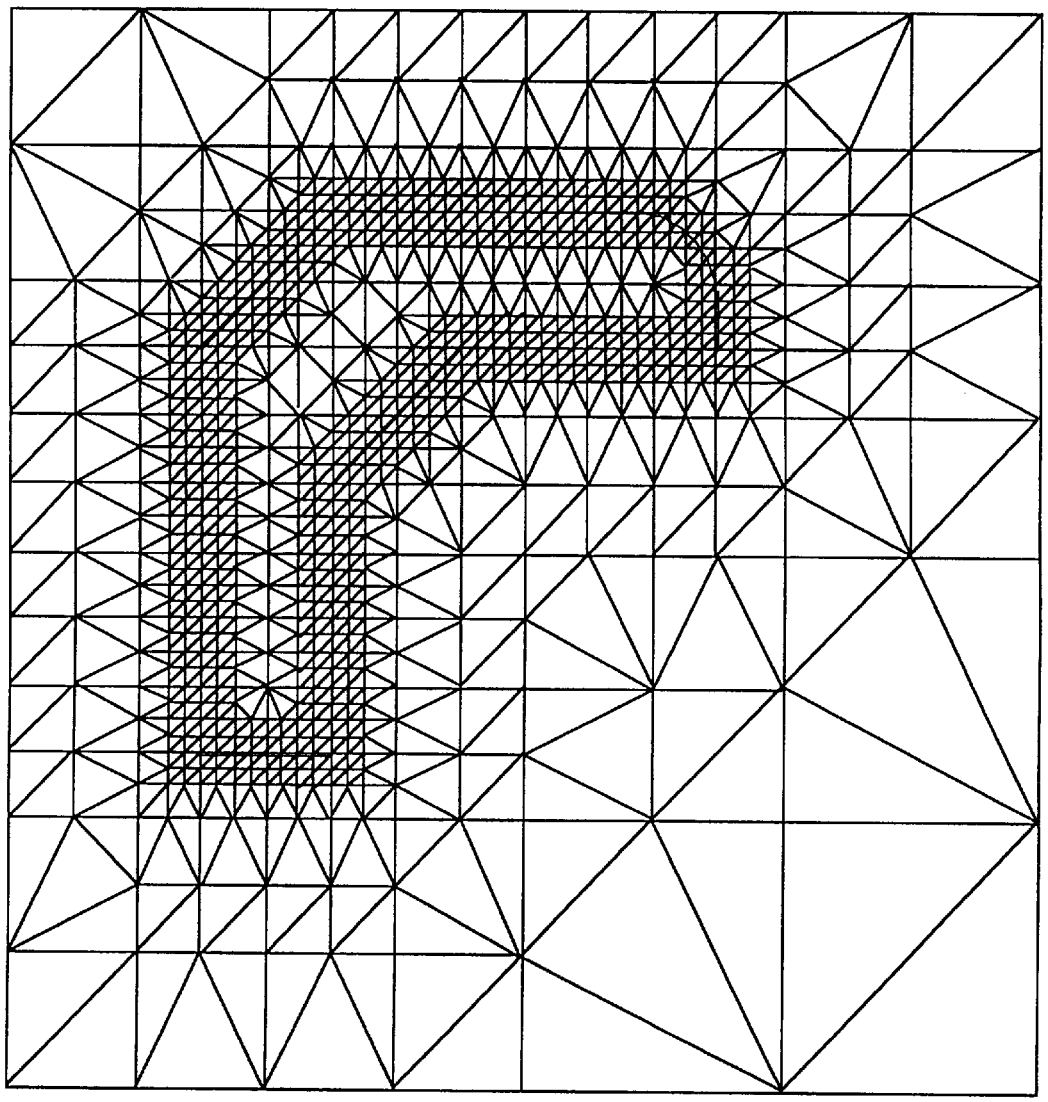
FIG. 34 shows the mesh generated based on the block division shown in FIG. 33.

FIG. 34 shows the same mesh generation region as FIG. 33 after the mesh has been generated.

As shown in FIG. 34, the mesh generation method of the present embodiment generates a large number of blocks with a same pattern and ensures that there are no striking differences in size between neighboring mesh elements.

Tenth Embodiment

Figure 35:
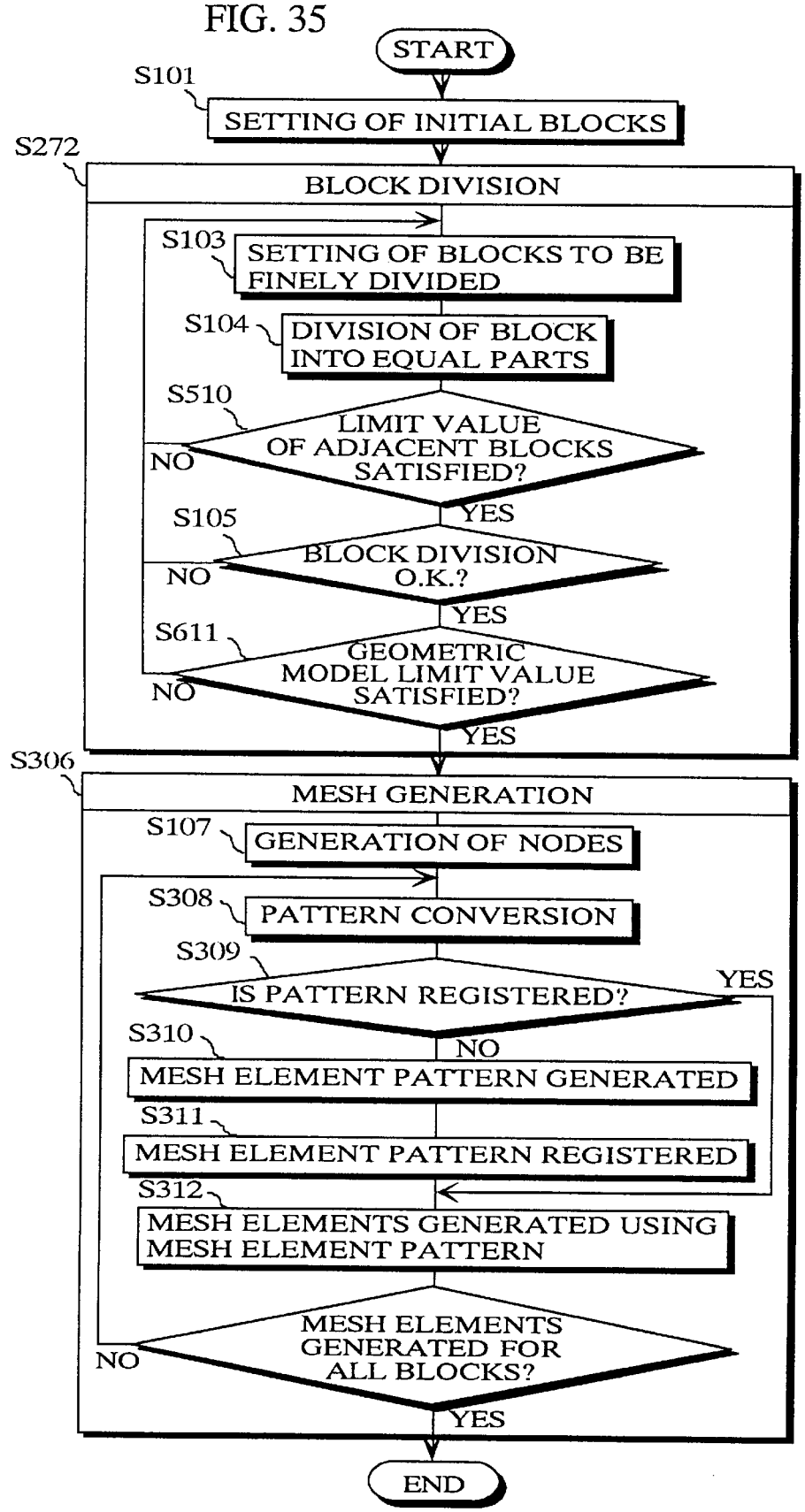
FIG. 35 shows the processing method for mesh generation to which the tenth embodiment relates.

While the above embodiments have been described for ease of understanding as generating a mesh made up of triangular mesh elements for expressing a geometric model defined in terms of a rectangular code system in an xy plane, there will in fact be many cases where the object to be analyzed is three-dimensional, so that the present embodiment will be described as dealing with the case of a three-dimensional region to be analyzed. The processing method used is shown in FIG. 35 which is the same as that used for a planar region. In FIG. 35, the setting of blocks on an indicated boundary is the method used for setting the blocks to be divided in (S103), with the generation of mesh being the same as in FIG. 15.

Figure 36:
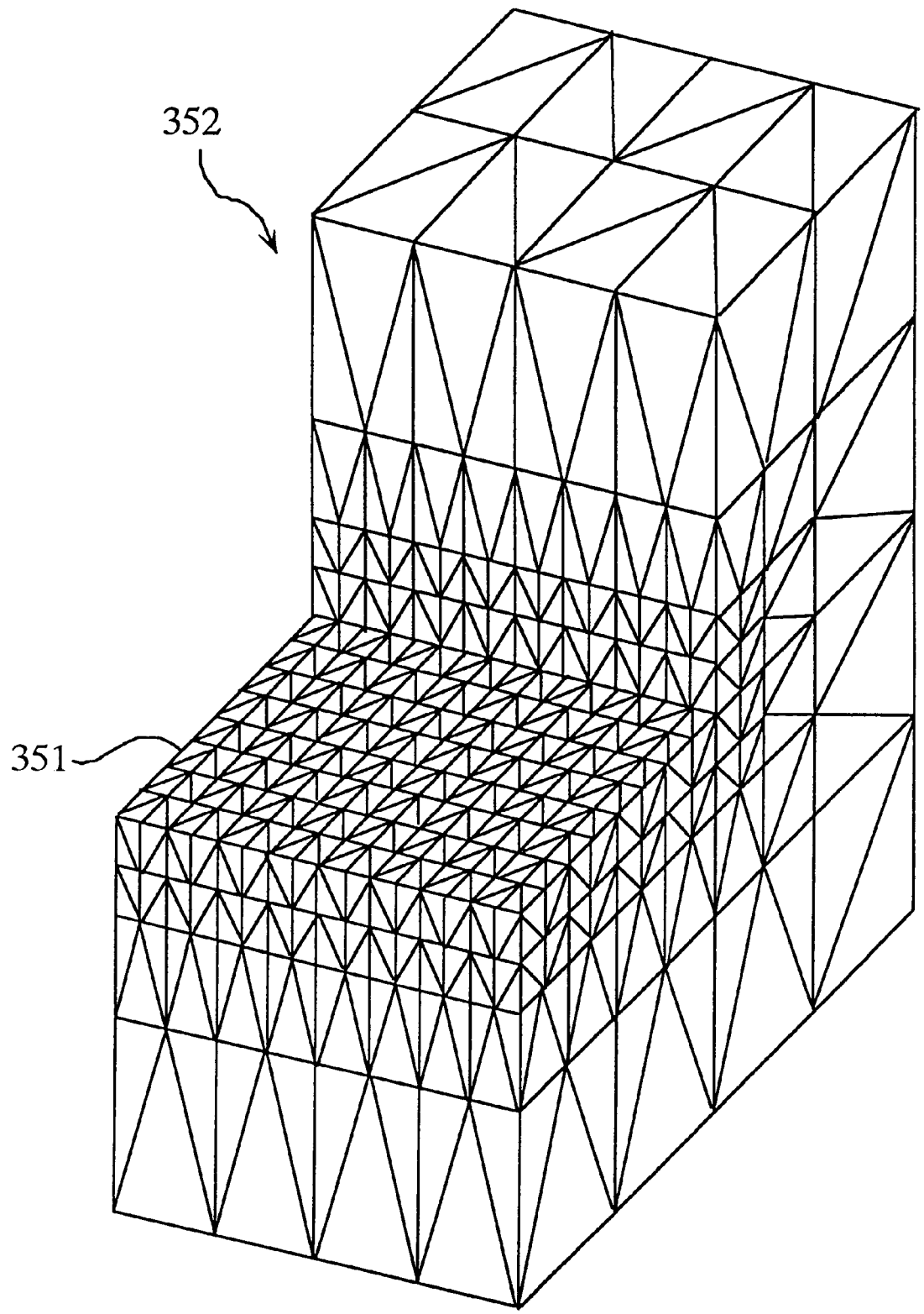
FIG. 36 shows an example of a three-dimensional mesh generated for a three-dimensional object to be analyzed in the tenth embodiment.

FIG., 36 shows an example of the mesh for numerical analysis generated by the present embodiment. In explaining the generation process of this mesh, the rectangular parallelepiped included in the object to be analyzed 352 is set as the provisional mesh generation region. Next, boundary surface 351 is indicated as the boundary whose blocks are to be finely divided. In the present embodiment, the rectangular parallelepiped including boundary surface 351 is divided four times, with, for the case of a three-dimensional object, these rectangular parallelepipeds becoming blocks. After this, the lengths of the sides of adjacent blocks are compared and block division is performed so that the blocks conform to the limitations for the geometric model. Nodes are then generated for the blocks generated as described above, and mesh elements are generated based on the nodes. Finally, the mesh shown in FIG. 36 is generated by removing the remaining part of the geometric model which is not region 352 in the provisional mesh generation region.

It should be noted here that for the mesh generation of planar surfaces in the previous embodiments, the geometric model was expressed using points, lines and surfaces with boundaries of the geometric model and of the blocks being marked by boundary lines. For mesh generation for three-dimensional objects, however, the geometric model is expressed using points, lines, surfaces, and three-dimensional forms with boundaries of the geometric model and of the blocks being marked by boundary surfaces (here, boundary lines are included in boundary surfaces as the lines at the edge of the boundary surfaces).

Since three-dimensional objects require the generation of a much larger number of mesh elements, a great reduction in the time taken for mesh generation can be achieved by using mesh generation method of the present invention. Also, while it is difficult to change the grading of three-dimensional mesh using conventional generation techniques, by using the present embodiment, the user can easily have a mesh with a variable grading generated in a short time. The present embodiment is also provided with limit conditions for the geometric model and a limit of the difference in size between adjacent blocks, which limits the number of possible block patterns. Accordingly, mesh can be generated for a three-dimensional geometric model using mesh elements aside from tetrahedral elements, such as pentahedral or hexahedral elements, which further improves the effectiveness of the limitations on the sizes of adjacent blocks and on the part of the geometric model which appears in one block.

However, when a mesh is generated using three-dimensional mesh elements, it is necessary to generate the mesh elements of each block with consideration to the compatibility of mesh elements with those in adjacent blocks.

Figure 38:
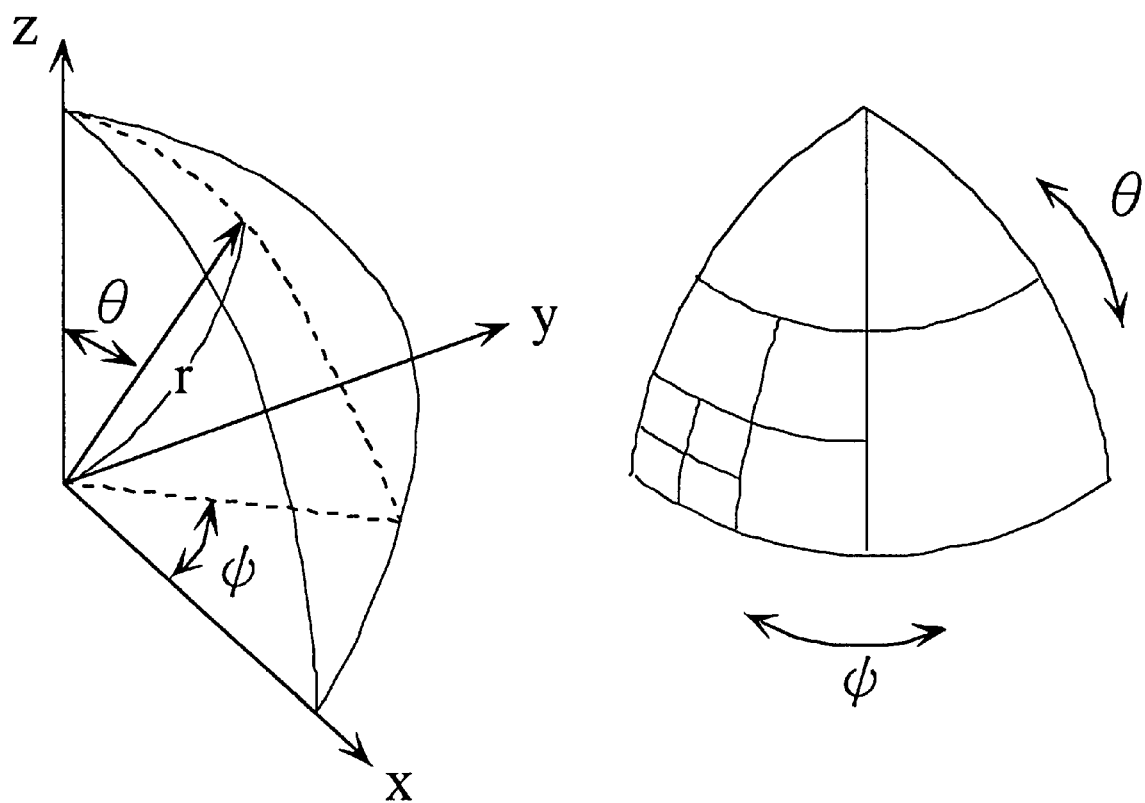
FIG. 38 shows a three-dimensional region to be analyzed which is divided into blocks using polar coordinates.

It should be noted here that the coordinates may be cylindrical coordinates or polar coordinates. FIG. 37 shows the case for cylindrical coordinate system and FIG. 38 the case for polar coordinate system. Note here that for the case for cylindrical coordinates, an r coordinate is used in place of an x coordinate and a θ coordinate (angle) is used in place of a y coordinate, so that equal division in the coordinate axes refers to the equal division of length r in the r axis and of angle θ in another axis.

In the same way, for the case of polar coordinates, an r coordinate, a θ coordinate and a Φ coordinate are used in place of x, y and z coordinates, so that equal division in the coordinate axes refers to the equal division of length r in the r axis and the equal division of the angles in the other axes.

Here, since conversion can easily be performed between these three kinds of coordinate systems, there is easy interchangeability for the computer used for calculation.

The present invention has been explained with reference to the embodiments given above, although it should be clear that the techniques involved are not limited to these embodiments. That is, modifications such as those given below are also possible.

1. The main method of block division was described as being equal division into two in both the x and y axes, although it is also possible in each embodiment to use a division method which divides blocks into a different number of parts depending on the coordinate axis, or into two or more parts in each coordinate axis.

2. It is also possible for the mesh elements which form the mesh for each block to be of a form which is not just triangular, and so can be of a form which is quadrangular or of higher-order.

3. Mesh with greater variation of mesh elements may be generated by creating new nodes such as by moving nodes in accordance with the geometric model or by erasing nodes which are extremely close to other nodes.

4. When generating the geometric model, it is possible to generate a form which includes a form for providing the necessary conditions for the form of the object to be analyzed.

In the actual calculation, it is necessary to generate beforehand a geometric model which takes into consideration the form for providing the conditions which are necessary for calculation. For example, when there is a part or region which provides the conditions for heat outflows/inflows, the affected part or region needs to have its form generated as a geometric model. For ease of understanding in each of the above embodiments, a geometric model is generated with the conception that the form for providing the necessary conditions for calculation and the form for defining the object to be analyzed are the same. However, this need not be the case, so that the geometric model can be made up of a form for providing the necessary conditions for calculation and a modelled form of the object to be analyzed.

When a geometric model which provides the necessary conditions for calculation is generated beforehand, the points, lines surfaces and three-dimensional forms for providing the necessary conditions for calculation are expressed using nodes. As one example, by having a condition such as the inflow/outflow of heat provided by a surface surrounded by nodes ABCD, the setting of the condition given by the surface made from nodes ABCD can be made after mesh generation has been performed. This means that points, lines surfaces and three-dimensional forms for providing the necessary conditions for calculation can be expressed using nodes, making this setting very simple.

5. It is possible to generate a mesh in accordance with a numerical analysis method which allows floating nodes.

Figure 39:
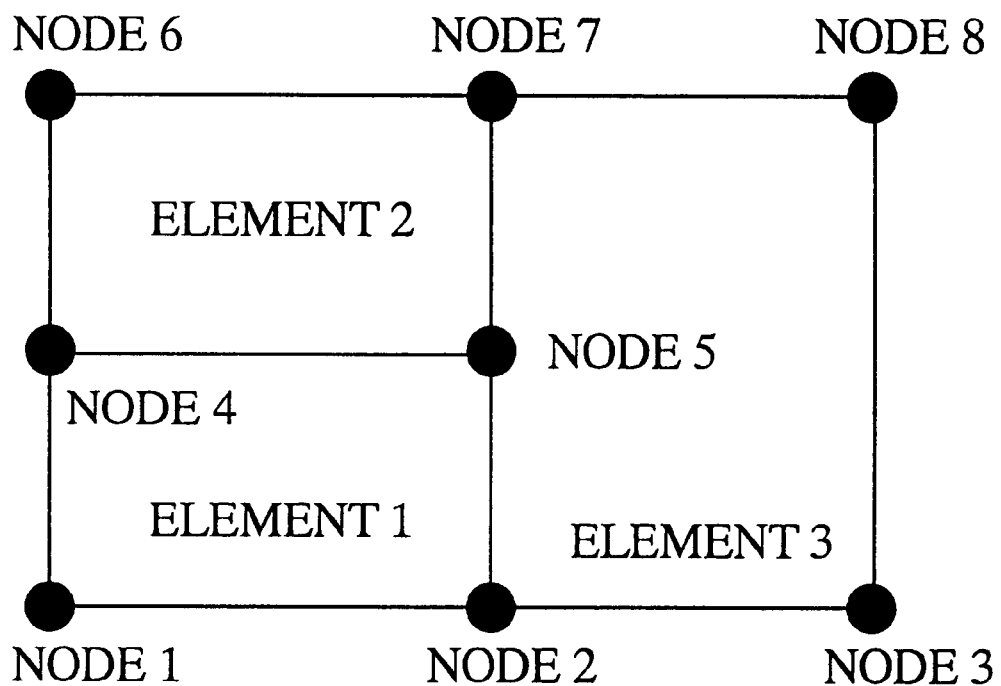
FIG. 39 is a drawing for explaining the concept of a "floating node".

Here, "floating nodes" refers in general to points such as node 5 in FIG. 39. In this drawing, the mesh is made up of quadrangular mesh elements which are specifically:

quadrangular element 1: nodes 1, 2, 5, 4 quadrangular element 2: nodes 4, 5, 7, 6 quadrangular element 3: nodes 2, 3, 8, 7

For a standard calculation systems, node 5 is unrelated to quadrangular element 3, so that the boundaries (nodes 2 and 5, nodes 5 and 7) and the boundary (nodes 2, 7) are separate. As a result, this boundary is a non-continuous boundary and so cannot be correctly calculated. Accordingly, it is difficult to set the grading of the mesh using these kinds of quadrangular elements.

In such cases, floating nodes necessitate a special process for a numerical analysis method which allows such floating nodes. For example, when node 5 is the midpoint of a line segment (here, the line segment between nodes 2 and 7) and the desired value for node n is set as An, the equation $A5=(A2+A7)*0.5$ can be assumed, and numerical analysis can be performed.

6. In order for numerical analysis to handle objects to be analyzed which move or which continuously change form, the function for moving nodes in accordance with the changes in the object to be analyzed can be applied to the coordinates of the nodes in the mesh which was generated as a static form, so that by comparing values for each node and mesh element, it is possible to compare analysis results before and after movement.

Also, in order to deal with the situation where only one part of the object to be analyzed moves a great deal, the movement is considered beforehand and mesh generation at the estimated ending position is made possible, so that the movement of the object to be analyzed can be expressed by moving its physical property values.

As one example, the physical property values of the space surrounding the object to be analyzed before it is moved can be set beforehand for the mesh elements generated at the estimated moved position, with the movement of the object to be analyzed then being expressed by setting the physical property values of the object to be analyzed after the object to be analyzed has moved. Note that in this case, the physical property values are input as a link to the analysis condition setting after mesh generation.

The two following methods can be used for analyzing objects to be analyzed which move or change form.

a. In accordance with mesh generation→numerical analysis→change of form (movement), movement→numerical analysis is repeated for the coordinates and physical property values of each node.

b. In accordance with mesh generation→numerical analysis→change of form (movement), conversion of data for geometric model→mesh generation→numerical analysis is repeated.

Of these, (a) is the more commonly used method. However, if the movement amount under this method is large, the mesh elements become elongated and accurate numerical analysis cannot be performed. For this reason, the method (a) is not suited to objects to be analyzed whose movement is pronounced.

On the other hand, under method (b), the mesh is regenerated for each movement, so that mesh does not become elongated and there is no limit on the amount of movement of the object to be analyzed. There is, however, the drawback that the regeneration of the mesh is time-consuming.

Here, if the mesh generation method of the present invention is used, the same results as (b) can be achieved in a much shorter time, with there being no limit on the amount of movement of the object to be analyzed and the numerical analysis being completed in a relatively short time.

Furthermore, the mesh generation method of the present invention is effective even when used for adaptable mesh (mesh where highly accurate calculation is automatically performed by automatically repeating mesh generation→numerical analysis→fine division of mesh where there is a large calculation error on performing numerical analysis after mesh generation). This is because for the method of the present invention, mesh elements are not elongated and the difference in size between adjacent mesh elements can be controlled so as to fall within a certain range.

Here, the method of the present invention is yet more effective if used with adaptable mesh and the method described above in (b).

7. It is also possible for the comparison means to perform the comparison of size between adjacent blocks and mesh elements of a three-dimensional object by comparing inscribed and circumscribed circles.

8. It is possible for blocks of a specified material in the geometric model, or the boundary of a plurality of materials in the geometric model to be used in the setting of blocks to be finely divided. When doing so, the judgement as to whether to finely divide each block is based on a judgement of the material of a given block and the material of its adjacent blocks.

When inputting the object to be analyzed, there are many cases when it is necessary to input positional data for the physical property values of each part of the geometric model corresponding to the data for the geometric model, though in the actual numerical analysis, since there are many cases where it is necessary to have the values of the vicinity of a boundary between different materials, it is effective to perform block division by specifying the boundary of a specified material.

9. In manufacturing the present invention, it should be obvious that components of the present invention which have hitherto been described as one construction element (or step or unit) may in fact be composed of several items or that alternatively, such components may be grouped together in a single element.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mesh generating method which generates mesh to be used in numerical analysis for a region of an object to be analyzed, the mesh generating method comprising:

a geometric model inputting step for inputting data for a geometric model that geometrically specifies the region of the object to be analyzed as a standard for a coordinate system;

a block generating step for generating blocks by dividing a space including the input geometric model in at least one coordinate direction of the coordinate system to create blocks of equal size;

a node extracting step for extracting, for every block, vertices of a block, points that define a form of the geometric model present in the block, and intersection points between the geometric model and a boundary of the block as nodes for the block, the intersection points including endpoints of an intersection lines between the geometric model and the boundary of the block;

a polygon candidate generating step for selecting arbitrary combinations of nodes that each form a polygon from nodes extracted for a block to generate polygon candidates:

a polygon selecting step for selecting one of the generated polygon candidates that satisfies a first condition as a formal polygon;

a polyhedron mesh candidate generating step for generating polyhedron mesh element candidates by connecting all vertices of the formal polygon with each node in the block aside from the vertices of the formal polygon;

a polyhedron mesh selecting step for selecting one of the generated polyhedron mesh element candidates that satisfies a second condition as a formal polyhedron mesh element, wherein the polygon candidate generating step, the polygon selecting step, the polyhedron mesh candidate generating step, and the polyhedron mesh selecting step being repeated until an entire region of the block is occupied by polyhedron mesh elements, and wherein polyhedron mesh elements are generated for an entire region of every block; and wherein, said generated polyhedron mesh elements for a region of an object to be analyzed are subsequently used for numerical analysis of the object being analyzed.

2. The mesh generating method of claim 1, wherein the first condition is that each polygon candidate has to neither enclose a two-dimensional area including any node aside from vertices of the polygon candidate nor cross a boundary of the geometric model, and wherein the second condition is that each polyhedron mesh element candidate has to neither enclose a space including any node aside from vertices of the polyhedron mesh element candidate, nor cross a boundary of the geometric model.

3. The mesh generating method of claim 2, wherein the first condition and the second condition each include a subcondition that when nodes on a boundary surface of the block are connected to form edges of existing polyhedron mesh elements in an adjacent block, polygon candidates and polyhedron mesh element candidates generated in the block must have the nodes on the boundary connected in a same pattern as the existing polyhedron mesh elements in the adjacent block.

4. The mesh generating method of claim 3, wherein the first condition further includes a subcondition that a polygon candidate to be selected is a least elongated of remaining polygon candidates, wherein the second condition further includes a subcondition that a polyhedron mesh element candidate to be selected is a least elongated of remaining polyhedron mesh element candidates, and wherein the subcondition of the first condition and the subcondition of the second condition are respectively used for selecting one of polygon candidates and one of polyhedron mesh element candidates remaining after other conditions are used.

5. The mesh generating method of claim 1, wherein each polygon candidate is a triangle and each polyhedron mesh element candidate is a tetrahedron, and wherein the polygon candidate generating step, the polygon selecting step, the polyhedron mesh candidate generating step, and the polyhedron mesh selecting step are composed of:

a first substep for selecting, from the nodes extracted for the block, one of arbitrary pairs of nodes which remain after eliminating each pair of nodes which is linked by a line including any node between the pair of nodes or a line crossing a boundary of the geometric model, and generating triangular polygon candidates by connecting the selected pair of nodes with each other and with each node in the block aside from the selected pair of nodes;

a second substep for eliminating each triangular polygon polygon candidate that encloses a two-dimensional area including any node aside from vertices of the triangular polygon candidate and each triangular polygon candidate that crosses a boundary of the geometric model and as a result prompts a need to create new nodes;

a third substep for selecting a least elongated of triangular polygon candidates remaining after the second substep as a formal triangular polygon;

a fourth substep for generating tetrahedron mesh element candidates by connecting all vertices of the formal triangular polygon with each node in the block aside from the vertices of the formal triangular polygon;

a fifth substep for eliminating each tetrahedron mesh element candidate that encloses a spare including any node aside from vertices of the tetrahedron mesh element candidate and each tetrahedron mesh element candidate that crosses a boundary of the geometric model and as a result prompts a need to create new nodes; and a sixth substep for selecting a tetrahedron mesh element candidate, among tetrahedron mesh element candidates remaining after the fifth substep, whose form is closest to a regular tetrahedron as a formal tetrahedron mesh element.

6. The mesh generating method of claim 5, wherein the fifth substep further eliminates each tetrahedron mesh element candidate which meets a condition of being identical to or overlapping an existing tetrahedron mesh element.

7. The mesh generating method of claim 6, wherein the first substep, the second substep, and the fifth substep further eliminate, respectively, each pair of nodes, each triangular polygon candidate, and each tetrahedron mesh element candidate which do not meet a condition that when nodes on a boundary surface of the block are connected to form edges of existing polyhedron mesh elements in an adjacent block, a pair of nodes, a triangular polygon candidate, and tetrahedron mesh element candidate must have the nodes on the boundary connected in a same pattern as the existing polyhedron mesh elements in the adjacent block.

8. The mesh generating method of claim 7, further comprising the following steps between the block generating step and the node extracting step:

a dividing region indicating step for having a user indicate a region of the geometric model to be divided; and a block dividing step for dividing each block which includes a part of the region indicated in the dividing region indicating step into equal parts in at least one coordinate direction of the coordinate system.

9. The mesh generating method of claim 1, further comprising the following steps between the block generating step and the node extracting step:

a dividing boundary indicating step for indicating at least one of a surface, a line and a point on a boundary of the geometric model to be divided; and a block dividing step for dividing each block which includes the surface, line or point indicated in the dividing boundary indicating step into equal parts in at least one coordinate direction of the coordinate system.

10. The mesh generating method of claim 8, wherein the block dividing step includes:

a size limit data inputting substep for inputting limit data related to a limit for a difference in size between adjacent blocks;

a size difference judging substep for judging whether a difference in size between a pair of adjacent blocks exceeds the difference stipulated by the limit data, for every pair of adjacent blocks; and a block dividing substep for dividing a larger block in a pair of adjacent blocks judged in the size difference judging substep to exceed the difference stipulated by the limit data into equal parts in at least one coordinate direction of the coordinate system.

11. The mesh generating method of claim 10, wherein the limit data in the size limit data inputting substep stipulates a limit that a ratio of lengths between at least one side of each block in a pair of adjacent blocks does not exceed 1:2.

12. The mesh generating method of claim 9, wherein the block dividing step includes:

a geometric model limiting rule inputting substep for inputting predetermined limit rules which make stipulations concerning at least one of points, lines and surfaces which defines a form of the geometric model present in each block; and a limit rule violation judging substep for judging whether any of the generated blocks violates the limit rules, wherein the block dividing step divides a block judged to violate the limit rules into equal parts in at least one coordinate direction of the coordinate system.

13. The mesh generating method of claim 1, further comprising the following steps between the block generating step and the node extracting step:

a geometric model limit rule inputting step for inputting predetermined limit rules which make stipulations concerning at least one of points, lines and surfaces which defines a form of the geometric model present in each block;

a limit rule violation judging step for judging whether any of the generated blocks violates the limit rules; and a block dividing step for dividing a block judged to violate the limit rules into equal parts in at least one coordinate direction of the coordinate system.

14. A mesh generating method which generates mesh to be used in numerical analysis for a region of an object to be analyzed, the mesh generating method comprising:

a geometric model inputting step for inputting data for a geometric model that geometrically specifies the region of the object to be analyzed as a standard for a coordinate system;

a block generating step for generating blocks by dividing a space including the input geometric model in at least one coordinate direction of the coordinate system to create blocks of equal size;

a node extracting step for extracting, for every block, vertices of a block, points that define a form of the geometric model present in the block, and intersection points between the geometric model and a boundary of the block as nodes for the block, the intersection points including endpoints of intersection lines between the geometric model and the boundary of the block;

a pattern sorting step for sorting each block according to pattern, based on geometric relations between nodes extracted for a block and any of points, lines and surfaces present in the block and on a boundary of the block which are necessary for generating a form of the geometric model;

a searching step for searching a memory using a pattern of a block as a key to read, if present, a mesh sample corresponding to the pattern, wherein the memory stores patterns which are each based on geometric relations between vertices of a block and intersection points between the geometric model and a boundary of the block, and mesh samples corresponding to the patterns;

a first mesh generating step for generating mesh elements in a block based on a mesh sample read for the block; and wherein, said generated mesh elements for a region of an object to be analyzed are subsequently used for numerical analysis of the object being analyzed.

15. The mesh generating method of claim 14, further comprising:

a second mesh generating step for generating mesh elements in a block using nodes extracted for the block, when it is judged in the searching step that a mesh sample corresponding to pattern of the block is not stored in the memory; and a registering step for registering the mesh elements, which are generated in the second mesh generating step, in the memory as a mesh sample corresponding to the pattern of the block.

16. A mesh generating device which generates mesh to be used in numerical analysis for a region of an object to be analyzed, the mesh generating device comprising:

geometric model inputting means for inputting data for geometric model that geometrically specifies the region of the object to be analyzed as a standard for a coordinate system;

block generating means for generating blocks by dividing a space including the input geometric model in at least one coordinate direction of the coordinate system to create blocks of equal size;

node extracting means for extracting, for every block, vertices of a block, points that define a form of the geometric model present in the block, and intersection points between the geometric model and a boundary of the block as nodes for the block, the intersection points including endpoints of intersection lines between the geometric model and the boundary of the block;

polygon candidate generating means for selecting arbitrary combinations of nodes that each form a polygon from nodes extracted for a block to generate polygon candidates;

polygon selecting means for selecting one of the generated polygon candidates that satisfies a first condition as a formal polygon;

polyhedron mesh candidate generating means for generating polyhedron mesh element candidates by connecting all vertices of the formal polygon with each node in the block aside from the vertices of the formal polygon;

polyhedron mesh selecting means for selecting one of the generated polyhedron mesh element candidates that satisfies a second condition as a formal polyhedron mesh element;

repeat controlling means for having the polygon candidate generating means, the polygon selecting means, the polyhedron mesh candidate generating means, and the polyhedron mesh selecting means repeat processing until an entire region of the block is occupied by polyhedron mesh elements; and wherein, said generated polyhedron mesh elements for a region of an object to be analyzed are subsequently used for numerical analysis of the object being analyzed.

17. The mesh generating device of claim 16, wherein each polygon candidate is a triangle and each polyhedron mesh element candidate is a tetrahedron, and wherein the polygon candidate generating means, the polygon selecting means, the polyhedron mesh candidate generating means, and the polyhedron mesh selecting means are composed of:

a first unit for selecting, from the nodes extracted for the block, one of arbitrary pairs of nodes which remain after eliminating each pair of nodes which is linked by a line including any node between the pair of nodes or a line crossing a boundary of the geometric model, and generating triangular polygon candidates by connecting the selected pair of nodes with each other and with each node in the block aside from the selected pair of nodes;

a second unit for eliminating each triangular polygon candidate that encloses a two-dimensional area including any node aside from vertices of the triangular polygon candidate and each triangular polygon candidate that crosses a boundary of the geometric model and as a result prompts a need to create new nodes;

a third unit for selecting a least elongated of triangular polygon candidates remaining after elimination by the second unit as a formal triangular polygon;

a fourth unit for generating tetrahedron mesh element candidates by connecting all vertices of the formal triangular polygon with each node in the block aside from the vertices of the formal triangular polygon;

a fifth unit for eliminating each tetrahedron mesh element candidate that encloses a space including any node aside from vertices of the tetrahedron mesh element candidate and each tetrahedron mesh element candidate that crosses a boundary of the geometric model and as a result prompts a need to create new nodes; and a sixth unit for selecting a tetrahedron mesh element candidate, among tetrahedron mesh element candidates remaining after elimination by the fifth unit, whose form is closest to a regular tetrahedron as a formal tetrahedron mesh element.

18. The mesh generating device of claim 16, further comprising:

dividing region indicating means for having a user indicate a region of the geometric model to be divided; and block dividing means for dividing each block which includes a part of the region indicated by the dividing region indicating means into equal parts in at least one coordinate direction of the coordinate system.

19. The mesh generating device of claim 16, further comprising:

dividing boundary indicating means for indicating at least one of a surface, a line and a point on a boundary of the geometric model to be divided; and block dividing means for dividing each block which includes the surface, line or point indicated by the dividing boundary indicating means into equal parts in at least one coordinate direction of the coordinate system.

20. The mesh generating device of claim 18, wherein the block dividing means includes:

a size limit data inputting unit for inputting limit data related to a limit for a difference in size between adjacent blocks;

a size difference judging unit for judging whether a difference in size between a pair of adjacent blocks exceeds the difference stipulated by the limit data, for every pair of adjacent blocks; and a block dividing unit for dividing a larger block in a pair of adjacent blocks judged by the size difference judging unit to exceed the difference stipulated by the limit data into equal parts in at least one coordinate direction of the coordinate system.

21. The mesh generating device of claim 20, wherein the limit data in the size limit data inputting unit stipulates a limit that a ratio of lengths between at least one side of each block in a pair of adjacent blocks does not exceed 1:2.

22. The mesh generating device of claim 19, wherein the block dividing means includes:

a geometric model limit rule inputting unit for inputting predetermined limit rules which make stipulations concerning at least one of points, lines and surfaces which defines a form of the geometric model present in each block; and a limit rule violation judging unit for judging whether any of the generated blocks violates the limit rules, wherein the block dividing means divides a block judged to violate the limit rules into equal parts in at least one coordinate direction of the coordinate system.

23. The mesh generating device of claim 16, further comprising:

geometric model limit rule inputting means for inputting predetermined limit rule which make stipulations concerning at least one of points, lines and surfaces which defines a form of the geometric model present in each block;

limit rule violation judging means for judging whether any of the generated blocks violates the limit rules; and block dividing means for dividing a block judged to violate the limit rules into equal parts in at least one coordinate direction of the coordinate system.

24. A mesh generating device which generates mesh to be used in numerical analysis for a region of an object to be analyzed, the mesh generating device comprising:

geometric model inputting means for inputting data for a geometric model that geometrically specifies the region of the object to be analyzed as a standard for a coordinate system;

block generating means for generating blocks by dividing a space including the input geometric model in at least one coordinate direction of the coordinate system to create blocks of equal size;

node extracting means for extracting, for every block, vertices of a block, points that define a form of the geometric model present in the block, and intersection points between the geometric model and a boundary of the block as nodes for the block, the intersection points including endpoints of intersection lines between the geometric model and the boundary of the block;

pattern sorting means for sorting each block according to pattern, based on geometric relations between nodes extracted for a block and any of points, lines, and surfaces present in the block and on a boundary of the block which are necessary for generating a form of the geometric model;

a memory for storing patterns which are each based on geometric relations between vertices of a block and intersection points between the geometric model and a boundary of the block, and mesh samples corresponding to the patterns;

searching means for searching the memory using a pattern of a block as a key to read, if present, a mesh sample corresponding to the pattern;

first mesh generating means for generating mesh elements in the block according to the read mesh sample; and wherein, said generated mesh elements for a region of an object to be analyzed are subsequently used for numerical analysis of the object being analyzed.

25. The mesh generating device of claim 24, further comprising:

second mesh generating means for generating mesh elements in the block using nodes extracted for the block, when it is judged by the searching means that the mesh sample corresponding to the pattern of the block is not stored in the memory; and a registering means for registering the mesh elements, which are generated by the second mesh generating means, in the memory as a mesh sample corresponding to the pattern of the block.

26. A storage medium that stores a mesh generating program for generating mesh to be used in numerical analysis for a region of an object to be analyzed, the mesh generating program comprising:

a block generating step for generating blocks by dividing a space including a geometric model that is inputted as a standard for a coordinate system and that geometrically specifies the region of the object to be analyzed in at least one coordinate direction of the coordinate system to create blocks of equal size;

a node extracting step for extracting, for every block, vertices of a block points that define a form of the geometric model present in the block, and intersection points between the geometric model and a boundary of the block as nodes for the block, the intersection points including endpoints of intersection lines between the geometric model and the boundary of the block;

a polygon candidate generating step for selecting arbitrary combinations of nodes that each form a polygon from nodes extracted for a block to generate polygon candidates;

a polygon selecting step for selecting one of the generated polygon candidates that satisfies a first condition as a formal polygon;

a polyhedron mesh candidate generating step for generating polyhedron mesh element candidates by connecting all vertices of the formal polygon with each node in the block aside from the vertices of the formal polygon;

a polyhedron mesh selecting step for selecting one of the generated polyhedron mesh element candidates that satisfies second condition as a formal polyhedron mesh element, wherein the polygon candidate generating step, the polygon selecting step, the polyhedron mesh candidate generating step, and the polyhedron mesh selecting step being repeated until an entire region of the block is occupied by polyhedron mesh elements, and wherein polyhedron mesh elements are generated for an entire region of every block; and wherein, said generated polyhedron mesh elements for a region of an object to be analyzed are subsequently used for numerical analysis of the object being analyzed.

* * * * *